US012292096B2

(12) United States Patent
Walkingshaw et al.

(10) Patent No.: US 12,292,096 B2
(45) Date of Patent: May 6, 2025

(54) MECHANICAL-ENERGY STORAGE UNIT AND ASSEMBLY FIXTURE

(71) Applicant: Torus Inc., Sandy, UT (US)

(72) Inventors: Nathan Walkingshaw, Sandy, UT (US); Calab Nelson, Springville, UT (US); John Loveless, Layton, UT (US); Zahra Derafshi, Cambridge, MA (US); Cliff Lambarth, Portage, MI (US); Sean Peterson, Payson, UT (US)

(73) Assignee: Torus Inc., South Salt Lake, UT (US)

( * ) Notice: Subject to any disclaimer, the term of this patent is extended or adjusted under 35 U.S.C. 154(b) by 0 days.

(21) Appl. No.: 18/666,593

(22) Filed: May 16, 2024

(65) Prior Publication Data
US 2024/0384708 A1 Nov. 21, 2024

Related U.S. Application Data

(60) Provisional application No. 63/502,648, filed on May 16, 2023.

(51) Int. Cl.
F16F 15/315 (2006.01)
F03G 3/08 (2006.01)
(Continued)

(52) U.S. Cl.
CPC ............ *F16F 15/3156* (2013.01); *F03G 3/08* (2013.01); *F16C 17/02* (2013.01);
(Continued)

(58) Field of Classification Search
CPC .................. F05B 2230/608; F05B 2260/421
See application file for complete search history.

(56) References Cited

U.S. PATENT DOCUMENTS 3,970,917 A 7/1976 Diggs
4,186,245 A 1/1980 Gilman
(Continued)

FOREIGN PATENT DOCUMENTS

CN 217676608 U 10/2022
CN 115626413 A 1/2023
(Continued)

OTHER PUBLICATIONS

"The energy transition demands more than renewables and battery-based energy storage," Amber Kinetics—Take Charge, retrieve from https://amberkinetics.com/, retrieved on Feb. 25, 2023, pp. 5.
(Continued)

*Primary Examiner* — Vicky A Johnson
(74) *Attorney, Agent, or Firm* — VLP Law Group LLP; Michel Bohn

(57) ABSTRACT

A system may include a stacking device having a base portion and one or more walls, the base portion having a first axle receiver that holds a first axle at a first defined position, the one or more walls extending from the base portion, the stacking device receiving one or more flywheel plates onto the first axle. A system may include a clamping device adapted to couple with the stacking device using one or more alignment mechanisms, the clamping device including a second axle receiver that holds a second axle at a second defined position, the first defined position and the second defined position being in line when the clamping device is coupled with the stacking device.

20 Claims, 29 Drawing Sheets

(51) Int. Cl.
*F16C 17/02* (2006.01)
*H02K 7/09* (2006.01)
*H02K 7/02* (2006.01)

(52) U.S. Cl.
CPC .......... *F16F 15/3153* (2013.01); *H02K 7/09* (2013.01); *F05B 2230/608* (2013.01); *F05B 2240/40* (2013.01); *F05B 2260/421* (2013.01); *F16C 2361/55* (2013.01); *H02K 7/025* (2013.01)

(56) References Cited

U.S. PATENT DOCUMENTS

| | | | |
|---|---|---|---|
| 4,538,079 A * | 8/1985 | Nakayama | H02K 7/025 310/74 |
| 5,726,516 A | 3/1998 | Randall | |
| 6,614,142 B1 | 9/2003 | Bonnieman et al. | |
| 7,977,837 B2 | 7/2011 | Oyama | |
| 11,362,558 B2 | 6/2022 | Sanders et al. | |
| 11,824,355 B2 | 11/2023 | Walkingshaw et al. | |
| D1,051,117 S | 11/2024 | Hennessey | |
| 2003/0029269 A1 | 2/2003 | Gabrys | |
| 2004/0051507 A1 | 3/2004 | Gabrys et al. | |
| 2011/0031827 A1 | 2/2011 | Gennesseaux | |
| 2012/0062154 A1 | 3/2012 | Chiao et al. | |
| 2012/0176074 A1 | 7/2012 | Dubois et al. | |
| 2013/0015825 A1 | 1/2013 | Pullen | |
| 2013/0261001 A1 | 10/2013 | Hull et al. | |
| 2014/0165777 A1 | 6/2014 | Andrews et al. | |
| 2014/0366683 A1 | 12/2014 | Pullen | |
| 2016/0178031 A1 * | 6/2016 | Pullen | B60L 50/30 74/572.11 |
| 2016/0241106 A1 | 8/2016 | Veltri | |
| 2016/0377147 A1 * | 12/2016 | Sun | F16F 15/315 74/572.1 |
| 2020/0112216 A1 | 4/2020 | Galmiche et al. | |
| 2020/0212762 A1 | 7/2020 | Dharan | |
| 2020/0259379 A1 | 8/2020 | Sanders et al. | |
| 2022/0231572 A1 | 7/2022 | Kesler | |
| 2022/0243784 A1 | 8/2022 | Pullen | |
| 2023/0138936 A1 | 5/2023 | Walker, III et al. | |
| 2023/0246481 A1 | 8/2023 | Walkingshaw et al. | |
| 2024/0088706 A1 | 3/2024 | Walkingshaw et al. | |
| 2024/0384776 A1 | 11/2024 | Walkingshaw et al. | |
| 2024/0384777 A1 | 11/2024 | Walkingshaw et al. | |
| 2024/0388164 A1 | 11/2024 | Walkingshaw et al. | |
| 2024/0388165 A1 | 11/2024 | Walkingshaw et al. | |

FOREIGN PATENT DOCUMENTS

| | | | | |
|---|---|---|---|---|
| GB | 2494783 A * | 3/2013 | | B60L 50/30 |
| IL | 289441 A | 12/2022 | | |
| JP | 2007-056710 A | 3/2007 | | |
| WO | 93/07387 A1 | 4/1993 | | |
| WO | 2023/126923 A1 | 7/2023 | | |
| WO | 2024/238840 A1 | 11/2024 | | |
| WO | 2024/238842 A1 | 11/2024 | | |
| WO | 2024/238845 A1 | 11/2024 | | |
| WO | 2024/238855 A1 | 11/2024 | | |

OTHER PUBLICATIONS

Amiryar, M. E., et al., "Analysis of Standby Losses and Charging Cycles in Flywheel Energy Storage Systems", Energies, vol. 13, 2020, 22 pages.
Bianchini, C., et al., "Design of Motor/Generator for Flywheel Batteries", IEEE Transactions on Industrial Electronics, vol. 68, No. 1, Oct. 2021, pp. 9675-9684.
Ertz, Gabriel, Development, manufacturing, and testing of a multi-rim {hybrid} flywheel rotor, Diploma Thesis University of Alberta, Institute for Dynamics and Vibration, Jun. 10, 2014, 107 pages.
Ha, Sung K., et al., Design and Manufacture of a Composite Flywheel Press-Fit Multi-Rim Rotor, Journal of Reinforced Plastics and Composites, 27, Feb. 25, 2008, SAGE Publications, pp. 953-965.
Ha, Sung K., et al., Design and Spin Test of Hybrid Composite Flywheel Rotor with Split Type Hub, Journal of Composite Materials, Jan. 9, 2006, SAGE Publications, pp. 1-18.
International Search Report and Written Opinion of Intl. Application No. PCT/US2023/061784, mailed Jun. 5, 2023 (12pages).
Kim, Seong J., et al., Design and fabrication of hybrid composite hub for multi-rim flywheel energy storage system, Composite Structures 107, 2014, pp. 19-29.
Machine translation of JP2007056710; Nakaseki et al. (Year: 2007).
International Preliminary Report on Patentability received for PCT Patent Application No. PCT/US23/61784, mailed on Aug. 15, 2024, 11 pages.
International Search Report and Written Opinion received for PCT Patent Application No. PCT/US24/29773, mailed on Aug. 15, 2024, 12 pages.
International Search Report and Written Opinion received for PCT Patent Application No. PCT/US24/29779, mailed on Aug. 15, 2024, 13 pages.
International Search Report and Written Opinion received for PCT Patent Application No. PCT/US24/29793, mailed on Aug. 8, 2024, 7 pages.
Invitation to Pay Additional Fees received for PCT Patent Application No. 30, 2024, 2 pages.
International Search Report and Written Opinion received for PCT Patent Application No. PCT/US2024/029771, mailed on Sep. 23, 2024, 16 pages.
GlobalSpec, Flywheel Power Systems Selection Guide: Types, Features, Applications, Flywheel Power Systems Information, 5pp., obtained at https://www.globalspec.com/learnmore/electrical_electronic_components/power_generation_storage/alternative_power_generators/flywheel_power_systems.

* cited by examiner

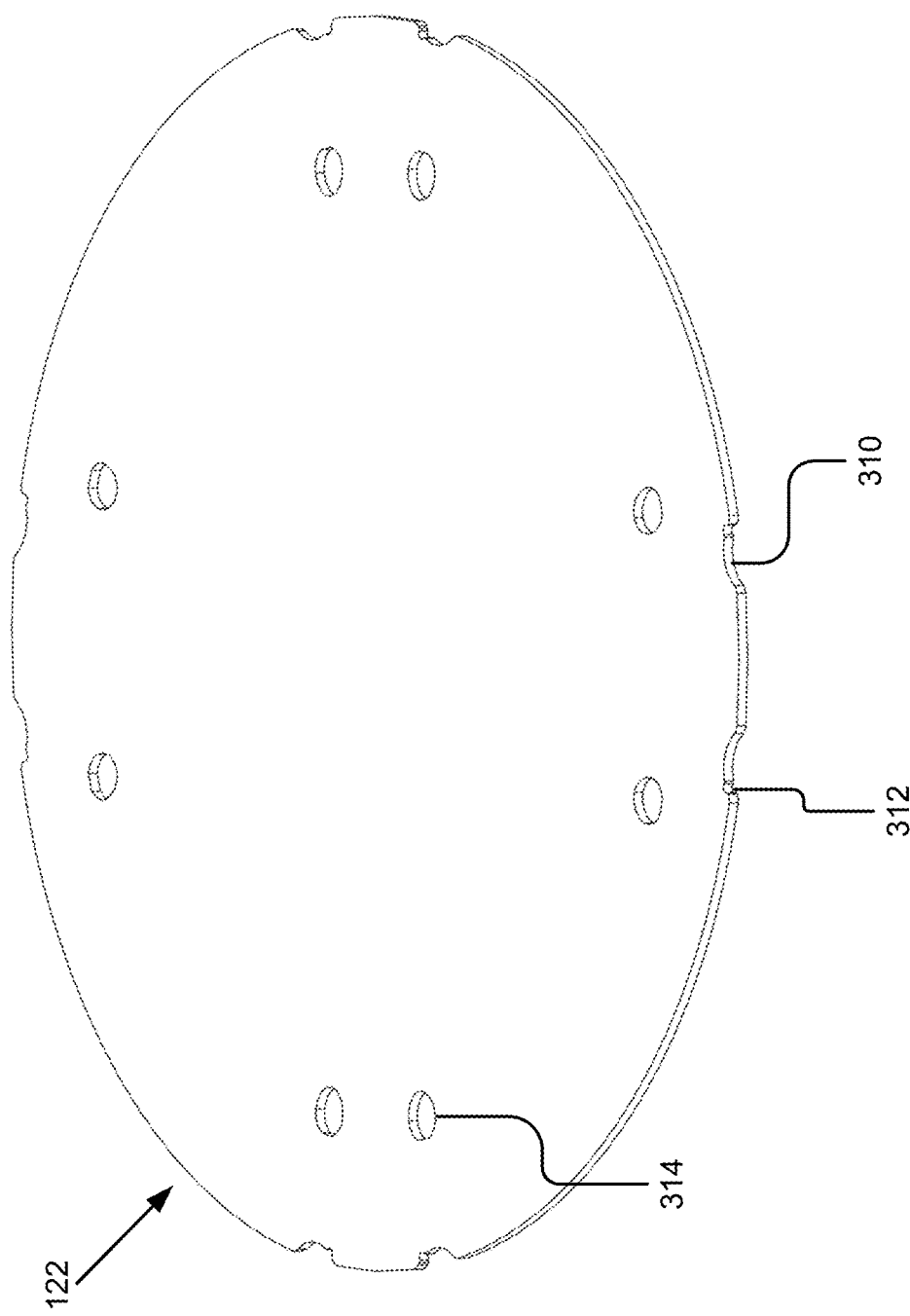

MECHANICAL-ENERGY STORAGE UNIT AND ASSEMBLY FIXTURE

CROSS-REFERENCE TO RELATED APPLICATION

This application claims priority to U.S. Provisional Patent Application No. 63/502,648 filed on May 16, 2023. The present application is related to U.S. application Ser. No. 18/666,522, titled "Mechanical-Energy Storage Unit System" filed on May 16, 2024; U.S. application Ser. No. 18/666,542, titled "Flywheel Vacuum Enclosure and Adjustment System" filed on May 16, 2024; U.S. application Ser. No. 18/666,557, titled "Stacking Flywheel and Linkage" filed on May 16, 2024; and U.S. application Ser. No. 18/666,573, titled "Flywheel Magnetic Lift and Bearing System" filed on May 16, 2024; as the present application by common inventors. All of these applications are incorporated herein by reference, including their specifications and drawings, which disclosure is not admitted to be prior art with respect to the present invention by its mention in the cross-reference section.

BACKGROUND

The present disclosure relates to mechanical-energy storage units. Implementations relate to assembly of flywheels for mechanical-energy storage units.

Currently, residential electricity customers, as well as electrical utilities, use various sources of electrical energy storage to offset varying electrical power production and use, such as the duck curve associated with solar or other renewable energy production. The variation in power production and usage has been further exacerbated with the increasing popularity of renewable power sources. These issues cause significant costs and other issues to utilities, power outages, and other issues.

Commonly, excess or backup power is stored in chemical storage, such as large chemical batteries. Unfortunately, chemical batteries suffer from many issues that make them undesirable at both a residential level and at a utility level. For example, chemical batteries may be very expensive, complex, and require numerous safeguards against fires. Chemical batteries are also ecologically unfriendly, as their production uses toxic chemicals, creates significant greenhouse gases, and results in significant material waste. Furthermore, chemical batteries have short lifespans because the batteries have a limited number of years and recharge cycles before they must be disposed of.

Previous solutions for mechanical energy storage have been overly complex, too large to be implemented at a residential level, not scalable for an electrical utility, or have faced other issues.

Furthermore, while balance of a flywheel is important, previous solutions did not include effective means or methods for assembling multi-part flywheels in an aligned or balanced manner.

SUMMARY

In some aspects, the techniques described herein relate to a flywheel assembly fixture including: a stacking device having a base portion and one or more walls, the base portion having a first axle receiver that holds a first axle at a first defined position, the one or more walls extending from the base portion, the stacking device receiving one or more flywheel plates onto the first axle; and a clamping device adapted to couple with the stacking device using one or more alignment mechanisms, the clamping device including a second axle receiver that holds a second axle at a second defined position, the first defined position and the second defined position being in line when the clamping device is coupled with the stacking device.

In some aspects, the techniques described herein relate to a flywheel assembly fixture, further including: a plate alignment mechanism adapted to align the one or more flywheel plates with the first axle and the second axle.

In some aspects, the techniques described herein relate to a flywheel assembly fixture, wherein the plate alignment mechanism is coupled with the one or more walls and adjustably extends in a first direction away from the one or more walls to exert pressure on the one or more flywheel plates, the first direction being substantially perpendicular to an axial direction of the first axle.

In some aspects, the techniques described herein relate to a flywheel assembly fixture, wherein: the plate alignment mechanism includes a plate contact surface that is adapted to interact with a contour in a peripheral edge of at least one of the one or more flywheel plates to push the at least one flywheel plate into alignment with the first axle.

In some aspects, the techniques described herein relate to a flywheel assembly fixture, wherein: the one or more flywheel plates include a first clamping plate, a second clamping plate, and one or more stacking plates positioned between the first clamping plate and the second clamping plate.

In some aspects, the techniques described herein relate to a flywheel assembly fixture, wherein: the first clamping plate is coupled with the first axle; and the second clamping plate is coupled with the second axle.

In some aspects, the techniques described herein relate to a flywheel assembly fixture, wherein the first clamping plate is placed into the stacking device prior to the first axle.

In some aspects, the techniques described herein relate to a flywheel assembly fixture, wherein at least one of the one or more stacking plates does not directly contact either the first axle or the second axle.

In some aspects, the techniques described herein relate to a flywheel assembly fixture, wherein the first clamping plate is aligned using the first axle, the second clamping plate is aligned using the second axle, and the one or more stacking plates are aligned using the one or more alignment mechanisms.

In some aspects, the techniques described herein relate to a flywheel assembly fixture, wherein the clamping device is adapted to exert a clamping force on the one or more flywheel plates to stress a clamping plate of the one or more flywheel plates in an axial direction of the first axle and the second axle.

In some aspects, the techniques described herein relate to a method of assembling a multi-part flywheel including: placing a first axle into a first axle receiver of a stacking device, the first axle receiver holding the first axle in a first defined position; placing one or more flywheel plates onto the first axle while the first axle is held by the first axle receiver; and placing a second axle into a second axle receiver of a clamping device, the second axle receiver holding the second axle receiver at a second defined position, the first defined position being in line with the second defined position when the clamping device is coupled with the stacking device.

In some aspects, the techniques described herein relate to a method 11, further including: aligning the one or more flywheel plates with the first axle in the stacking device.

In some aspects, the techniques described herein relate to a method 12, wherein aligning the one or more flywheel plates with the first axle in the stacking device includes: stacking the one or more flywheel plates using the stacking device; and adjusting a plate alignment mechanism coupled with the stacking device to exert pressure on the one or more flywheel plates in a first direction, an axis of rotation of the first axle being perpendicular to the first direction.

In some aspects, the techniques described herein relate to a method 13, further including: adjusting the plate alignment mechanism to move a plurality of the one or more flywheel plates into alignment and balance about the axis of rotation of the first axle.

In some aspects, the techniques described herein relate to a method 11, further including: placing the first axle into the stacking device; placing the one or more flywheel plates into the stacking device; placing the second axle into the clamping device; and coupling the clamping device with the stacking device.

In some aspects, the techniques described herein relate to a method 11, further including: placing a first clamping plate into the stacking device; and after placing the first clamping plate into the stacking device, placing the first axle into the first axle receiver of the stacking device through a perforation in a center of the first clamping plate.

In some aspects, the techniques described herein relate to a method 11, further including: placing a first clamping plate into the stacking device contacting the first axle, the one or more flywheel plates including the first clamping plate, at least three stacking plates, and a second clamping plate; and placing the at least three stacking plates on top of one or more of the first clamping plate and the first axle, one or more of the at least three stacking plates not contacting the first axle when the multi-part flywheel is assembled.

In some aspects, the techniques described herein relate to a method 17, further including: placing the second clamping plate into the stacking device contacting the second axle; and placing the clamping device onto the stacking device, the clamping device pushing the second axle into alignment with the first axle.

In some aspects, the techniques described herein relate to a method 11, further including: applying, using the clamping device, a clamping force to one or more clamping plates of the one or more flywheel plates in an axial direction of the first axle to place the one or more clamping plates in a stressed position.

In some aspects, the techniques described herein relate to a method 19, further including: while the clamping force is applied using the clamping device and while the one or more clamping plates are in the stressed position, inserting a plurality of bolts to couple the one or more clamping plates together in the stressed position.

Other implementations of one or more of these aspects or other aspects include corresponding systems, apparatus, and computer programs, configured to perform the various actions and/or store various data described in association with these aspects. Some implementations, such as various data structures for using the system, may be encoded on tangible computer storage devices. Numerous additional features may, in some cases, be included in these and various other implementations, as discussed throughout this disclosure. It should be understood that the language used in the present disclosure has been principally selected for readability and instructional purposes, and not to limit the scope of the subject matter disclosed herein.

BRIEF DESCRIPTION OF THE DRAWINGS

This disclosure is illustrated by way of example, and not by way of limitation in the figures of the accompanying drawings in which like reference numerals are used to refer to similar elements.

FIGS. 3A and 3B illustrate views of example flywheel stacking plates.

DETAILED DESCRIPTION

Figure 1A:
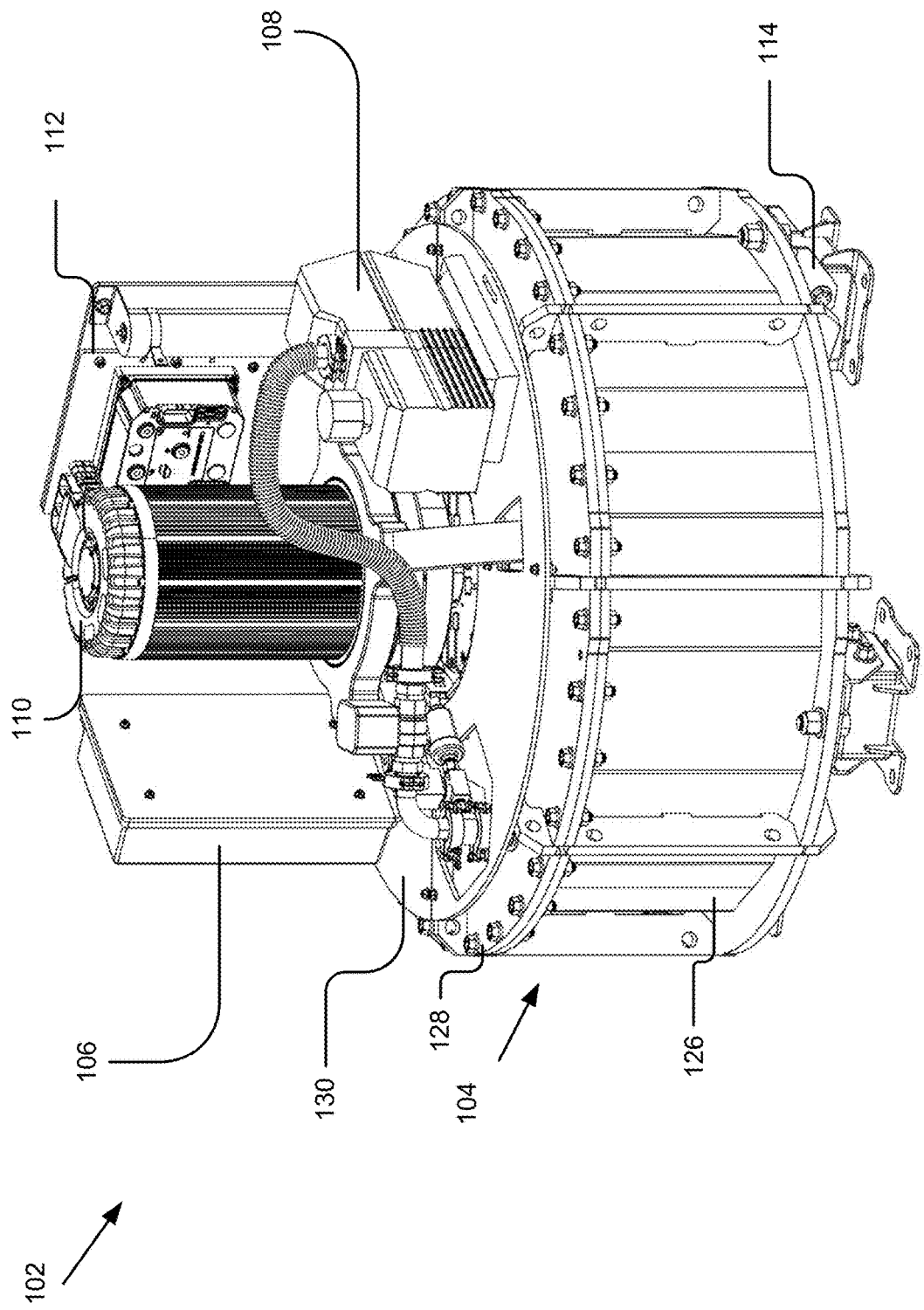
FIGS. 1A-1B illustrate an example mechanical-energy storage unit or flywheel assembly.

This description includes several improvements over previous solutions, such as those described in reference to the Background. A mechanical-energy storage unit 102 is described herein along with its assembly and an assembly fixture 502.

In some implementations, one or two mechanical-energy storage units 102 may be installed at a residence to provide backup power in case of a power outage, to store electricity generated using residential solar panels, or to offset unevenness of power production and usage (e.g., an electrical utility may control the mechanical-energy storage unit 102 at a residence to address the balance energy use/production at the residence, nearby residences, or across the power grid). A mechanical-energy storage unit 102 may be buried next to an electrical panel or placed in a shed outside a residence, placed in a garage or utility room, or stored offsite.

In some implementations, multiple mechanical-energy storage units 102 may be coupled together to scale energy backup at a larger facility, such as a business, or by an electrical utility. For instance, many mechanical-energy storage units 102 may be placed at a facility, buried, or otherwise used by an electrical utility. The multiple mechanical-energy storage units 102 may be communicatively linked to each other or to a central server to control storage and distribution of the stored energy (e.g., by controlling the rotational frequency of a flywheel 202 to keep various flywheels 202 at efficient speeds).

Various implementations and features of flywheel energy storage systems (FESS) are described herein. These provide improvements over previous energy storage units including other flywheels 202. For instance, the technology described herein provides an improved flywheel system or assembly, improved bearings, improved flywheel-motor couplings, improved flywheel housing, improved flywheel plates, improved assembly fixture 502, and method for assembly and use, among other improvements, features, and benefits.

For example, a flywheel 202 may include a rotational mass comprising a plurality of stacking plates 122, one or more bolt or clamping plates 120, one or more axle 208 members, and other features. For instance, the technologies described herein include a plurality of plates that have contoured edges based on an associated support structure, which allows increased speeds while reducing failure modes. For instance, the support structure may include clamping plates 120 that apply pressure to the plates, thereby inducing friction between the plates to keep them in place and transfer rotational momentum between the plates and one or more axles 208. In some implementations, two clamping plates 120 may be clamped together by bolts or other fasteners, which thereby cause the clamping plates 120 to apply pressure on stacking plates 122 and increase the friction among the stacking plates 122, which may, in some cases, allow the stacking plates 122 to be used without other fasteners, thereby improving safety and efficiency. Other features and benefits of the flywheel 202 are described below. Not only are the plates improved, but their support structure is improved, among other benefits. Further implementations and features allow the expansion, positioning, and use of the flywheel 202 thereby further improving its performance.

Among other improvements, the technologies described herein also include an improved enclosure 104 and support system, which may include, among other things, a sealed enclosure 104, a lid-mounted vacuum assembly 104, a magnetic coupling 118, various bearings, and positioning mechanisms. The enclosure 104 may include a magnetic assist mechanism that either entirely supports or partially supports the weight of the flywheel 202 (e.g., to reduce wear on bearings). The enclosure 104 may also include a transport surface and a lifting and adjustment mechanism that moves the position of the flywheel 202 internal to the enclosure 104 from a transport or storage position and adjusts it in an active position. The enclosure 104 may provide support for various components, such as a supercapacitor 106, vacuum assembly, processor/controller/central processing unit, a motor 110, and other components. The enclosure 104 may include various features for maintaining a vacuum, holding one or more bearings, positioning a flywheel 202 during use or transport, mitigating damage due to structural failures, and isolating vibration, among other features. For example, the technology may include a hex nut and locking mechanism that may be used to position the flywheel 202 and engage it with bearings, magnetic levitation/assist, or other features of the enclosure 104 while also maintaining a vacuum seal.

The technology also includes a fixture 502 for assembling a flywheel 202 in a balanced, square, and aligned manner, which may include tensioning the support structure or clamping plates 120, among other things. A method for assembly using the assembly fixture 502 is also described.

For instance, the assembly fixture 502 may retain a first and a second axle 208 member in alignment while also vertically positioning and squaring the flywheel plates and other components. For instance, a bottom axle 208b may be placed into the fixture with a bottom clamping plate 120b (also referred to as a star plate). The fixture 502 may be placed into a plate stacking configuration and multiple massive flywheel plates (e.g., 120 and/or 122) may be stacked thereon. A clamping plate 120 and/or axle 208 may be placed on the stack and a top fixture component may be placed onto the fixture, and the top fixture component may exert a clamping force on the stacking plates 122 and/or clamping plates 120 to pre-tension them. The fixture 502 may be moved incrementally into an alignment position to position and align the components of the flywheel 202. Bolts may also be placed in the flywheel assembly 102 to maintain the clamping force. Several innovative features of the assembly fixture 502 and method are described below.

Other benefits and features are described throughout this disclosure, but it should be noted that other features and benefits are contemplated. Furthermore, while various implementations are described in reference to the figures, these are provided by way of example and their features may be expanded, modified, or removed. For instance, features described in reference to some implementations may additionally or be used with other implementations.

With reference to the figures, reference numbers may be used to refer to components found in any of the figures, regardless of whether those reference numbers are shown in the figure being described. Further, where a reference number includes a letter referring to one of multiple similar components (e.g., component 000a, 000b, and 000n), the reference number may be used without the letter to refer to one or all of the similar components.

The innovative technology disclosed in this document also provides novel advantages including the ability to integrate modern technology with conventional power infrastructure; enable rapid transition to renewable energy sources; use the power grid as a backup; store power locally in nodes and regionalized storage clusters of nodes; isolate and minimize the impact of power outages; whether caused by natural disasters, infrastructure failure, or other factors; provide affordable alternatives to expensive and environmentally unfriendly electrochemical batteries; provide consumers the option to be independent from carbon-based power sources; and decentralize electric power production.

Figure 1B:
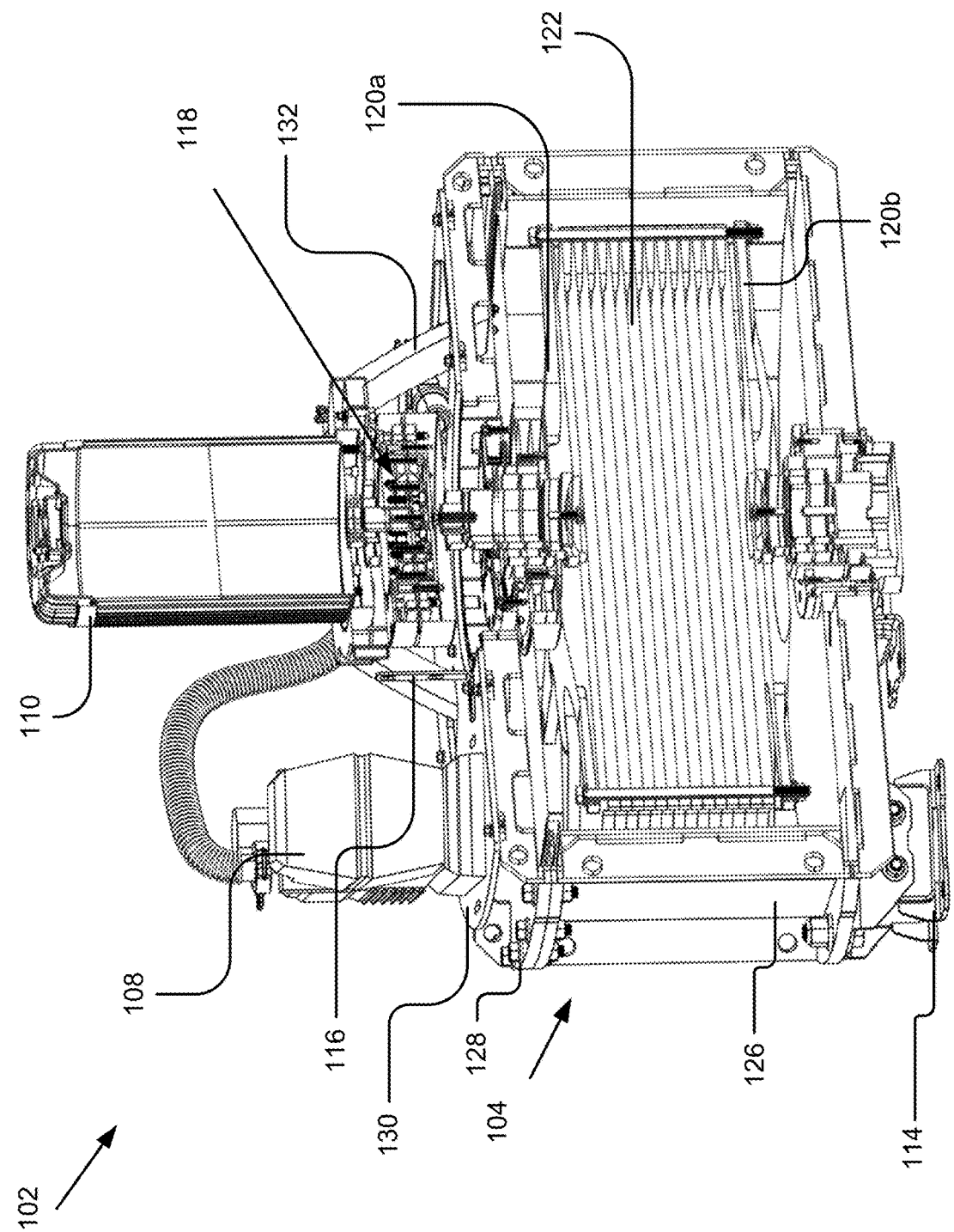
Figure 1C:
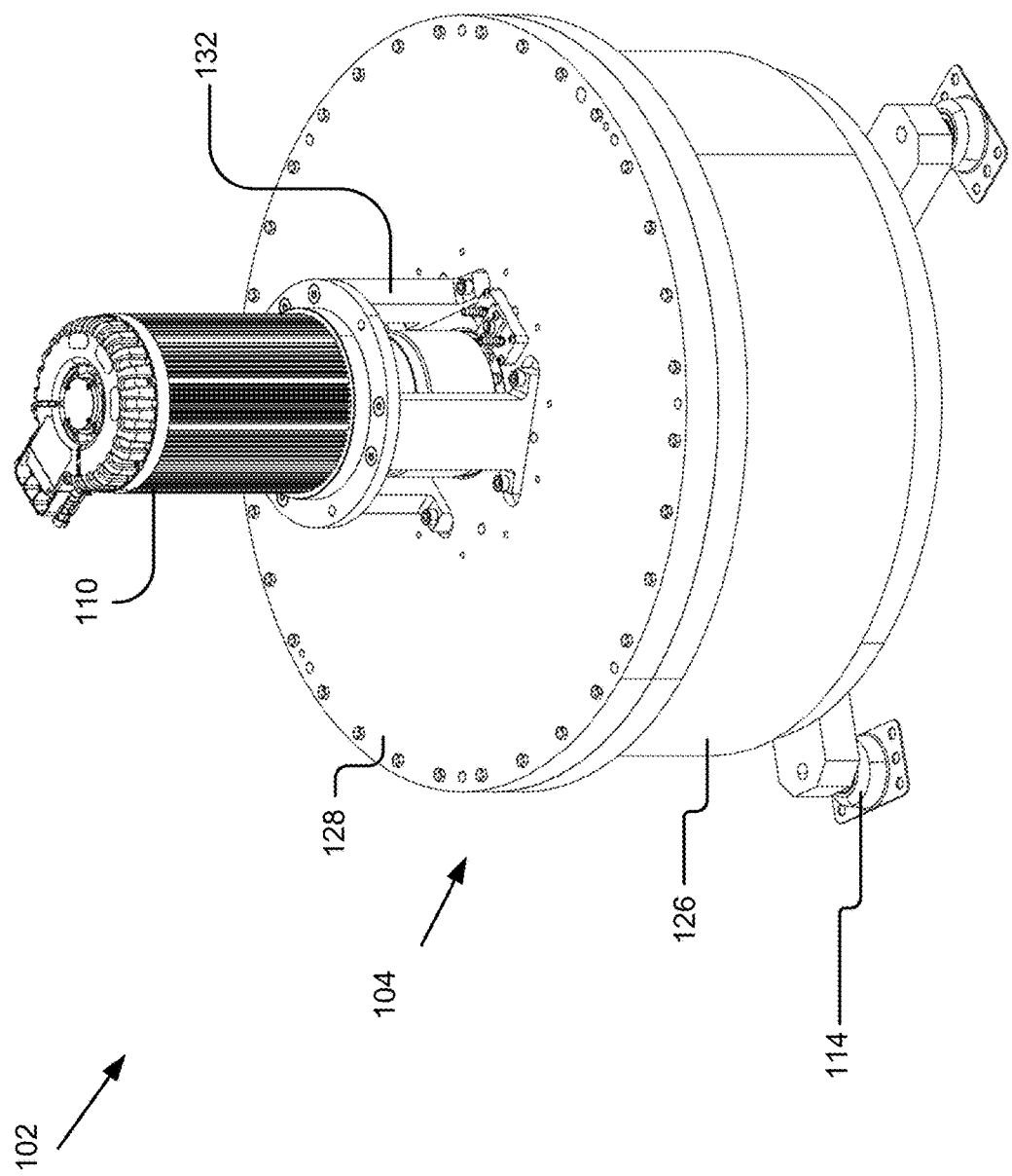
FIG. 1C illustrates an example mechanical-energy storage unit.
Figure 1D:
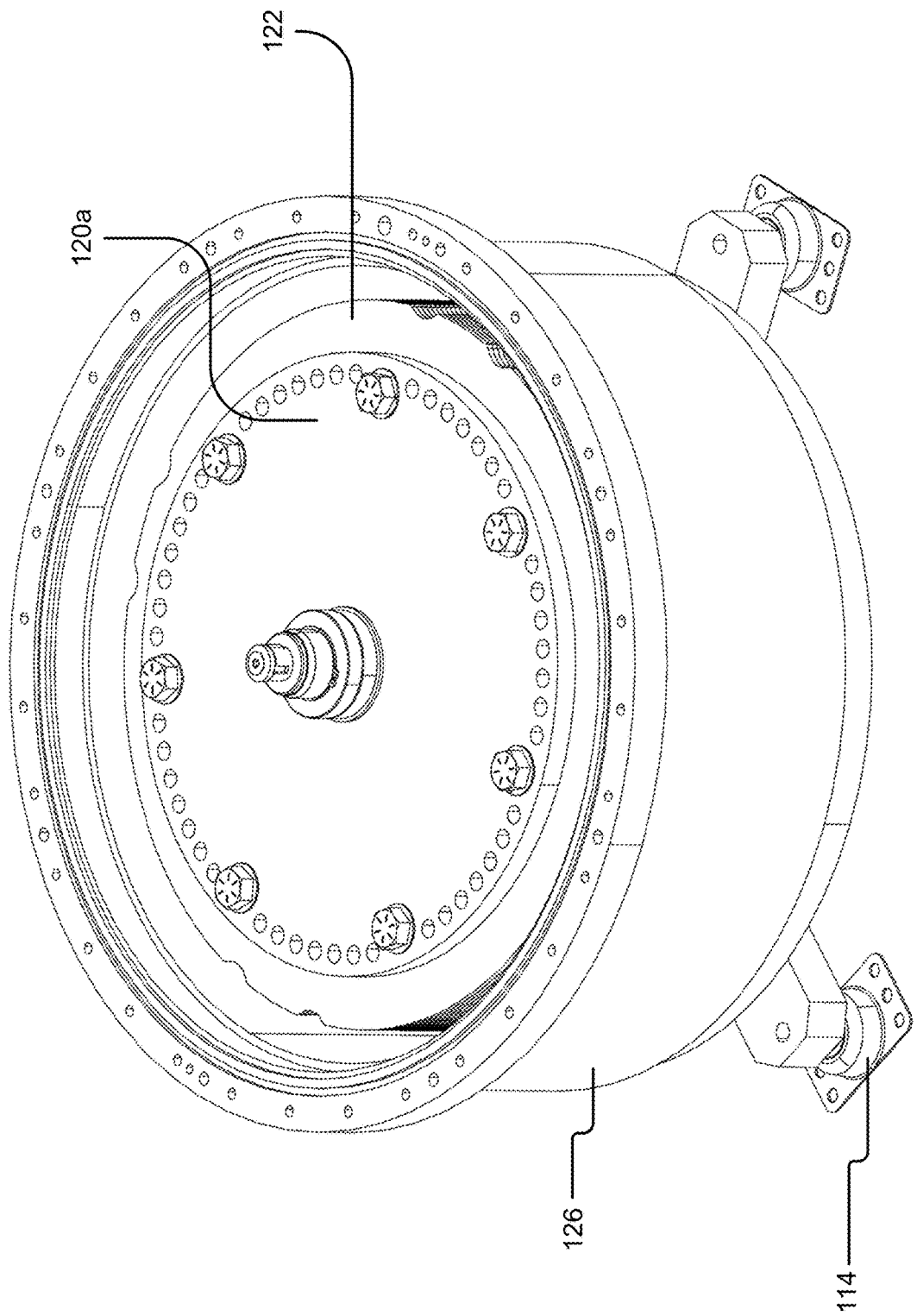
FIG. 1D illustrates an example mechanical-energy storage unit with components omitted to expose a massive flywheel inside an enclosure.

FIGS. 1A-1B illustrate an example mechanical-energy storage unit 102 (MESU 102) or flywheel assembly 102 from various angles and views. For example, FIG. 1A illustrates a front-top view, FIG. 1B illustrates a cross section view, FIG. 1C illustrates a front-top view of another example MESU 102 or flywheel assembly 102, and FIG. 1D illustrates a front-top view with an enclosure lid 128 removed to show a flywheel 202 inside a flywheel enclosure 104 of an example MESU 102 assembly.

The improved flywheel assembly 102 may be a mechanical-energy storage unit 102 with configurations and features that improve manufacturability while also providing redundancy, safety, and reliability that allow the flywheel assembly 102 to provide years of safe and relatively maintenance free operation in ways that were not previously possible, for example, as noted in the Background and elsewhere herein. Although various configurations are possible and contemplated, the illustrated example flywheel assembly 102 may include a vacuum enclosure 104 and support structure, a massive rotating flywheel 202 (not visible in FIG. 1A) internal to the enclosure 104, a motor-generator 110 that may be fully or partially external to the enclosure 104 and coupled with the flywheel 202, a supercapacitor 106, driver(s) and/or CPUs, inverter(s), circuit breakers, a vacuum pump 108, and various other components, as described below, although other implementations are possible and contemplated herein.

The example flywheel assembly 102 may include, among other things, an enclosure 104 that is scalable to provide a vacuum, support to the flywheel 202, a mounting structure for various components of the assembly, and protection against mechanical failure, among other things. The example vacuum enclosure 104 for the flywheel 202 may be configured as a vacuum assembly case with reinforcement including features for coupling the flywheel 202 with the case, an improved shape, and an ability to adjust the flywheel 202 through the case. In some instances, a connection for creating and/or maintaining a vacuum may also be included with the case. Example implementations and features of the enclosure 104 may be described in further detail in reference to FIGS. 5A-5E, although other implementations are possible and contemplated herein.

The flywheel enclosure 104 may be mounted and/or isolated from a mounting structure by one or more feet 114 or legs, as noted below, and may include mounting structures for accommodating various components of the assembly. For example, a supercapacitor 106 may be mounted to a support structure of or attached to the enclosure 104, which supercapacitor 106 may buffer energy entering/exiting the flywheel 202, for instance, by assisting the motor 110 to spin the flywheel 202 up or receive energy therefrom.

Also, as described below, the enclosure 104 may provide mounting points or structures for mounting a motor-generator 110 in line with the axis of rotation of the flywheel 202, although, in other implementations gears may be used to couple the motor-generator 110 with the flywheel 202. The motor-generator 110 may be coupled with the flywheel 202 via one or more axle 208 components and, in some instances, a magnetic coupling 118 that allows a flywheel axle(s) 208 to remain physically decoupled from a motor-generator 110 rotor while still providing force to pass between them, as described below. The motor-generator 110 may have an electrical connection to a supercapacitor 106, inverter, driver, CPU, external grid connection or otherwise, which allows electrical current to flow into the motor-generator 110 to spin up the flywheel 202 or out of the motor-generator 110 to receive stored potential energy from the flywheel 202.

The motor-generator 110 may have various configurations, as noted in further detail elsewhere herein. In some implementations, the motor-generator 110 may be an electrical-vehicle motor or other motor (e.g., a Hyper 9™ motor), such as a brushless alternating current motor (e.g., a 3 phase AC synchronous reluctance internal permanent magnet motor) that can free-wheel in order to allow the flywheel 202 to store power for a longer period of time. The motor size and configuration may vary depending on peak output/input and flywheel 202 size/speed requirements. For instance, a smaller, residential MESU 102 may include a smaller size flywheel 202 with a 30-40 KW motor while a larger, commercial (e.g., for a store, electrical utility, subdivision, etc.) may have a 300-500 kW motor, although other implementations are possible. The motor controller and/or CPU may be the same for various sizes of flywheels 202 or may vary depending on the implementation.

The motor-generator 110 may be coupled with the flywheel 202 using an axle 208 and bearing of the flywheel 202/flywheel enclosure 104. Similarly, in some implementations, the flywheel axle 208 and motor-generator 110 may be coupled using a flywheel 202 motor coupling, which may include a direct connection, magnetic coupling 118, friction clutch, torque converter, gearbox, or otherwise.

An example flywheel 202 (not visible in FIG. 1A) may be housed in and/or supported by the enclosure 104 and components thereof. Example flywheels 202 and features thereof are described throughout this disclosure, for example, in reference to FIGS. 1B, 1D, and 2A-4B. For example, a flywheel 202 may include a plurality of stacking plates 122 held together by a support structure, such as clamping plates 120 (e.g., using compression and friction). The support structure may include one or more axles 208 that attach thereto and provide support to the flywheel 202. As described in further detail elsewhere herein, the configuration of the support structure and axles 208 may allow flywheel plates to be used without the axle 208 perforating the plates. Depending on the implementation, the axle(s) 208 may be vertically and/or horizontally supported by other components or the flywheel enclosure 104 and may couple with a motor-generator 110 (e.g., as noted above).

For example, an axle 208 may interact with one or more bearings, whether magnetic, metal, ceramic, etc., of the enclosure 104, to allow the flywheel 202 to spin about an axis formed by the axle 208. The enclosure 104 may include or couple with one or more bearings that support the flywheel 202 horizontally to keep it spinning with little-to-no vibration, as described below.

Additionally, one or more bearings may support the axle(s) 208 and/or flywheel 202 vertically within the enclosure 104. For instance, a bottom bearing may hold the bottom of the flywheel 202 and/or a top bearing may hold the top of the flywheel 202, for example, inside the enclosure 104. In some implementations, a magnetic lift assistance member or magnetic levitation device may be used to reduce the friction or pressure, for example, on one or more of the bearings. For instance, a magnetic levitation device may be disposed at a bottom of the flywheel 202 to apply upward force thereon thereby limiting the force due to gravity on a bottom bearing and/or balancing force between a top and bottom bearing. In some implementations, a magnetic lift assistance member may be positioned at a top of the flywheel 202/enclosure 104 to pull the enclosure 104 upward, thereby decreasing the force due to gravity on a bottom bearing(s). As noted in further detail elsewhere herein, the magnetic lift assistance member may lift less then, exactly, or greater than the weight of the flywheel 202 so that there is some, little, or no weight on the bottom and/or top bearing(s).

The amount of weight held by magnets of the magnetic lift assistance member may be adjusted based on a distance from the magnets, as described elsewhere herein. For instance, the enclosure 104 may include or may be coupled with one or more flywheel 202 positioning components that may adjust the position of the flywheel 202, for example, to ensure that a correct distance between the flywheel 202 and magnetic lift assist mechanism, top bearing, bottom bearing, or other component of the assembly. For instance, a flywheel 202 positioning component may move the flywheel 202 (e.g., inside the enclosure 104) from a shipping position to an engaged position where it is in a correct position relative to the bearing(s) to minimize bearing wear and friction.

It should be noted that although the enclosure 104 is illustrated as fully enclosed, including reinforcements, welds, seals/O-rings, etc., that allow a vacuum to be maintained inside the enclosure 104 with the flywheel 202; however, it should be noted that other implementations are possible and contemplated herein, such as where the enclosure 104 is fully or partially open.

In some implementations, the flywheel assembly 102 may include various components mounted to the enclosure 104 (e.g., via a lid 128 assembly mounting plate or bracket) that support the operation of the flywheel 202. For instance, the flywheel assembly 102 may include a supercapacitor 106, motor-generator 110 (and associated mounting hardware), driver and CPU/controller 112, vacuum pump 108, various inverters, wiring harnesses, circuit breakers, and other equipment, although other implementations are possible and contemplated herein.

As illustrated in the examples of FIGS. 1A-1D, a flywheel enclosure 104 may be round with a flat bottom and top and various reinforcing ridges, which configuration may provide strength to the enclosure 104 to prevent buckling due to an internal vacuum while also preventing external damage in case of a mechanical failure of the flywheel 202. It should be noted that the enclosure 104 may be square, hexagonal, etc. It may have rounded (e.g., as illustrated in FIG. 1D) or flat sides (e.g., as illustrated in FIG. 1A). As illustrated in FIG. 1A, a mounting plate may be positioned on top of the enclosure 104 components mounted thereto, as described in further detail below.

In some implementations, as illustrated in the examples, the flywheel assembly 102 may include one or more (e.g., 3 and 4 arms are illustrated) motor mounts that couple with a lid 128 of the flywheel enclosure 104 and extend upward to support a motor mount brace 132, which may comprise a ring that holds the motor-generator 110 in alignment with an axis of rotation of the flywheel 202. In some instances, the motor mount braces 132 may include linear actuators that lift the motor-generator 110 vertically in order to decouple the motor-flywheel 202 coupling, such as the magnetic coupling 118 described in further detail below. The flywheel assembly 102 may include a lid assembly mounting plate(s) 130 that couple with top ribs or other structures of the enclosure 104 and provide mounting points for the various components of the flywheel assembly 102. In some instances, the lid 128 or lid assembly mounting plate(s) 130 may have various perforations that allow the motor mount braces 132, axles 208, motor-flywheel 202 coupling, vacuum pump 108 connection and other components to pass therethrough. Accordingly, the components may be securely mounted to mounting plate, lid 128, enclosure 104, or otherwise (e.g., as illustrated in the example figure) in order to speed assembly and improve stability.

As shown in the example of FIG. 1A, the enclosure 104 may have a plurality of reinforcing structures, such as ribs, rings, etc.

The enclosure 104 may also include one or more feet 114 or other supports that provide support to the ribs (e.g., the side or bottom ribs) or other structures (e.g., a bottom plate) of the enclosure 104 to secure the flywheel assembly 102, support the weight of the flywheel 202, and/or isolate the flywheel 202's movement/vibration; although, it should be noted that vibration is ideally limited by balancing the flywheel 202 and acceleration, temperature, or other sensors may be located in the bearings, axles 208, enclosure 104, or other components.

FIG. 1B illustrates an example cross section view of the flywheel assembly 102. For instance, as shown in the figure, a flywheel 202 having a number of stacking plates 122 and a top and bottom axle 208b is located inside an enclosure 104. The bottom axle 208b of the flywheel 202 is shown interacting with bottom bearings that support the flywheel 202 horizontally and/or vertically. The top axle 208a of the flywheel 202 is shown passing through a magnetic lift member and into a magnetic coupling 118, which couples the axle 208 with a stator (directly or via other components, axles 208, drive shafts, gears, etc.) with the motor-generator 110, which is held vertically above the axle 208 using the motor braces 132. Additionally, as noted elsewhere herein, various sensors may be located throughout the assembly, such as the RPM sensor mount 116 that is located adjacent to the magnetic coupling 118, as well as various temperature, acceleration, etc., sensors that may be positioned adjacent to the motor 110, bearings, and other components of the assembly. These and other implementations and features are described in further detail below.

FIG. 1C illustrates another example MESU 102 or flywheel assembly 102 with a different implementation of the enclosure 104. As illustrated, an enclosure 104 may be a cylindrical enclosure with a base tub 126 and a lid 128. The enclosure 104 may also include one or more feet 114 (e.g., three are illustrated in FIG. 1C) or legs support the flywheel assembly 102. A foot 114 may include a bushing or other component that isolates vibrations, bolt holes to bolt the flywheel assembly 102 to a floor or other location.

In the depicted example, the motor-generator 110 may be mounted higher on motor mount braces 132 and/or base than the example of FIG. 1A, for example, to allow access to mount or remove the motor-generator 110, magnetic coupling 118, bearings, or other components. Additionally, while the other components illustrated in FIG. 1A are not shown in FIG. 1C, they may also be mounted to the lid 128 or another location of the flywheel assembly 102. For instance, a vacuum pump 108, supercapacitor 106, chemical battery, driver, CPU, etc., may be mounted to the lid 128, tub 126, other portion of the flywheel assembly 102, or otherwise.

FIG. 1D illustrates the example flywheel assembly 102 of FIG. 1C with the lid 128 and other components omitted to show an example massive flywheel 202 inside the enclosure 104. As shown, the flywheel 202 may be positioned at a center of the enclosure 104, although other implementations are possible. As illustrated in the example of FIG. 1D, a flywheel 202 may include one or more clamping plates 120 (the top clamping plate 120a is shown), one or more stacking plates 122, one or more bolts holding the clamping plates 120 together and/or to the stacking plates 122, and one or more axles 208. These and other features and implementations are described in further detail elsewhere herein.

FIGS. 2A-4B illustrate an example flywheel 202 and various components, views, and constructions thereof. There are a number of innovative features in the flywheel 202. For example, the flywheel 202 may include flywheel plates that are coupled together using friction, which may be performed in addition to or in lieu of other connections, such as adhesive, welding, or otherwise. Some implementations of the flywheel 202 include bolts through components while others do not include bolts through components. Similarly, some implementations of the flywheel 202 include two separate axles 208-a top axle 208a and a bottom axle 208b. For instance, while previous flywheels 202 may include bolts attaching each of their components together, some implementations of the flywheel 202 herein may separate the axle 208 and/or use a clamping force from clamping plates 120 (and/or axles 208) to increase friction between the stacking plates 122 themselves, which may improve manufacturing and reduce points of failure when the flywheel 202 is spinning at high speeds.

In some implementations, clamping plates 120 may be used on the top and bottom of the flywheel 202 to support the flywheel 202, for example, by coupling the stacking flywheel plates together and/or to axles 208. A top clamping plate 120a and a bottom clamping plate 120b may be drawn together by bolts at or near its peripheral edge (e.g., as illustrated in FIGS. 2A-3B), which applies pressure inward on the stacking plates 122 in an axial direction thereby increasing friction. The friction allows rotational force to be transferred through the stacking plates 122 while also preventing them from moving out of alignment, which may throw the balance of the flywheel 202 off.

Depending on the implementation, the clamping force from the clamping plates 120 may be applied to the stacking plates 122 directly (e.g., by direct contact between the clamping plates 120 or stacking plates 122) or via other components, such as a portion of an axle 208 or other contact points. For example, a clamping plate 120 may apply force to a center of the stacking plates 122 via a top and bottom axle 208b (and/or washer(s), bushings at a peripheral edge, or otherwise).

In some implementations, the clamping plates 120 may be less massive than the stacking plates 122, so each type of plate may expand (and, potentially, become thinner) differently, especially at the peripheral edge. Accordingly, in some instances, bushings or other components may allow the stacking plates 122 to move relative to the clamping plates 120 while the clamping force is continuously applied.

The clamping plates 120 may have various contours and configurations to allow them to provide clamping force and other functionality. In some implementations, the stacking plates 122 may be configured differently from the clamping plates 120 and their function is primarily to add rotational mass to the flywheel 202 in order to store energy. The stacking plates 122 may be massive plates that are substantially round or may include various contours based on interaction with the clamping plates 120 or an assembly fixture 502, as described in further detail elsewhere herein.

Figure 2A:
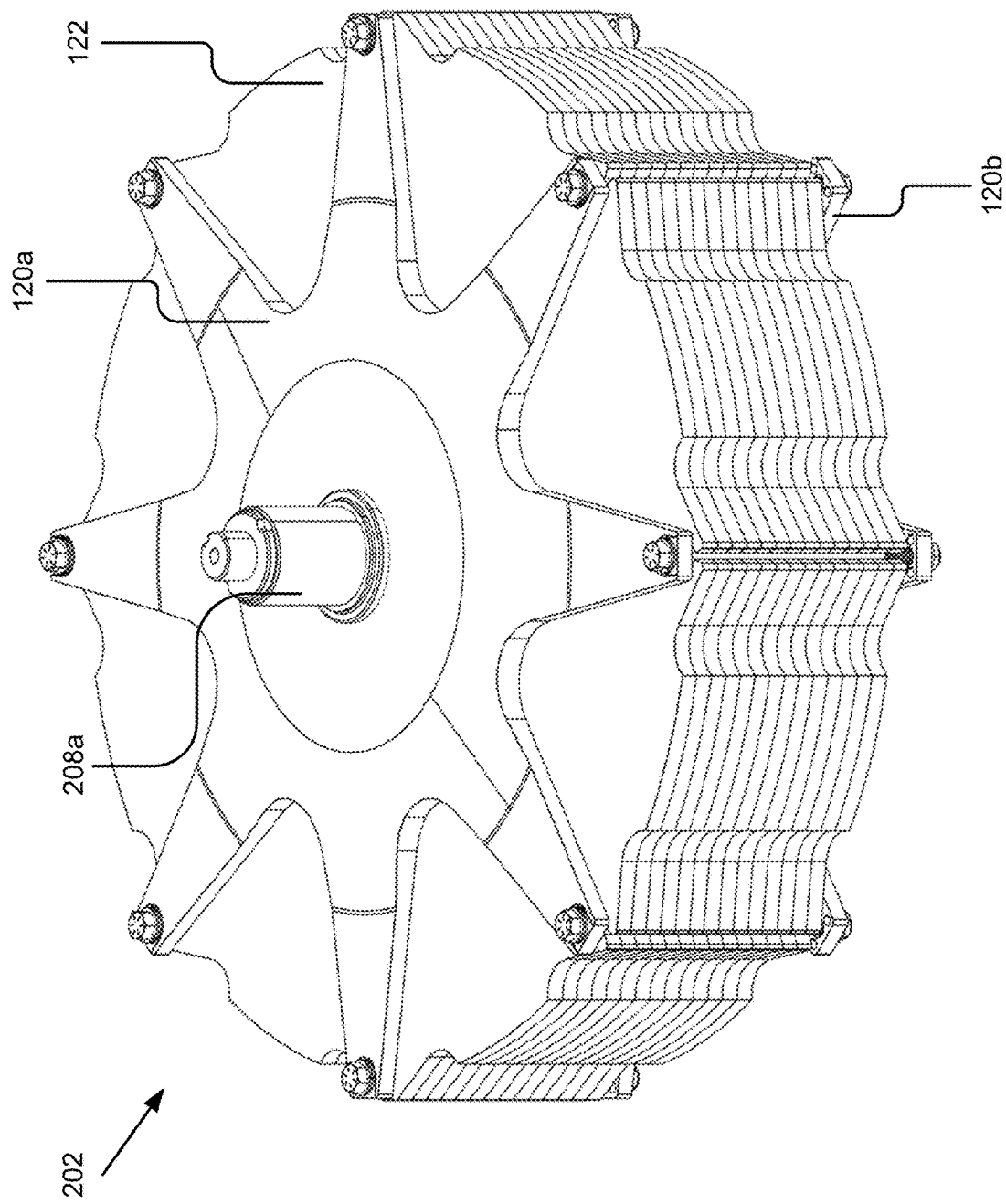
FIGS. 2A and 2B illustrate views of an example flywheel.
Figure 2B:
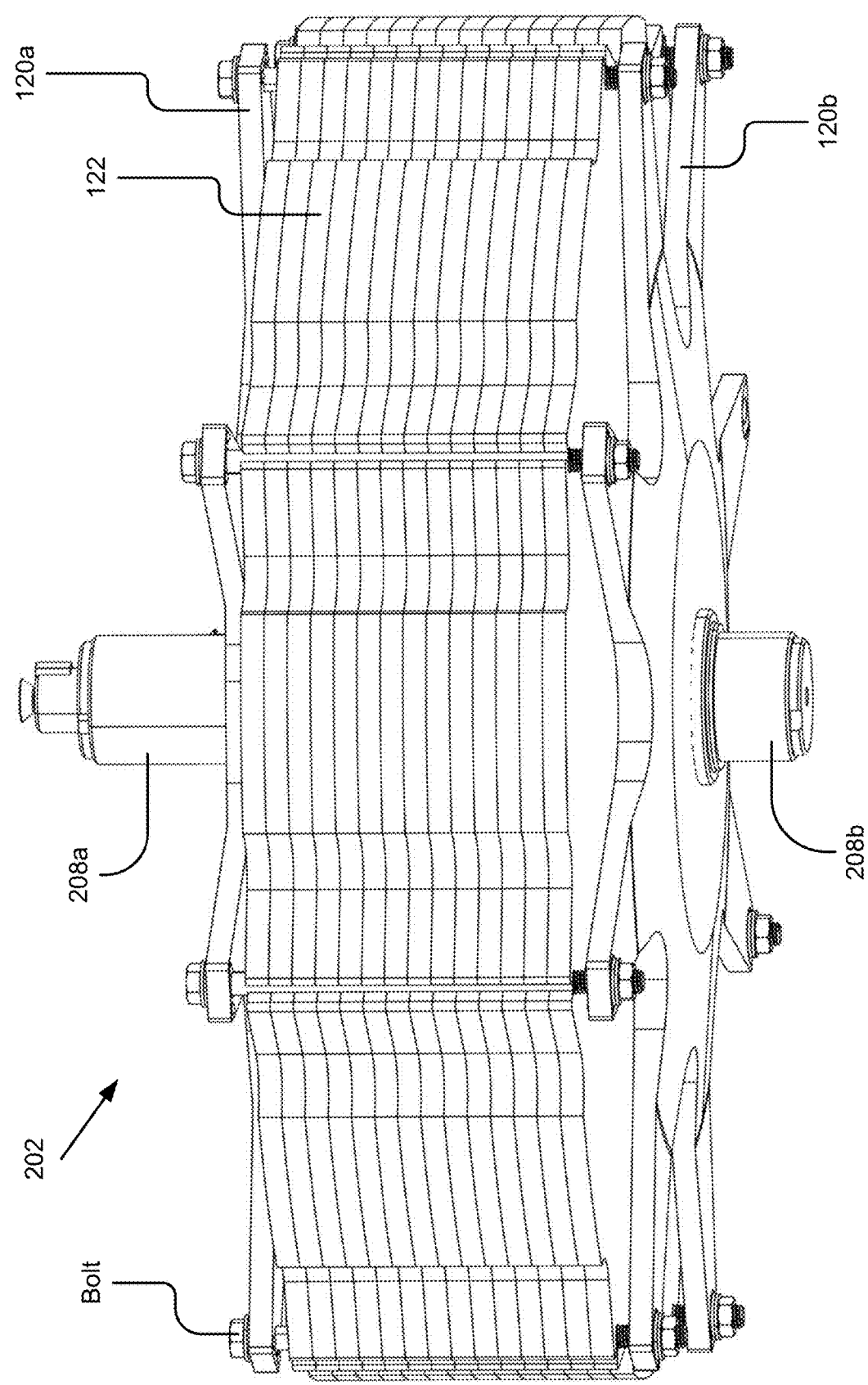

FIG. 2A illustrates a side-top view of the example flywheel 202 and FIG. 2B illustrates a side-bottom view of the example flywheel 202. As illustrated, the stacking plates 122 may be continuously stacked with their faces touching each other to minimize space consumed and flex while increasing friction. Fourteen stacking plates 122 are illustrated, although other implementations are possible and contemplated herein. As illustrated, there may be a space between one or both of the clamping plates 120 and the stacking plates 122. Although this space is illustrated as being relatively large and uniform, it may be smaller. For instance, there may be only a few millimeters between the bottom clamping plate 120b and the bottom-most stacking plate 122, which space may vary based on clamping force applied and flex of the clamping plate 120.

As illustrated in the example flywheel 202 of FIG. 2B, a bottom axle 208b may be coupled with a bottom clamping plate 120b. The bottom clamping plate 120b then interacts with a bottom flywheel stacking plate 122 (e.g., via bushings, an axle washer, a portion of the axle 208, etc.). Various quantities of stacking flywheel plates may be stacked together depending on desired energy capacity, as noted elsewhere herein. Similarly, a top clamping plate 120a may interact with a top-most flywheel stacking plate 122 (e.g., via bushings, axle washer, etc.). The top clamping plate 120a may be coupled with a top axle 208a. In other implementations, a bottom face of the top clamping plate 120a may rest directly against the top face of the top-most stacking plate 122.

In some implementations, each of the stacking plates 122 may be identical, and each of the clamping plates 120 may be identical, although other implementations (e.g., sizes, configurations, etc.) are possible and contemplated, as noted below. Similarly, the top and bottom axle 208b may be the same or different (e.g., having a different length, interacting with different bearings or configurations, as illustrated herein.

As illustrated, when assembled, the clamping plates 120 of the flywheel 202 may align with the stacking plates 122. In some implementations, a clamping plate 120 may have a star shape (e.g., as illustrated in FIGS. 2A and 2B) where the tip of each arm or branch of the clamping plate 120 has a bolt hole that receives a bolt for clamping the clamping plates 120 together. In some implementations, a clamping plate 120 may have another shape (e.g., as illustrated in FIGS. 2D and 2E) including one or more perforations proximate to a peripheral edge.

Similarly, the configuration of the stacking plates 122 may be based on the shape (e.g., the position and quantity of branches of the clamping plate 120), as described in further detail below. For instance, bolt points of the stacking plates 122 may correspond to bolt points of the clamping plates 120 whether or not, as illustrated in the example of FIGS. 2A-2C, the stacking plates 122 do not contact the bolts.

Although not visible in FIGS. 2A and 2B, in some implementations, various mechanisms may be used at the axle-to-clamping-plate interface to keep the axle 208 and clamping plate 120 mechanically connected, so that rotational force may be transferred between them. For instance, the hole in the clamping plate 120 that accepts a portion of the axle 208 may have an oval shape or a flat area (e.g., to be shaped like a D, whether the flat area is large or small), which may prevent them from twisting relative to one another. For instance, a small flat area is provided or there is an oval shape at the interface, stress risers may be reduced in the plates, which may be particularly beneficial at higher rotations per minute. For example, in some implementations, rather than being bolted through or having a square or other shape with large protrusions, which may increase stress in the flywheel 202, especially where the flywheel 202 is massive or spinning at a high rate, the clamping plate 120 to axle 208 interface may be shaped to induce very little stress into the axle 208 or clamping plate 120 while allowing torque to be transferred.

Figure 2C:
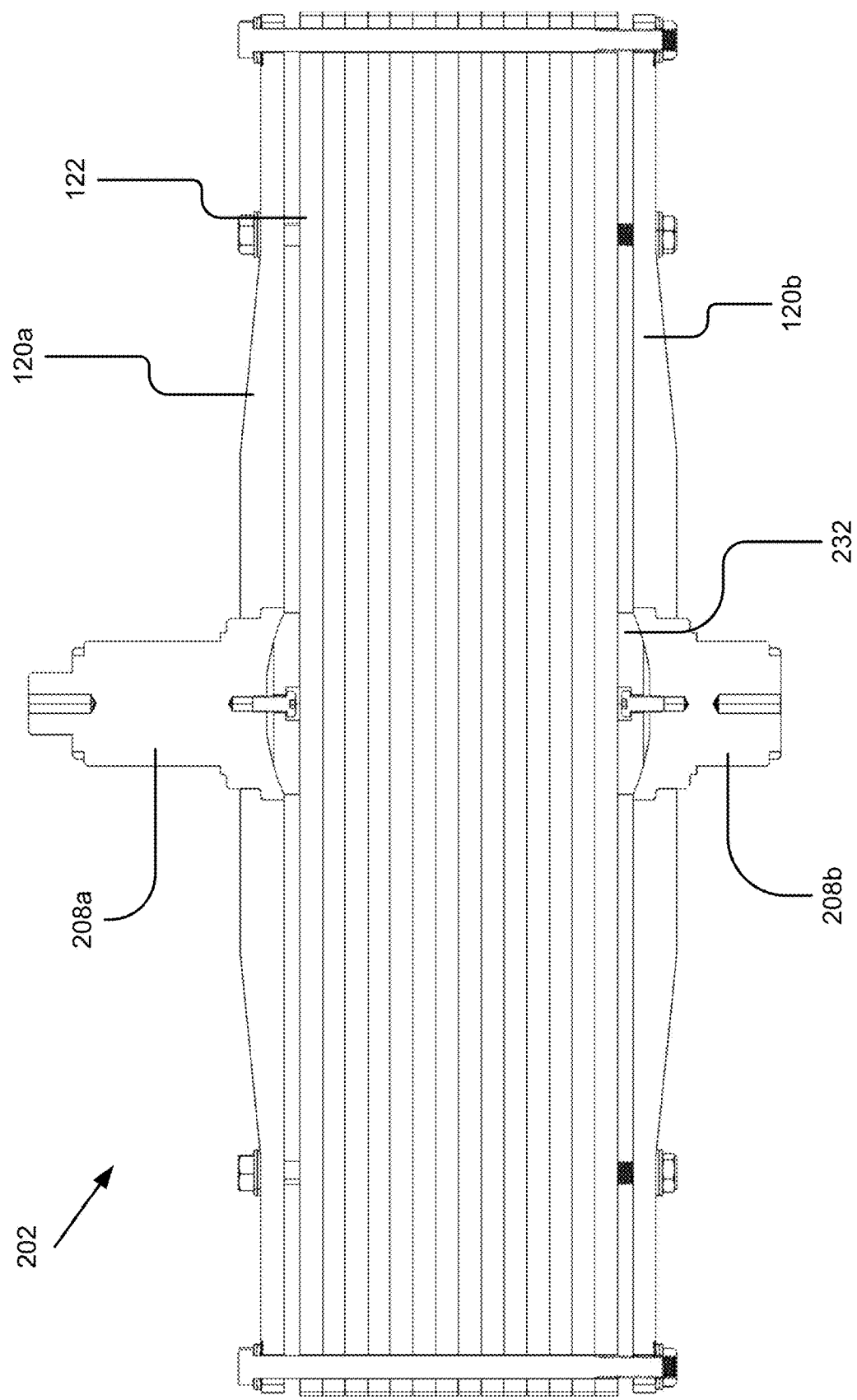
FIG. 2C illustrates a cross sectional view of an example flywheel.
Figure 2D:
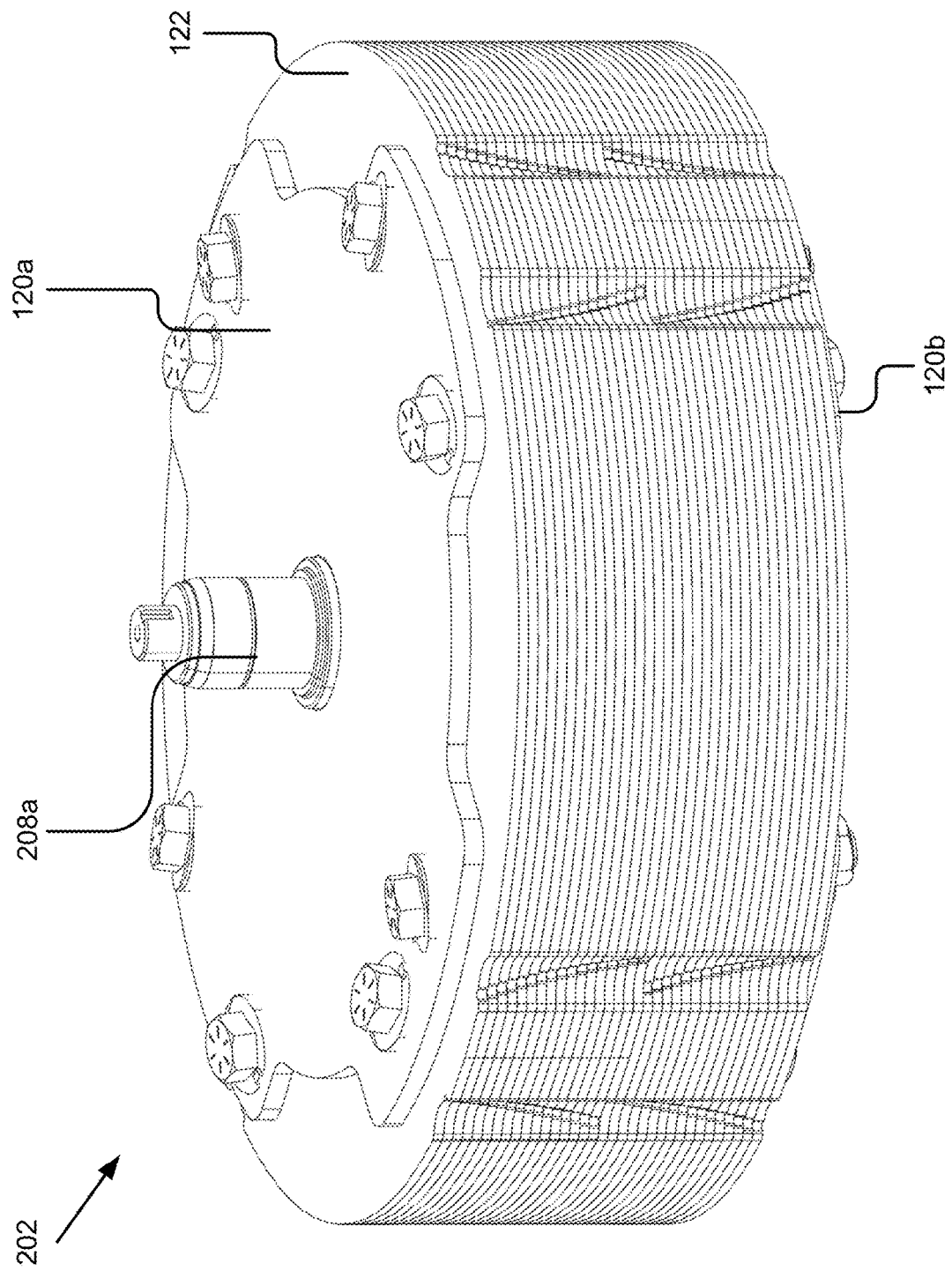
FIGS. 2D and 2E illustrate side-top views of example flywheels.
Figure 2E:
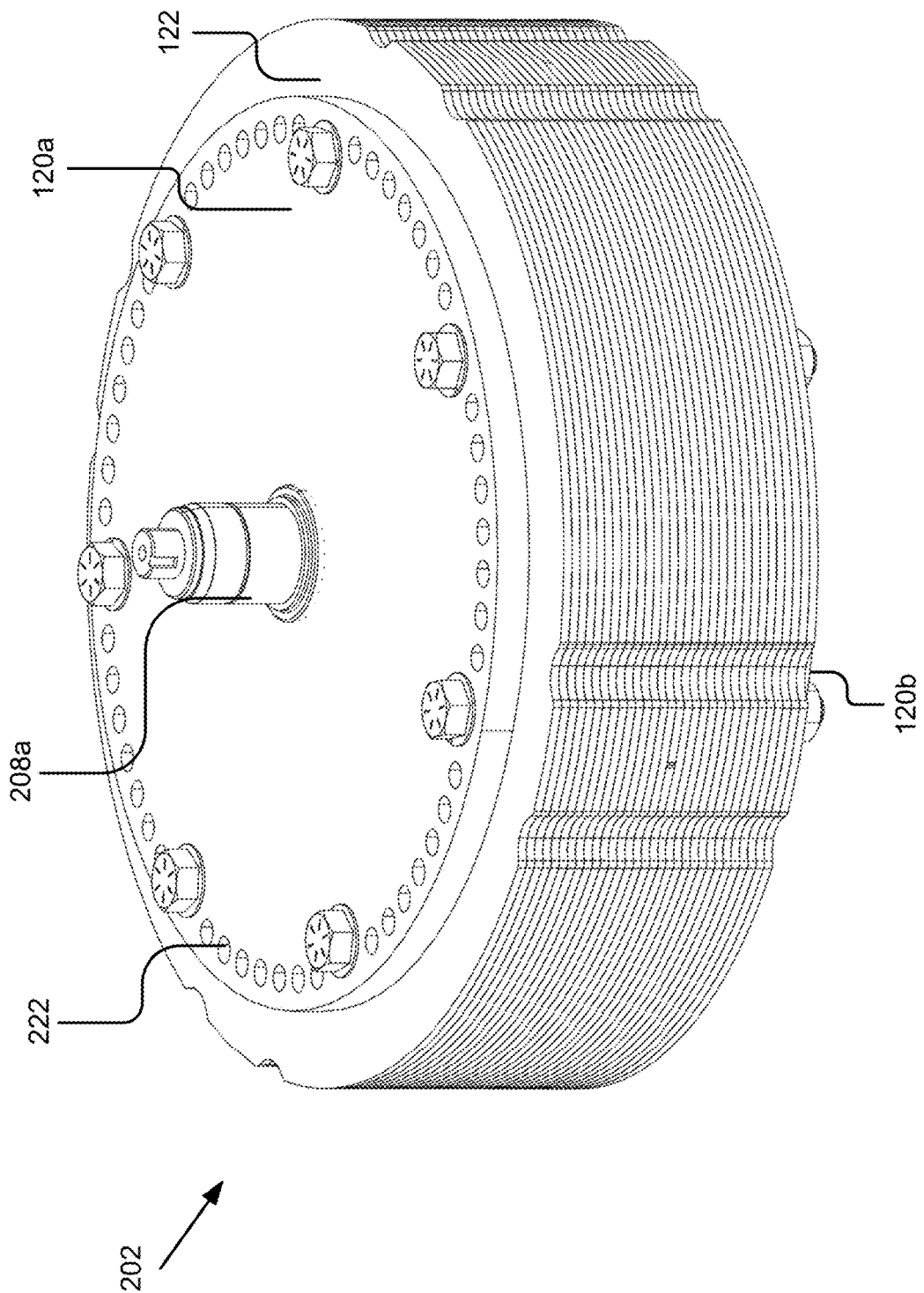

FIG. 2C illustrates a cross sectional view of an example multi-part flywheel 202. As illustrated in the example implementation, a top clamping plate 120a may be connected with a top axle 208a. For instance, a top axle 208a may pass through the top clamping plate 120a so that the top clamping plate 120a may apply downward force on the axle 208. In some implementations, the axle 208 may include multiple parts, such as an axle 208 portion and a washer (e.g., an axle ball washer 232), where the washer (or a bottom portion of the top axle 208a) contacts a top-most stacking plate 122. Accordingly, via the axle 208, the top clamping plate 120a may apply force to the stacking plate(s) 122. It should be noted that other configurations, such as direct contact or contact through another device are possible without departing from the scope of this disclosure. Accordingly, the clamping plate 120 may apply pressure at a center of the stacking plate(s) 122 via the washer and/or axle 208.

Similar to the description of the top axle 208a above, a bottom axle 208b may be coupled to a bottom clamping plate 120b and may apply force to a bottom-most stacking plate 122. It should be noted that other configurations are possible, such as where the contact is direct, where the axles 208 are integrated with the clamping plates 120, where the axles 208 are integrated with one or more stacking plates 122, or otherwise.

Additionally, force may be applied to a periphery (e.g., in an axial direction) or other area of the stacking plate(s) 122. For example, bolts may be tightened down on the clamping plate(s) 120, which apply force to an outer edge of the stacking plates 122. The force may be applied via direct contact between the clamping plates 120 and the stacking plates 122 or via an intermediary device, such as a bushing or washer. In some instances, the clamping plates 120 may flex between the axle(s) 208 and the bolt(s) to provide the pressure. Accordingly, friction can be increased between the stacking plates 122. In some implementations, the stacking plates 122 may be simple, solid plates (e.g., as in FIG. 3A) rather than having perforations for fasteners in the plates, which may reduce strength and introduce stress risers due to centrifugal force, which may lead to increased complexity and failure modes. In other implementations, the stacking plates 122 may have perforations (e.g., as in FIG. 3B) through which bolts may pass, which may increase a radius of the plates, provide simplicity in manufacturing, or increase an inter-plate (e.g., due to friction) force.

As described below, the bolts may be tensioned to varying levels of tension to cause the friction force. Although different configurations are possible and contemplated, the flywheel 202 may include 8 bolts located around or proximate to a peripheral edge. Each bolt may be tightened to provide a defined torque or based on an applied force before the bolts are torqued (e.g., to apply a force of 2600 pounds per bolt), which may cumulatively provide a relatively even clamping and friction force across the stacking plates 122 (e.g., 16,000-21,000 pounds of clamping force).

In addition to their roles in clamping together the clamping plates 120, the bolts may include other features, such as the ability to mitigate failure of one or more stacking plates 122 (e.g., by catching a stacking plate 122 or portion thereof that slips or breaks). In some instances, the bolts may be replaced with other bolts of varying weights to assist in balancing the flywheel 202. Other details and implementations are possible and/or described elsewhere herein.

It should also be noted that the top axle 208a and the bottom axle 208b (e.g., as described in the examples of FIGS. 4A and 4B) should be aligned as perfectly as possible to reduce vibrations and improve alignment with bearings, etc. As described below in reference to FIGS. 5A-12, an assembly fixture 502 and assembly procedure may be used to align the axles 208. Although other implementations are possible, ball washers may be used with the axles 208 to allow some adjustability during assembly to improve alignment. It should be noted that flat washers or no washers (e.g., the axles 208 may be single components instead of broken into an axle body and axle washer) may be used.

In some implementations, an axle-connection region of a clamping plate 120 may connect to an axle 208 in order to transfer force between the clamping plate 120 and the axle 208. The connection may include a step that allows the clamping plate 120 to apply clamping force on the axle 208 (e.g., on a corresponding lip or step thereof), although the axle 208 may be integrated with the clamping plate 120 or the force may simply be applied onto the axle 208 by a bottom edge of the clamping plate 120 (e.g., where no step is included in the implementation). For instance, the axle-connection region of a clamping plate 120 may include a perforation in the clamping plate 120 through which the axle 208, or a portion thereof, may pass. For example, an axle washer may be coupled with the axle 208 at the step, or a portion of the axle 208 itself may interact with the step.

In some implementations, the axle 208 connection may include various shapes to the pass through that interact with corresponding shapes of the axle 208. The perforation or a portion thereof may be oval shaped or have a flat or "D" shaped area, key, or other shape that allows torque to be transferred between the stacking plate 122 and the axle 208 (e.g., in addition to the torque that may be applied to the axle 208 by its contact with the top/bottom-most stacking plate 122) without significantly increasing material stress at the connection point. In some implementations, this shape may be applied to the entirety of the perforation or only to a portion or step thereof (e.g., as in the illustrated step). This shape may be small, such as a $1/8^{th}$ inch deviation in diameter or a flat section.

Although other implementations are possible, the axle 208 and perforation diameter may be 3-5 inches. For example, a first (e.g., illustrated at a top of the figure) perforation/axle 208 diameter may be 3.75 inches. A second (e.g., illustrated downward from the first) perforation (e.g., step in the perforation)/axle 208 diameter may be 4.25 inches to allow force to be applied from the first diameter onto the axle 208 and then onto the stacking plates 122. In implementations where the second step/perforation/axle 208 portion are oval shaped, the oval may vary from 4.375 inches to 4.250 inches, for example, although other implementations are possible and contemplated herein.

The top axle 208a may couple with and/or extend through a top clamping plate 120a and a bottom axle 208b may couple with and/or extend through a bottom clamping plate 120b. As a clamping plate 120 may induce friction and transfer force to/from the stacking plates 122. Accordingly, the clamping plates 120 may be designed to apply axial force to the plates without having high stress areas at the periphery where the clamping plates 120 may fail at high speeds. Accordingly, the clamping pressure may be increased and risk due to structural/material failure decreased. Example configurations of the clamping plates 120 are described elsewhere herein.

Additionally, the clamping plate(s) 120 may include a connection area for coupling with the axle(s) 208, which allows the rotational force to be transferred between the plates and the axles 208. For instance, an axle 208 may extend through a clamping plate 120 and have or more shapes or structures that allow rotational, as well as clamping force, to be applied onto the staking plates (e.g., via the axle 208). In some implementations, the axles 208 may have portions, washers, or ball washers that extend beyond an inner edge of the stacking plate 122 to apply force the stacking plates 122. Although the washers are illustrated as being approximately the size of the passthrough in the clamping plates 120, it should be noted that they may be omitted, combined with the axle body, be smaller radius than the passthrough, or be larger than the pass through (e.g., to apply force to the staking plates over a larger area).

As the axles 208 or axle washers contact the stacking plates 122, the application of clamping force by the bolts may cause the arms of the bend slightly and increase the force at the center that is applied by the axles 208/axle washers. The thickness of the axle washer (or similar component) and the configuration of the clamping arms may be such that the distance between the ends of the arms (e.g., to the stacking plates 122) may be minimalized when the plates are clamped. In some implementations, in addition or alternative to the clamping force at the center of the stacking plates 122, the clamping plates 120 may apply clamping force along a peripheral edge of the stacking plates 122.

The clamping plates 120 may be constructed from aluminum, steel, or another material. For instance, the plates may be constructed from a ferromagnetic steel (e.g., AR500 steel plate) and may be stamped, formed, or machined into the desired shapes. Example masses of the clamping plates 120 may be 66-68 pounds when constructed from steel, although other implementations are possible.

FIG. 2D illustrates a side-top view of another example flywheel 202, according to some implementations. In the example of FIG. 2D, the shape of the clamping plates 120 has been modified to be an X shape with two bolt holes proximate to the radial edge of each arm thereof. In the depicted example, the bolts may be angled as they pass from the top clamping plate 120a, through the stacking plates 122, and to the bottom clamping plate 120b. By angling the bolts, rotational forces across the clamping plates 120, stacking plates 122, and axles 208 may be reinforced, which reduces the odds that the plates will move out of alignment when the flywheel 202 is spun up or down though the axle(s) 208.

In the depicted example, the bolts may be angled toward each other or away from each other on alternating arms, which improves uniformity of force (e.g., circumferentially and axially) and rotational balance. For instance, in a first arm, the bolts are angled away from each other at the top plate, while, at a second arm 90 degrees from the first arm, the bolts are angled toward each other at the top plate, which pattern may repeat, as illustrated. Where the top clamping plate 120a and the bottom clamping plate 120b are the same, they may be rotated 90 degrees, so that the holes on each match the angles of the bolts.

In the depicted example of FIG. 2D, the bolts extend through the top and bottom clamping plates 120b and through perforations in the stacking plates 122. In the example implementation where the bolts are angled, the bolts may include wedge shaped washers that allow the force from the bolts to be applied to the clamping plates 120. In some implementations whether with angled or straight (e.g., axial) bolts, the bolts and associated nuts may be tapered to allow them to extend partially into countersunk holes in the clamping plate(s) 120.

In the depicted example of FIG. 2D, the top clamping plate 120a (and potentially the bottom clamping plate 120b) may be substantially flat on its top and bottom surfaces, which allows the it to contact the stacking plates 122 and/or interact with a magnetic lifting component. For example, a very flat top surface of the top plate that interacts with a magnetic lifting component may reduce eddy currents in the top clamping plates 120a caused by rotation relative to the magnetic lifting component.

FIG. 2E illustrates a side-top view of another example flywheel 202, according to some implementations. In the depicted example, the bolts extend axially through perforations 222 in the top clamping plate 120a, the stacking plates 122, and the bottom clamping plate 120b. Depending on the implementation, the stacking plates 122 may have an equal quantity of perforations 222 as the quantity of bolts clamping the clamping plates 120, the clamping plate(s) 120 may include additional perforations 222 proximate to their peripheral edge(s). These additional perforations 222 may be used in balancing the flywheel 202, for instance, by drilling out the holes or adding plugs to the holes. As noted elsewhere herein, there may be a space between one or both of the clamping plates 120 and the stacking plates 122. For instance, the top clamping plate 120a and top stacking plate 122 may lack a space, which may prevent the top clamping plate 120a from flexing, thereby improving its flatness and interaction with a magnetic lift member. In some implementations, there may be a small gap/space between the bottom clamping plate 120b and a bottom-most stacking plate 122, which allows some flex in clamping (e.g., to increase a force at the center/axles 208).

As noted below, in some implementations, the stacking plates 122 (e.g., in any of the examples of FIGS. 2A-2E) may include scallops 310 around a peripheral edge, which may reduce failure points due to radial stress around bolt holes and/or assist with aligning the plates in an assembly fixture 502, as described below.

Figure 3A:
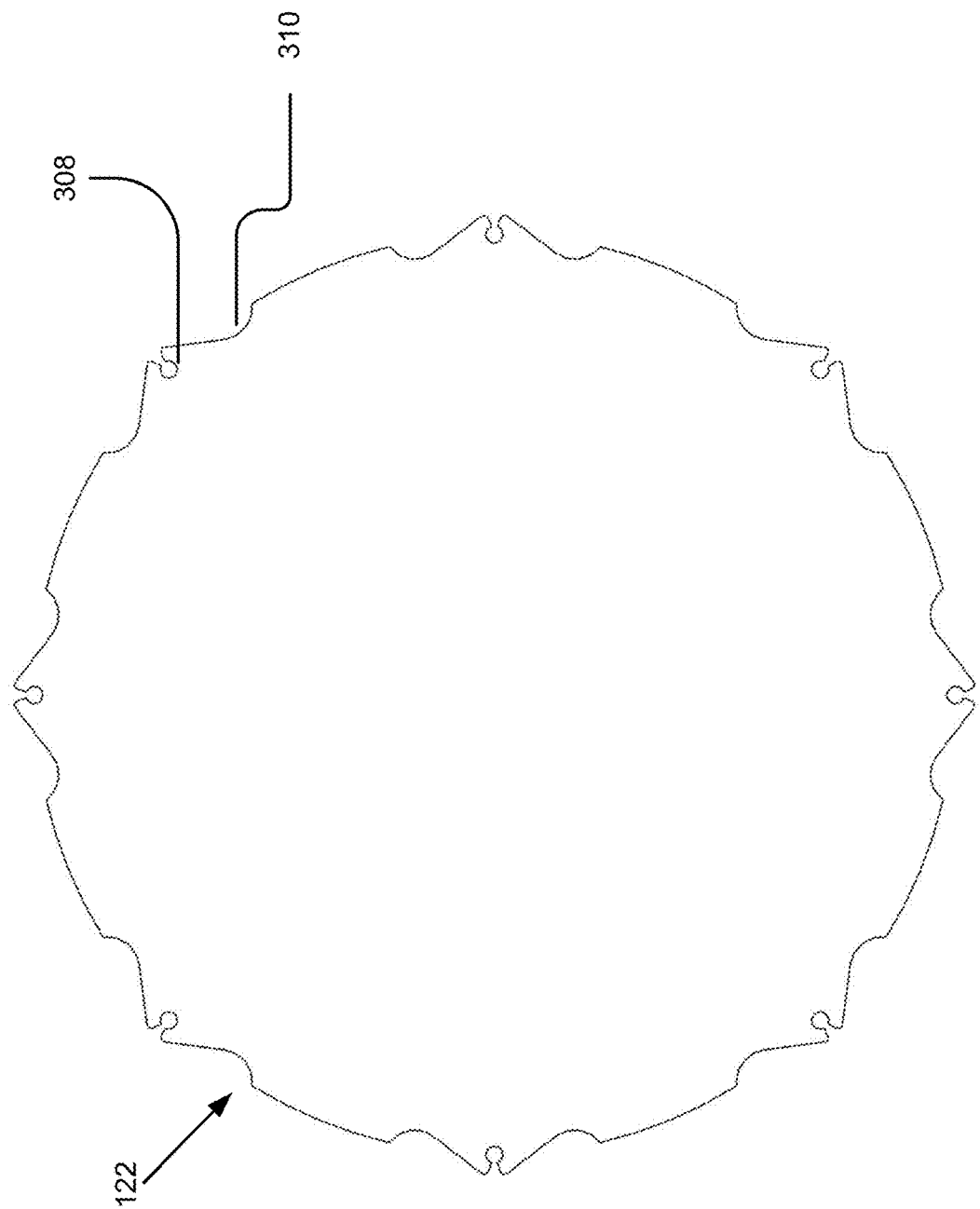

FIGS. 3A and 3B illustrate views of example implementations of flywheel stacking plates 122. The stacking plates 122 may be a flat sheet of metal, such as steel. Although the stacking plates 122 may include contours or perforations 314 (e.g., as in FIG. 3B), in some implementations, they are solid plates without perforations (e.g., as in FIG. 3A or otherwise), which could increase internal stresses when spinning at high rotations per minute. For example, the stacking plates 122 may be 25 to 35 inches in diameter (e.g., an example implementation may be 27.71, 29.25, etc., inches in diameter), although other sizes are possible. The stacking plates 122 may have various thicknesses, such as $1/8^{th}$ inch to 2 inches. For example, a stacking plate 122 may be 0.25, 0.47, 0.5, etc. inches thick. For example, each stacking plate 122 may have a weight of 20-200 pounds (e.g., 47, 94, etc., pounds). Additionally, any number (e.g., 10, 14, 24, etc.) of stacking plates 122 may be stacked without departing from the scope of this disclosure.

The shape and configuration of the stacking plates 122 may be varied depending on the implementation. For instance, a stacking plate 122 may include a clamping portion or location at or proximate to a peripheral edge at which the stacking plates 122 may be clamped (e.g., in addition to or alternative from clamping at the axle 208). For instance, the illustrated example flywheel stacking plate 122 includes a clamping portion/location that is contoured based on a bolt location (e.g., associated with a size/shape of a clamping plate 120).

Although the outer edge of the stacking plate 122, at the clamping location 308, may be flat (or curved based on a radius of curvature of the plate), it may be contoured to increase contact area with a clamping bolt. For instance, where the bolt and/or associated nut has a round top or the bolt couples with the stacking plate 122 via a round washer (as described below), the clamping location 308 may be contoured around the bolt/washer that allow the force and stress to be distributed.

In some implementations, as illustrated in FIG. 3B, the contact area may be around a perforation 314 through the clamping plate(s) 120. In some instances, the clamping plate(s) 120 may have a countersunk region that interacts with a taper in the bolts and/or nuts.

Where the clamping force is applied to the stacking plates 122 via one or more bushings, the clamping location 308 may be contoured based on the force applied by the bushing(s) and to avoid excess stress of the plate(s) at high rotational frequencies. In some implementations, the edge of the stacking plate 122 at the clamping location 308 may extend partially or fully around the bolt, so that the bolt passes therethrough. For example, there may be a ½ inch, 1 inch, or other radius (e.g., 0.55 inches, 2 inches, etc.) contour that extends any distance (e.g., a few degrees to nearly 360 degrees) around the bolt in the stacking plate 122. It should be noted that, depending on the implementation, edges of the stacking plates 122 may or may not contact the clamping bolts. For instance, in order to reduce external stress on the bolts (especially where stacking plates 122 may expand outward at high rotational velocities/frequencies), spacing may be left between a bolt and the edge of the stacking plate 122, so that the stacking plate 122 does not put centrifugal force on the bolt. Similarly, where bolts may flex more than the stacking plates 122, a space may be left radially outward of the bolt to allow it to flex without putting additional stress on the stacking plate(s) 122. In other implementations, the stacking plates 122 may be designed to support outward flex of the bolts (e.g., to reinforce weaker bolts or benefit from stronger stacking plates 122).

In some implementations, a stacking plate 122, as shown in FIGS. 3A and 3B, may include one or more scallops 310 at its peripheral edge that may reduce unsupported regions of the stacking plate 122 that may be more stressed without having sufficient support at high rotational frequencies. For instance, as illustrated in the example of FIG. 3A, the stacking plate 122 may include a scalloped region 310 on both sides of each clamping region. The scalloped region 310 may be gently rounded or contoured to avoid regions of the plate that may be more prone to failure. The scalloped regions 310 may be shaped as partial circles or may have another shape, such as the shape illustrated in the example of FIG. 3A. For example, a finite element analysis may be performed to determine load on various areas of staking plate (or other flywheel 202 components) in order to determine the shape of the scalloped areas 310, for example, based on the configuration of the clamping locations 308.

In some implementations, between the scallops 310, the flywheel 202 may include non-scalloped areas 310 that may be trimmed during balancing of the flywheel 202 (e.g., as noted below) without jeopardizing the structural stability of the plates.

Using the notches, cutouts, and/or scallops 310, can improve an overall safety factor for the flywheel 202 and/or allow it to operate at higher speeds without material failing or pulling outward; although it should be noted, that the plates may flex at high speeds/loads and the flywheel 202 may be engineered to accommodate for the change in shape, as described below.

In some implementations, the scallops 310 are designed to interact with one or more locations of an assembly fixture 502 in order to improve alignment and manufacturability, as described in further detail below (e.g., in reference to FIGS. 5A-7).

In some implementations, the technologies described herein allow a solid plate to be used even without welds, pins extending through the plates, or an axle 208 extending through the stacking plates 122. Accordingly, safety and maximum rotational velocity may be increased while avoiding failure modes or balance issues introduced by these other methods, such as where a pin, axle 208, or weld introduces a weakness that may cause a structural failure.

The example flywheel stacking plate 122 illustrated in FIG. 3B may be used with angled bolts, as illustrated in FIG. 2D. The stacking plates 122 may have holes at various locations, so that they are stacked in order to allow the bolts to be angled therethrough. Similarly, the scallops 310 may include contours 312 that allow more precise alignment using the assembly fixture 502.

Figure 4A:
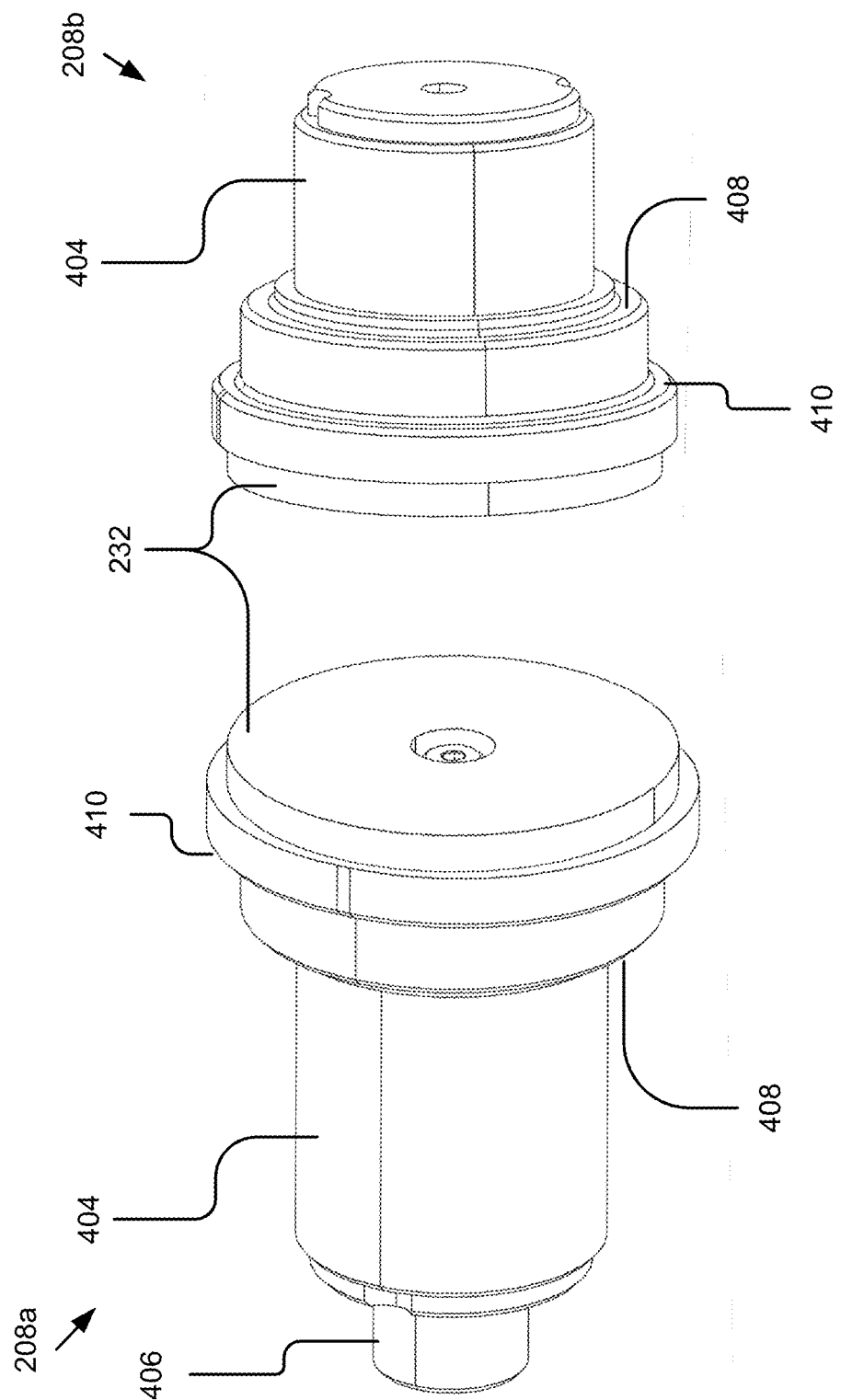
FIGS. 4A and 4B illustrate example flywheel axles.
Figure 4B:
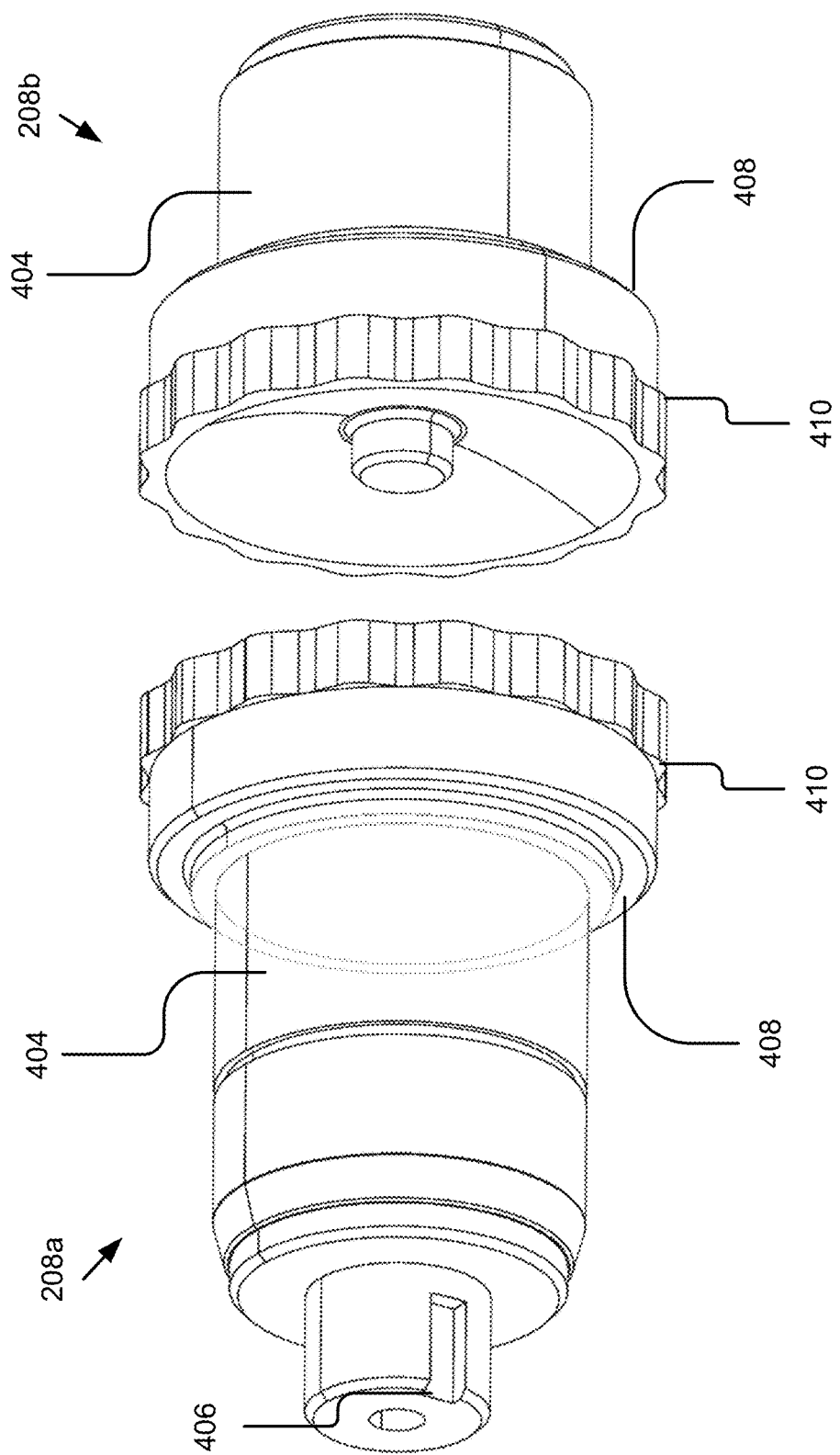

FIGS. 4A and 4B illustrate example flywheel axles 208. Although other sizes and configurations are possible, FIG. 4A illustrates a top and bottom axle 208*b* with ball washers, and FIG. 4B illustrates another example implementation of a top flywheel axle 208 and a bottom flywheel axle 208. Depending on the implementation, the top and bottom axles 208*b* may be identical or have variations, such as their length, whether or not they include washers or axle washers, whether they include a motor connection 406. Some features of the axle 208 are described in reference to a single one of the top and bottom axle 208*b*, but they may be present on both or the other axle 208.

Depending on the implementation, as illustrated in FIGS. 4A and 4B, an axle 208 may include a smooth shaft 404 (e.g., a 50-70 mm diameter shaft 404) portion that interacts horizontally with one or more bearings to keep the flywheel 202 aligned. The shaft 404 may contact one or more seals to maintain the vacuum and may be polished to avoid friction with the seals.

An axle 208 may include one or more bearing shelf(ves)/step(s) 408 that interact with bearings to provide vertical support to the flywheel 202 (e.g., to lift, lower, or hold it vertically).

In some implementations, an axle 208 may include one or more clamping shelf(ves)/step(s) 410 that interact with a clamping plate 120. For instance, the clamping step 410 could be a wider area than the shaft 404 so that the clamping plate 120 applies pressure on the clamping step 410 to hold the axle 208. In some implementations, the axle 208 extends beyond the clamping step 410 and clamping flywheel 202, so that the axle 208 applies pressure to a stacking plate 122, as noted above. The contact with a stacking plate 122 may be via a washer, such as an axle ball washer 232. The clamping step 410 may interact with an edge or corresponding step(s) on a clamping plate 120.

In some implementations, the clamping step 410, an axle washer, or another part of the axle 208 may be shaped to interact with a corresponding shape or structure in a clamping plate 120. For instance, it may include a flat side, oval shape, protrusion, or other structure that allows torque to be transferred between the axle 208 and the clamping plate 120 and/or stacking plates 122 (e.g., where a top or bottom stacking plate 122 includes a shape to match this structure). For example, as noted in further detail above, an oval or small flat side may be used to avoid stress risers in the material (e.g., of the clamping plate 120).

In some implementations, one or both of the axles 208 may include a motor connection 406 that may be a portion or extension of the shaft 404. The motor connection 406 may include a flat, oval, D-shaped, or other structure/shape (e.g., a key or slot) that allows torque to be transferred between the axle 208 and another structure, such as a motor-generator 110 (e.g., via a magnetic coupling 118, as described above. The motor connection 406 may additionally or alternatively include keys or other protrusions that improve the connection between the axle 208 and another structure (e.g., the magnetic coupling 118, motor-generator 110, etc.).

Although a ball washer is illustrated on both the top and bottom axle 208*b* in FIG. 4A (also shown in FIG. 2C), other implementations are possible and contemplated. For example, a ball washer may be used to provide a small amount of adjustability to the axle 208 alignment when top axle 208*a*, bottom axle 208*b*, stacking plates 122, and clamping plates 120 are aligned, as discussed below.

A ball washer may be flat on its bottom where it contacts a stacking plate 122 while it is rounded on a top where it contacts a corresponding curve in the axle body. Accordingly, the position of the axles 208 could be shifted slightly during assembly to allow the axles 208 to be positioned. As illustrated, in some implementations, a bolt may couple the axle washer to the axle body in order to hold it in place during assembly.

It should be noted that, in some implementations, such as is illustrated with the top axle 208*a* in FIG. 4B, flat washers or no washers are used with an axle 208, such as where an assembly fixture 502 is machined precisely enough to align the axles 208 without other adjustments. When an assembly fixture 502 shuts, it may push the axles 208 into alignment with each other.

Figure 5A:
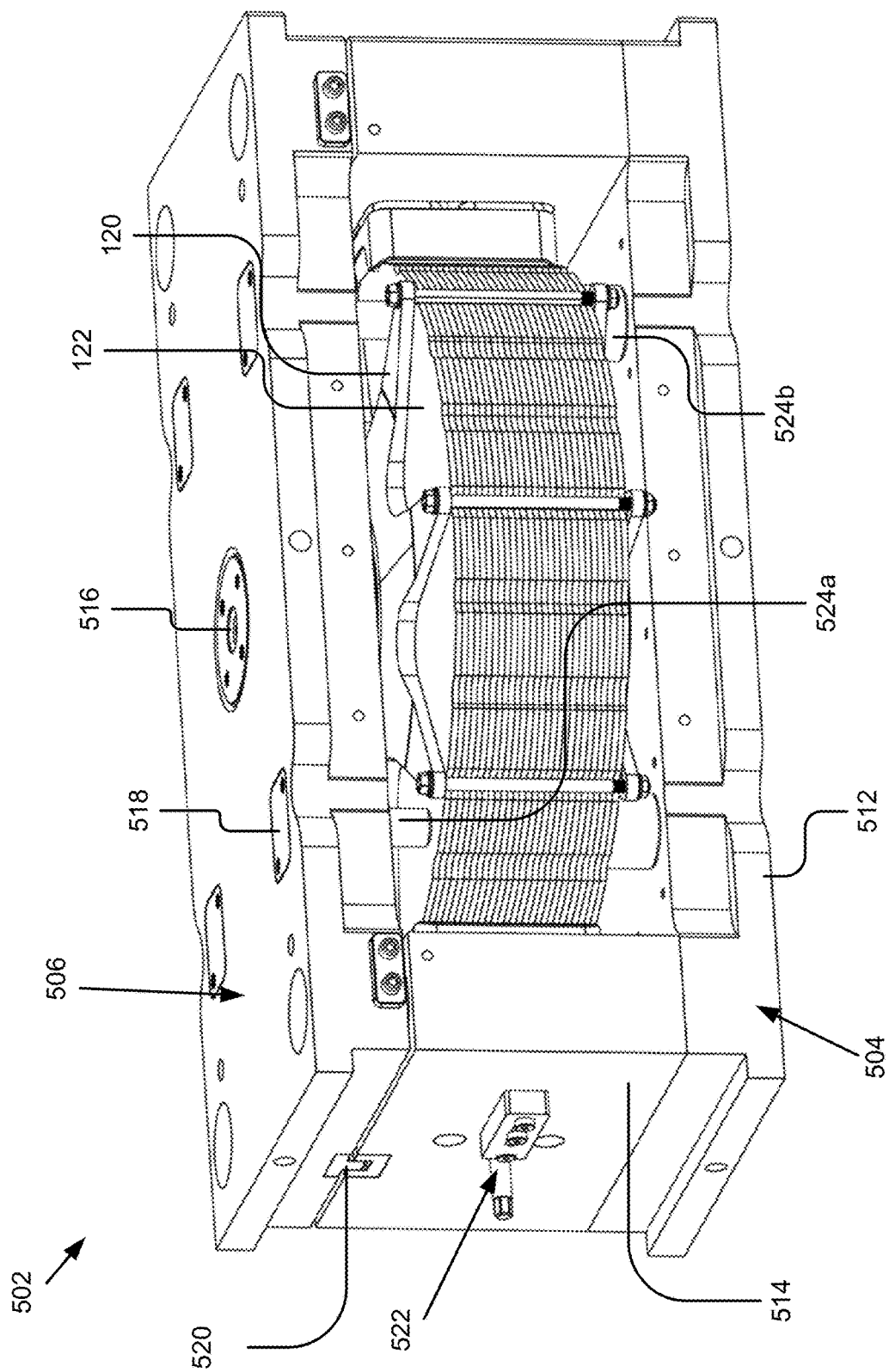
FIGS. 5A-5C illustrate various views of an example flywheel assembly fixture.
Figure 5B:
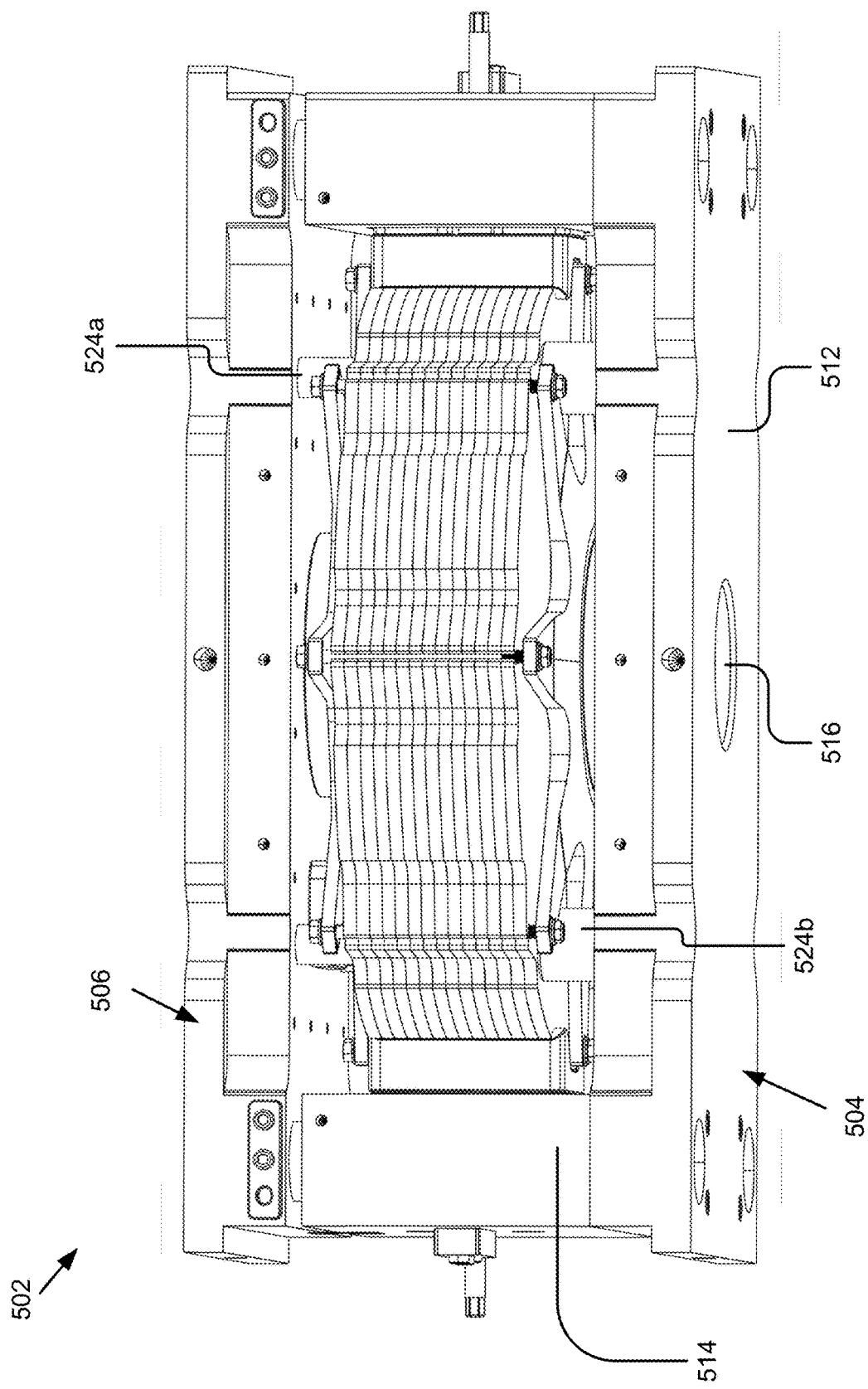
Figure 5C:
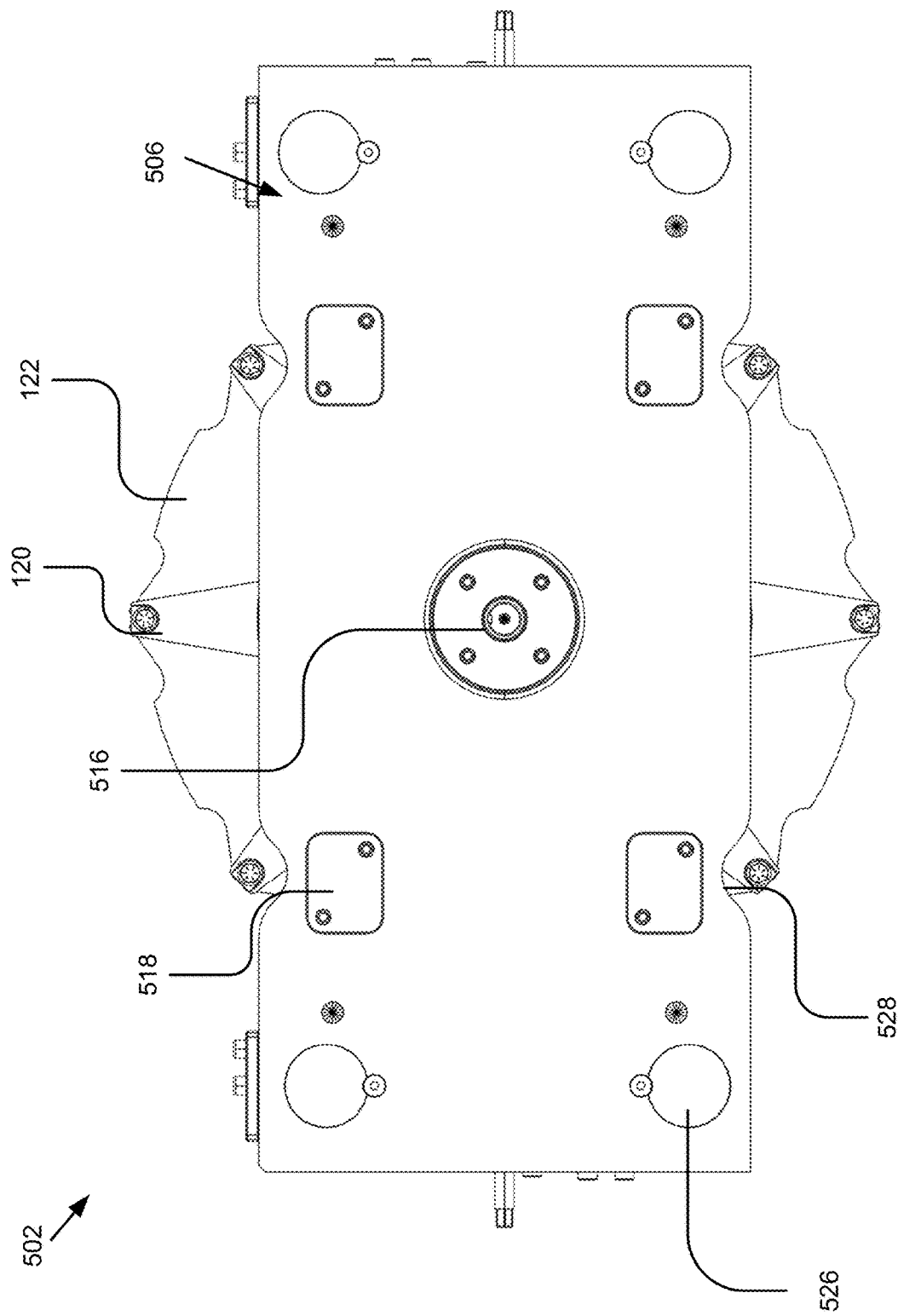
Figure 5D:
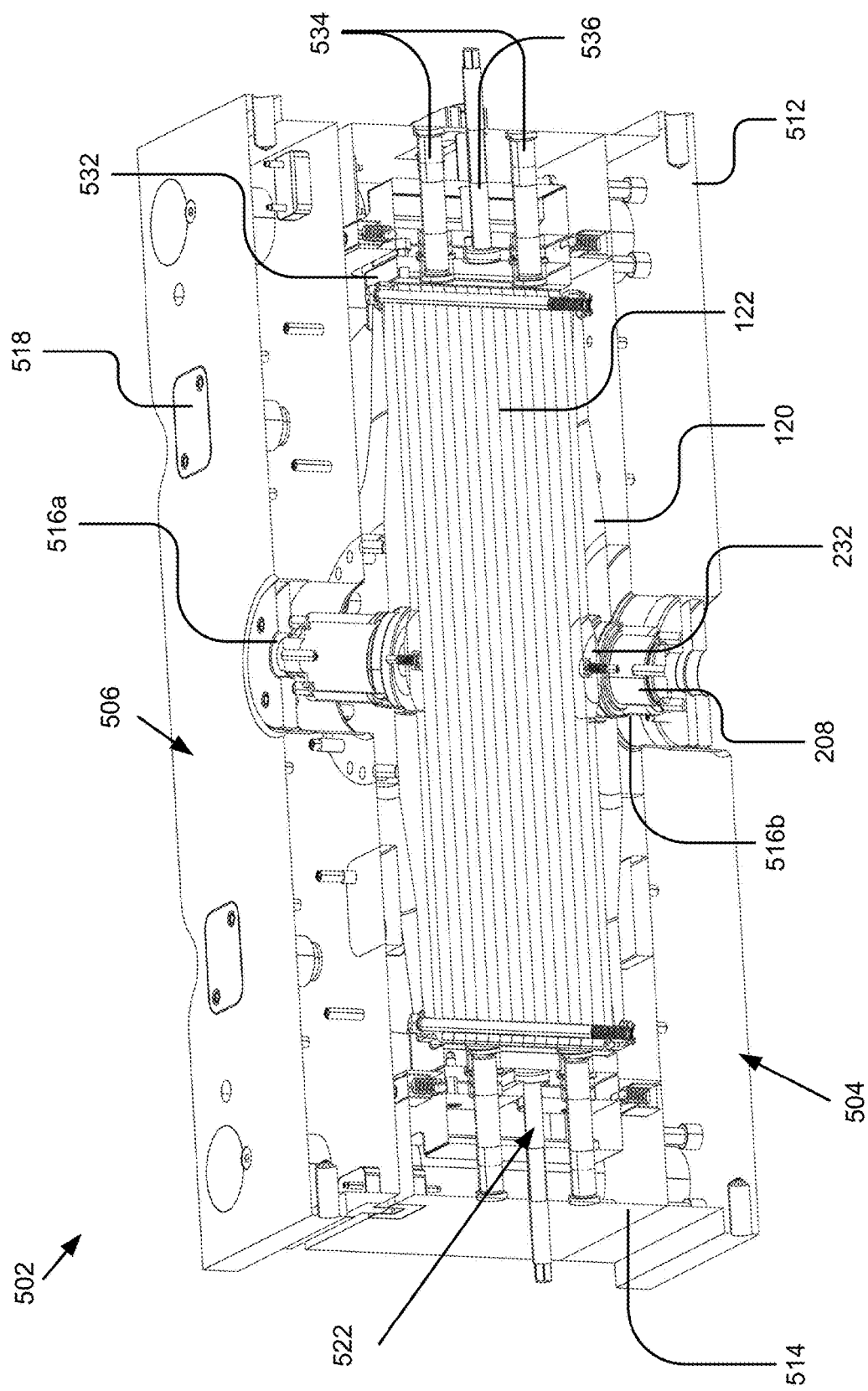
FIGS. 5D-5F illustrate various cross sections of an example flywheel assembly fixture.
Figure 5E:
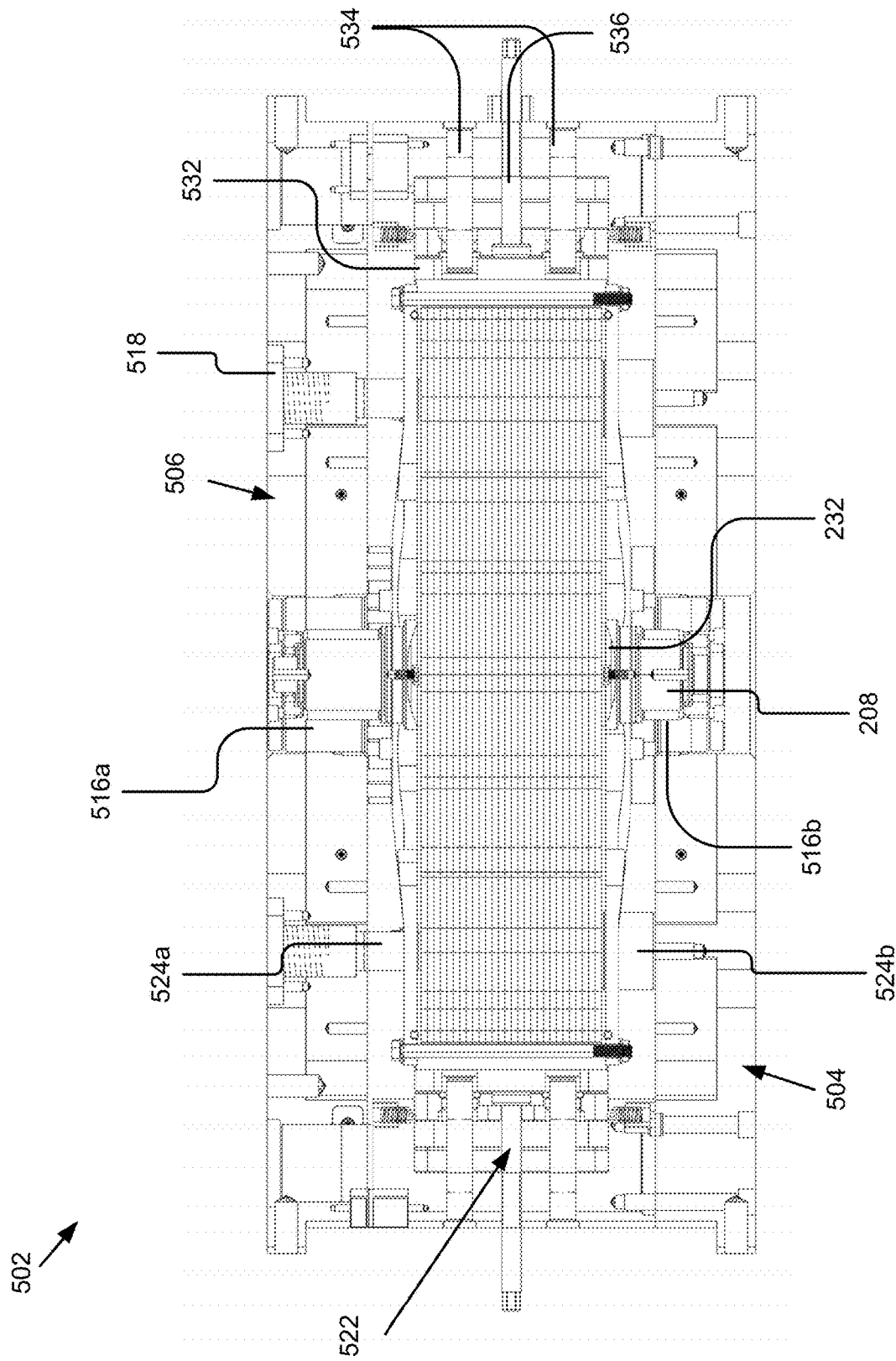
Figure 5F:
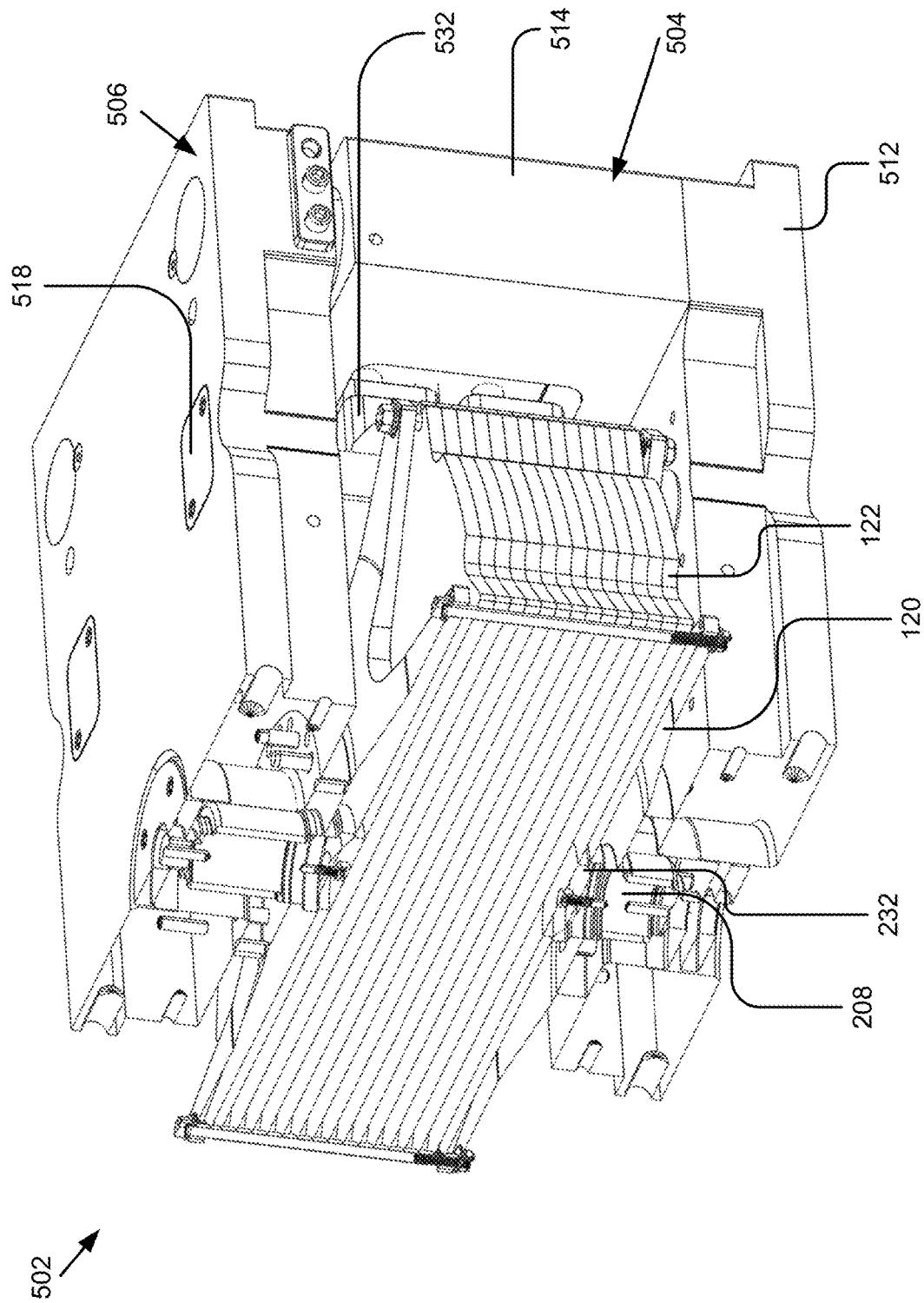
Figure 5G:
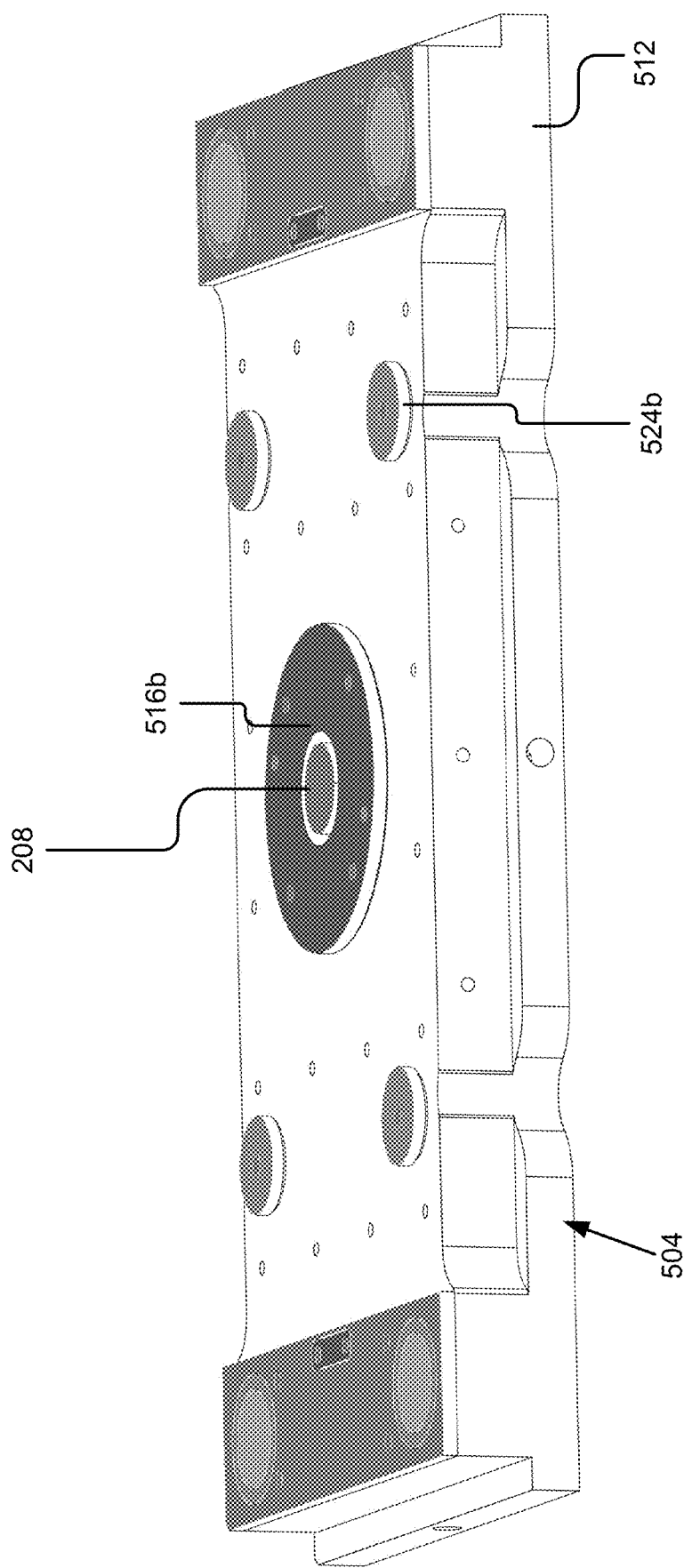
FIGS. 5G-5J illustrate horizontal cross sections of an example flywheel assembly fixture.
Figure 5H:
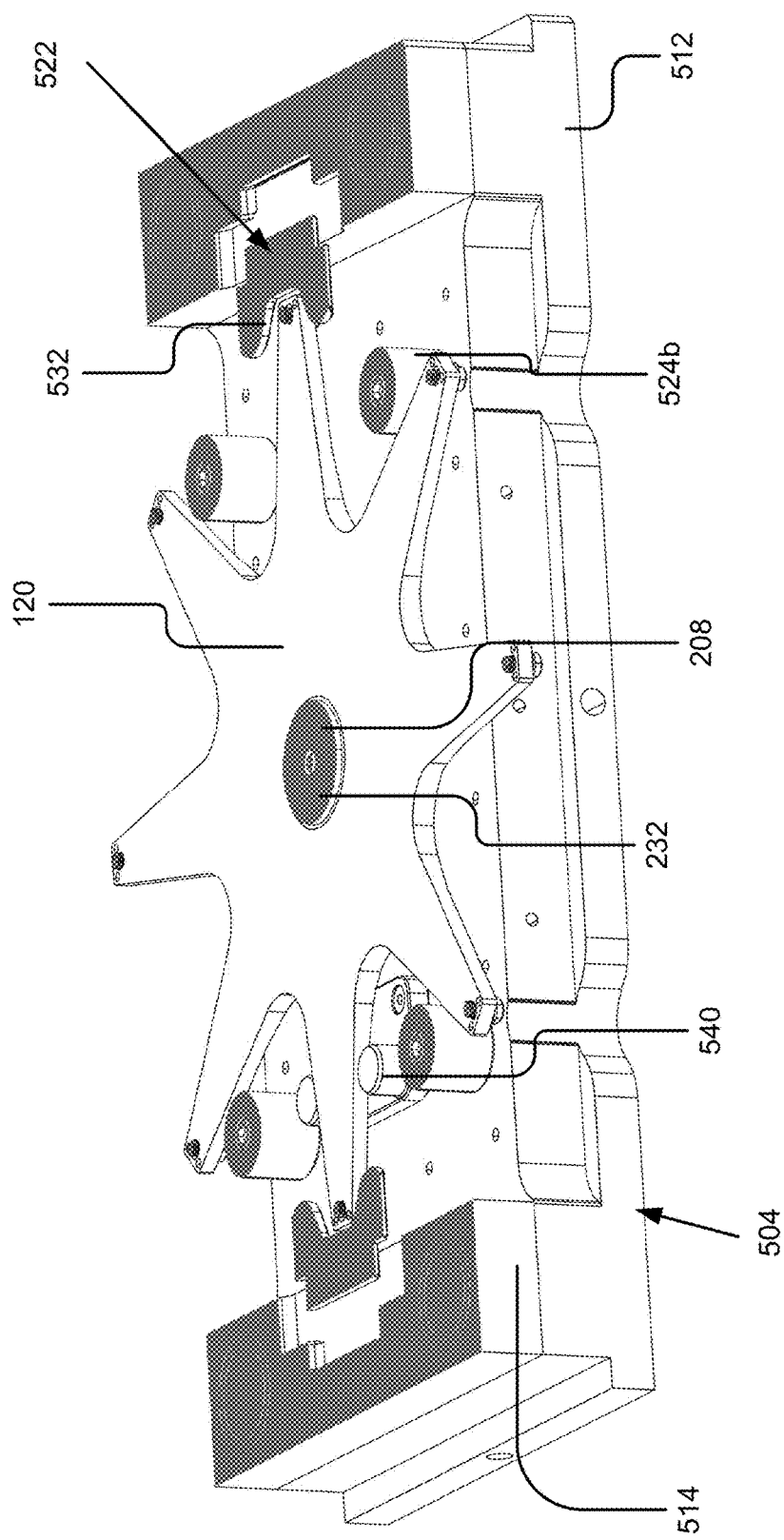
Figure 5I:
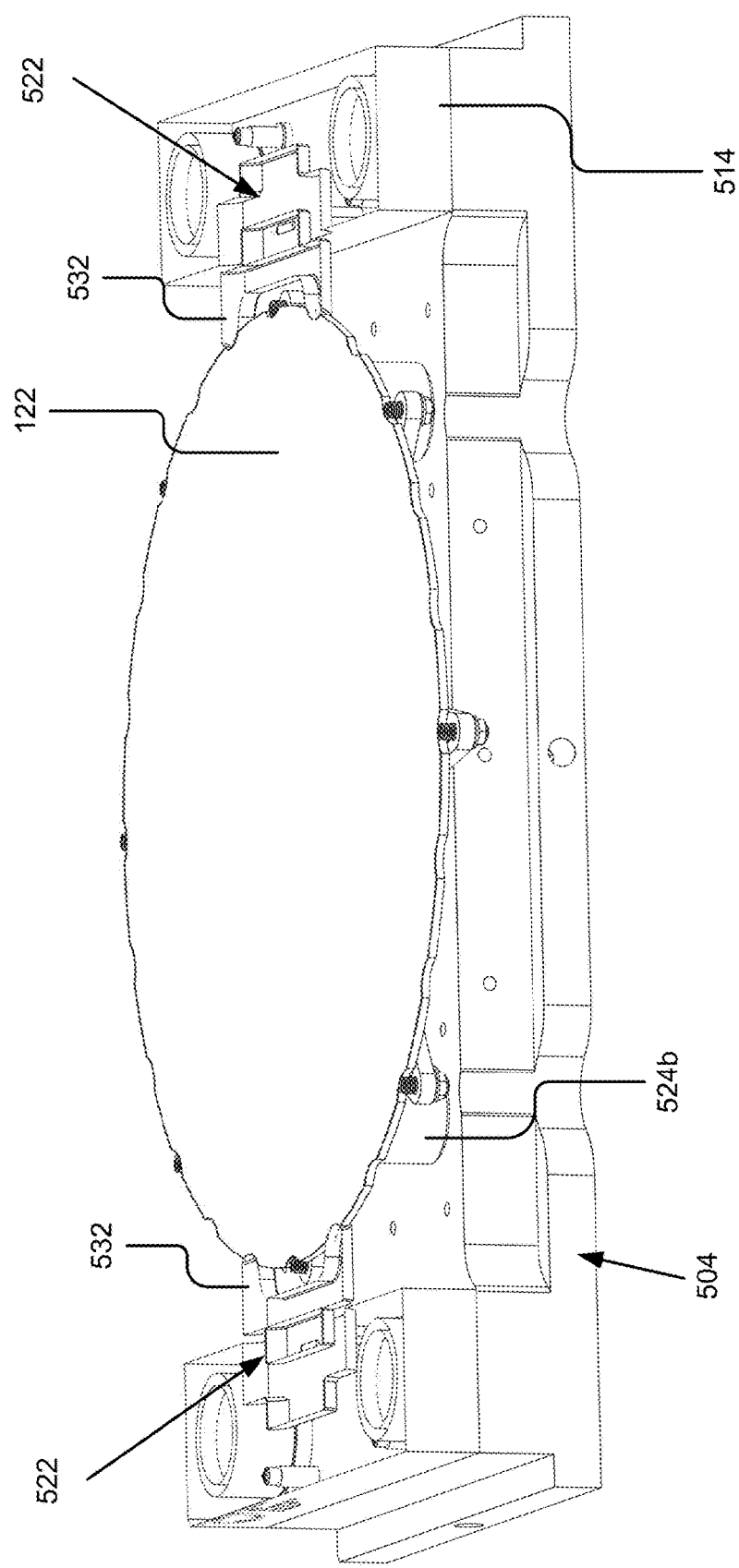
Figure 5J:
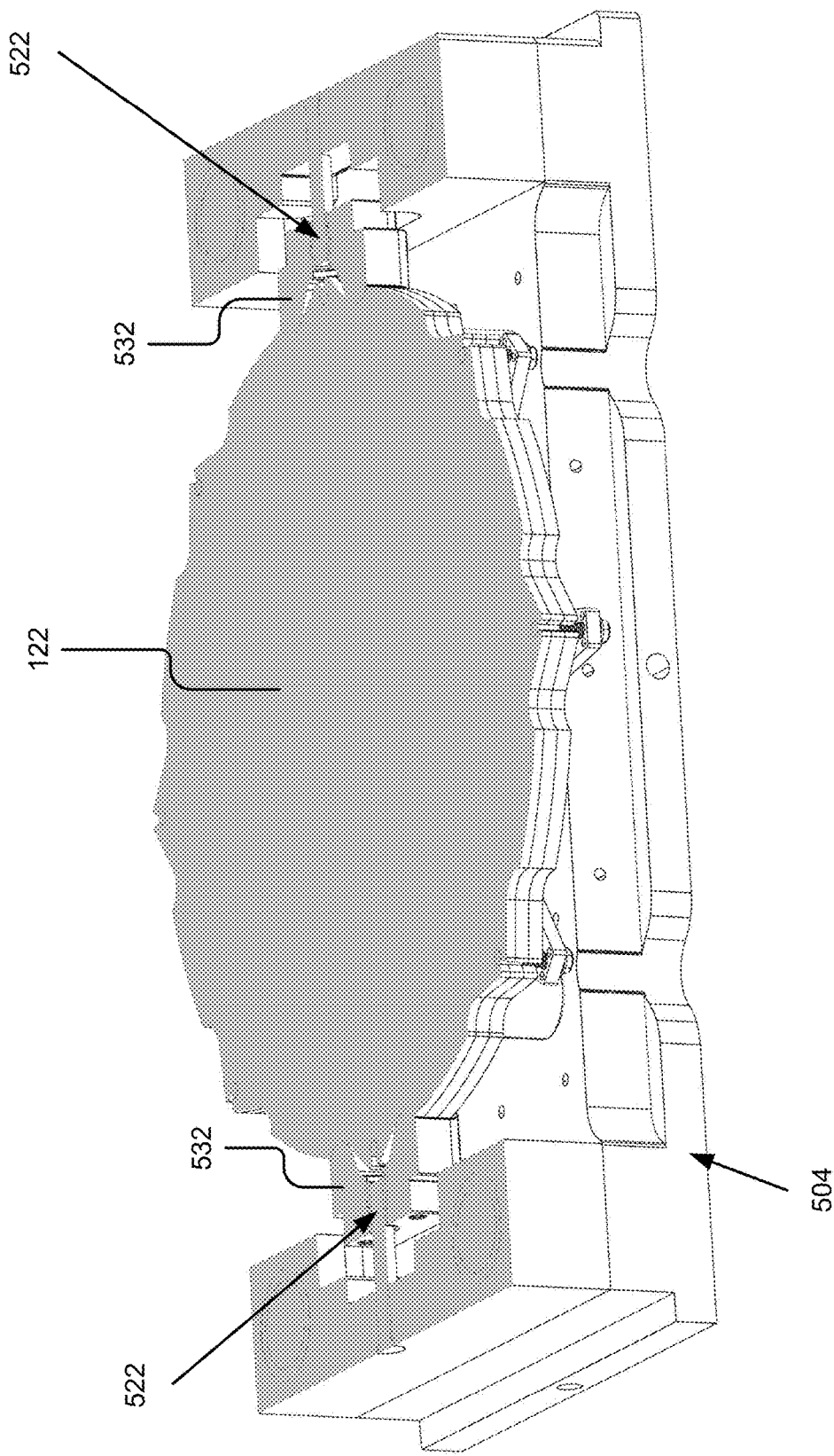
Figure 5K:
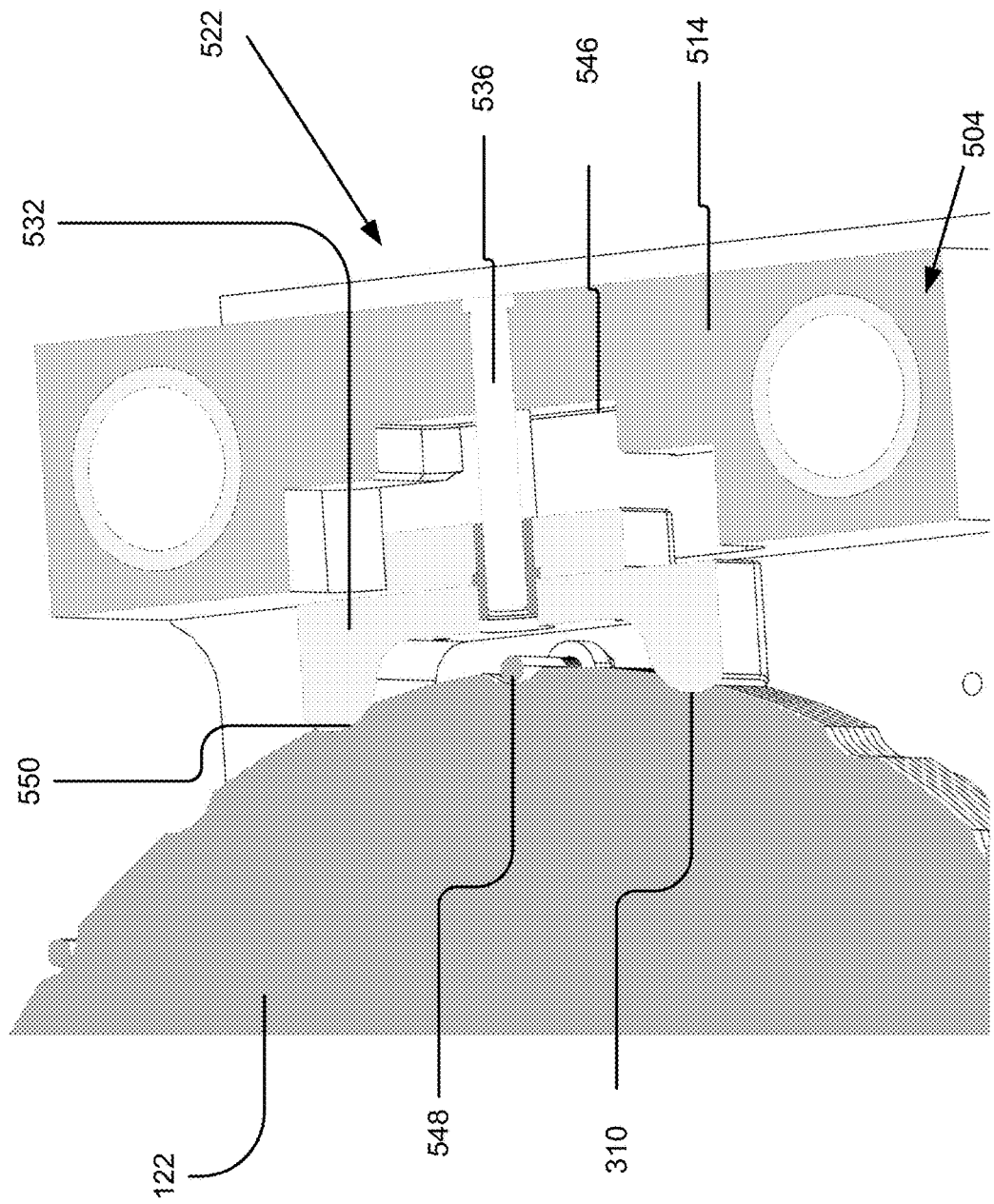
FIG. 5K illustrates a horizontal cross-sectional view of an example horizontal alignment component applying alignment pressure to a plurality of stacking flywheel plates.
Figure 5L:
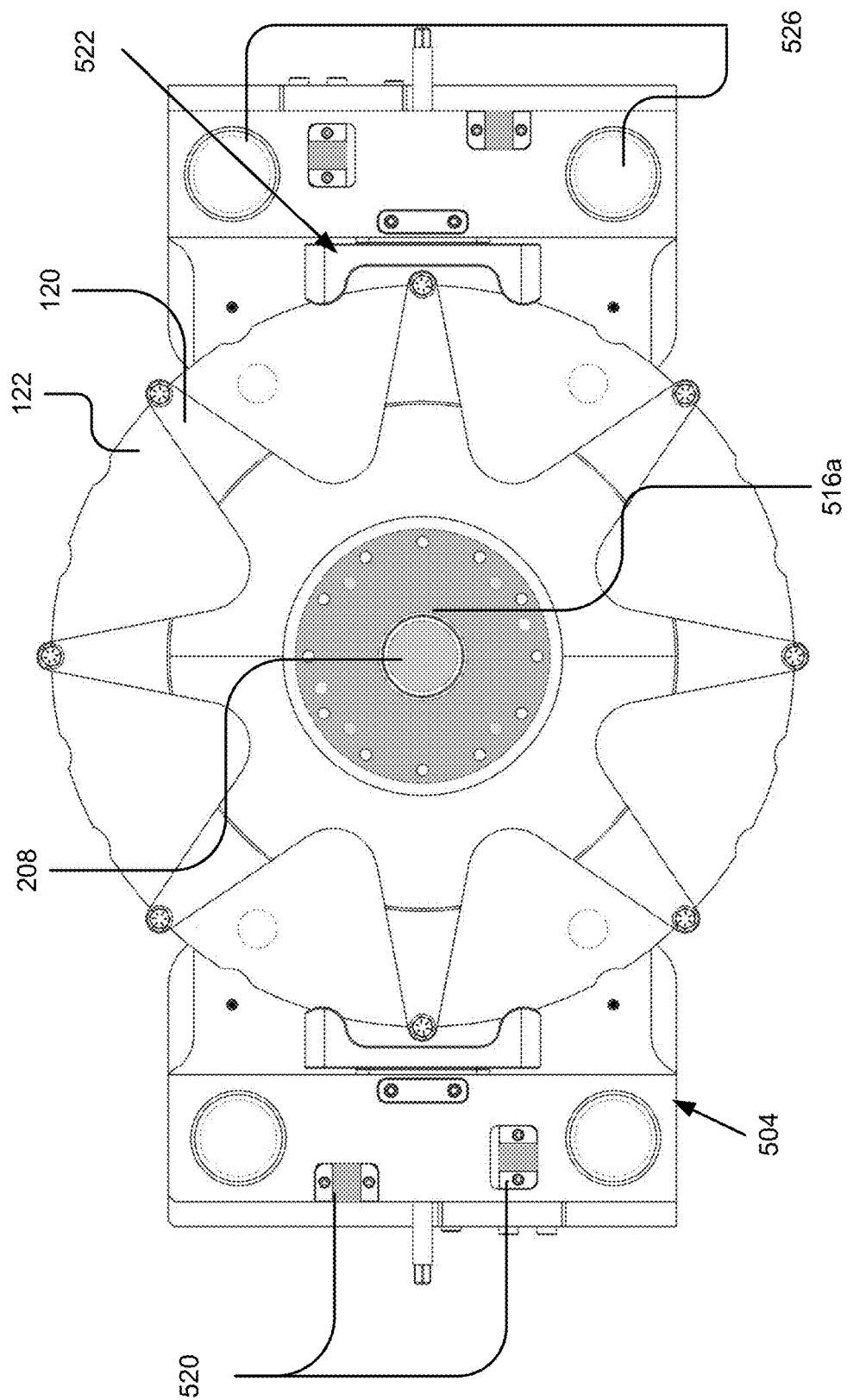
FIG. 5L illustrates a cross section in which a clamping plate and axle are placed onto stacking plates in an assembly fixture.
Figure 5M:
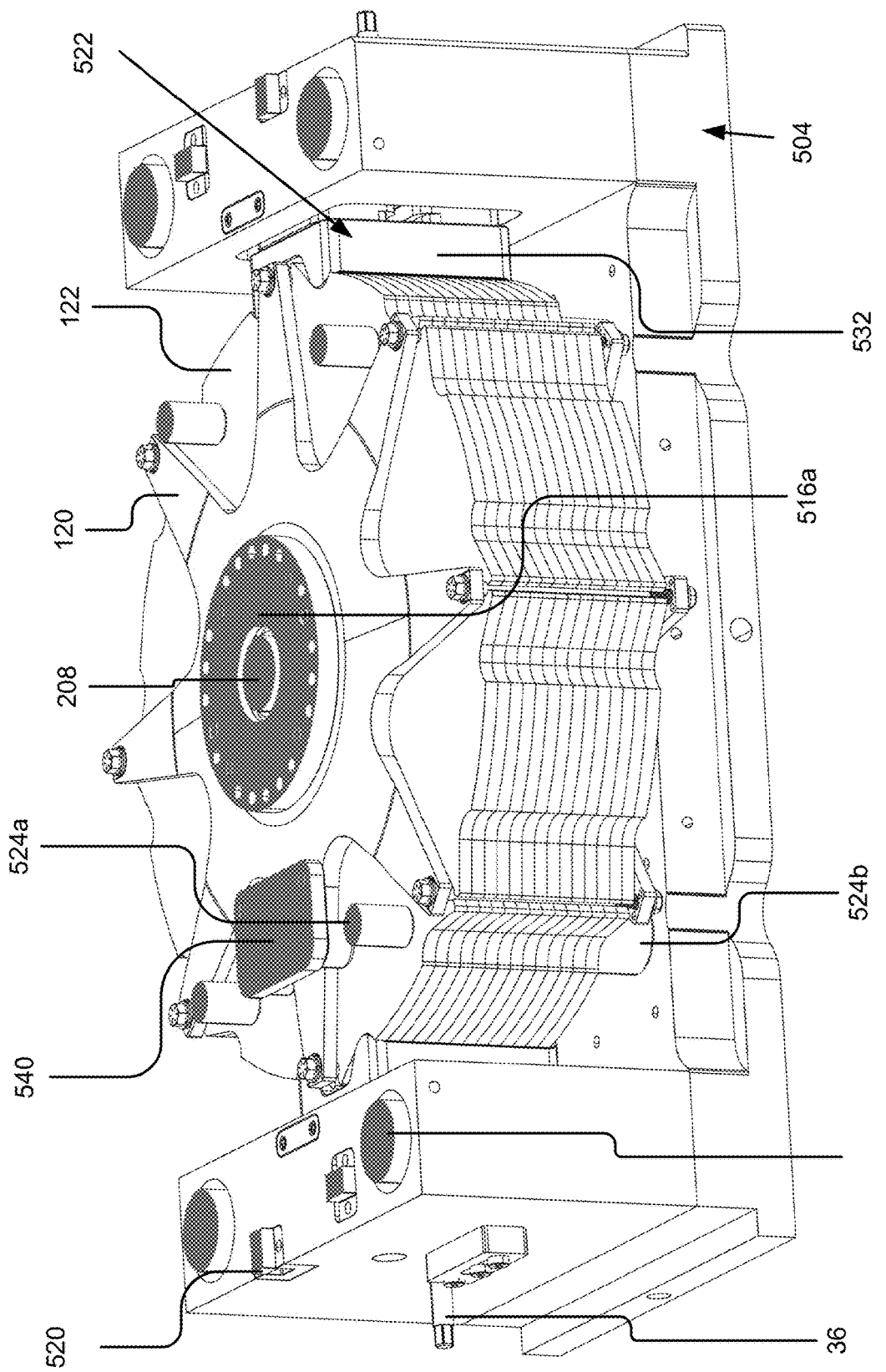
FIG. 5M illustrates a horizontal cross section in which a clamping plate and axle are inserted into a top axle receiver of a clamping device.
Figure 5N:
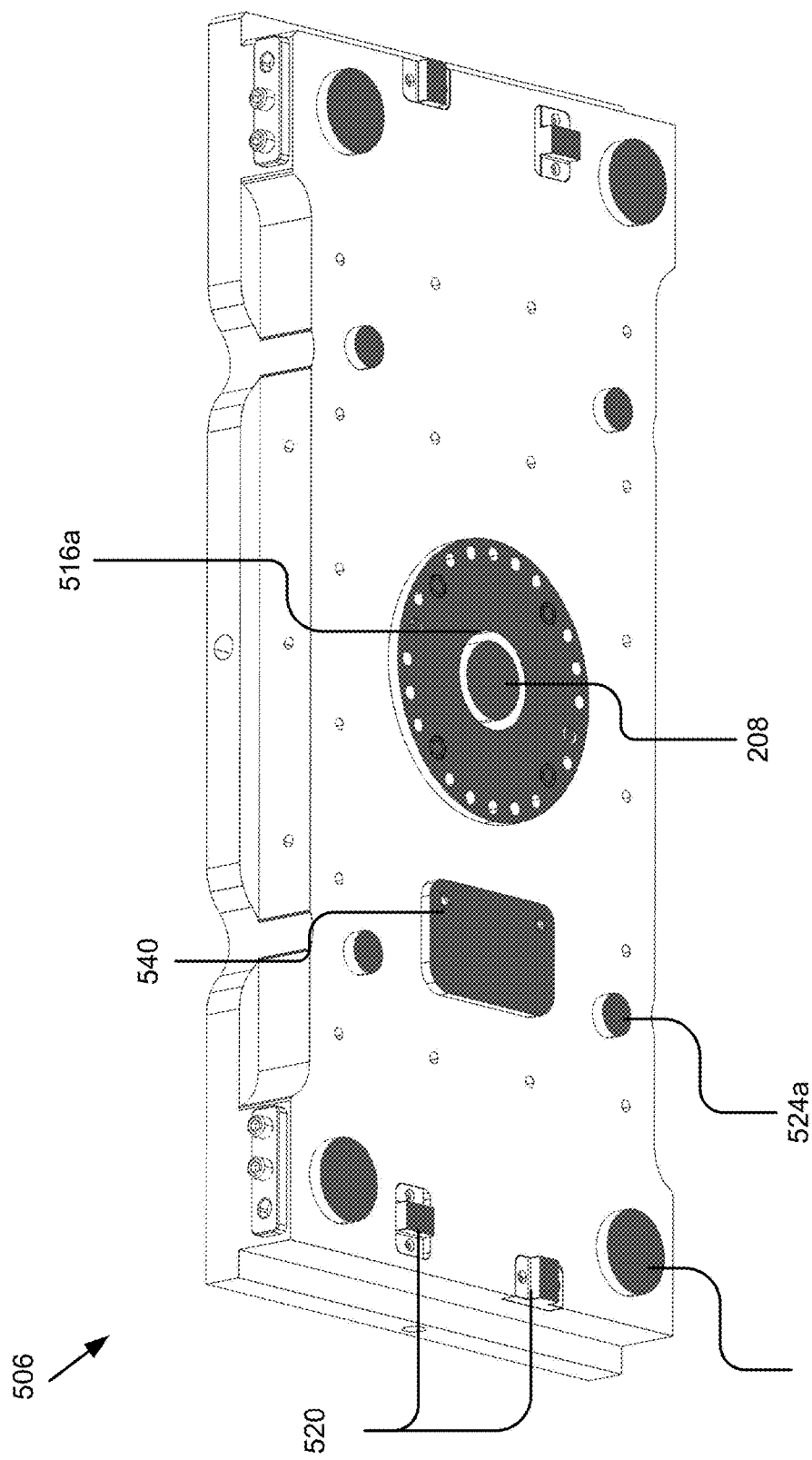
FIG. 5N illustrates a bottom-up cross section of an example clamping device.

FIGS. 5A-5N illustrate an example flywheel assembly fixture 502 or compression tool for compressing a multi-plate flywheel 202 including various views, components, constructions, and uses thereof. The flywheel assembly fixture 502 may be configured to provide improved and/or accelerated assembly of a flywheel 202. Various flywheels 202 may be assembled in the fixture and/or using features thereof. For instance, while an example flywheel 202 or components thereof are displayed in the fixture, other features, such as those with different configurations of clamping plates 120, stacking plates 122 (e.g., having a different outer-edge profiles, bolt holes, etc.), full axles 208, or other features are possible and contemplated herein.

It should be noted that although the flywheel assembly fixture 502 is referred to as an "assembly" fixture, it may additionally or alternatively be used primarily for alignment of a flywheel 202. For instance, the components (axles 208, clamping plates 120, stacking plates 122, bolts, etc.) may be assembled separately and then placed into the flywheel assembly fixture 502 to align the plates and axles 208, exert a clamping force, or perform other operations. Similarly, a "stacking" device and "clamping" device may additionally or alternatively be used for alignment, assembly, clamping, or other purposes despite their titles herein.

The flywheel assembly fixture 502 may, depending on the implementation, include structures and features that allow the flywheel 202 to be assembled, for example, by aligning axles 208, clamping plates 120, stacking plates 122, and other components. In some implementations, the assembly fixture 502 may clamp the flywheel 202, for example, by pre-stressing the clamping plates 120 (e.g., to flex them or otherwise place them in a stressed position) and/or stacking plates 122, for example, to allow the bolts to be placed around a periphery and/or provide a defined amount of force on the plates/flywheel 202.

Various features and structures of the assembly fixture 502 are described below and elsewhere herein. Additionally, example methods for using the assembly fixture 502 and/or assembling a flywheel 202 are described in further detail below. It should be noted that the features and components are provided as examples and that they may be combined or replaced with other features described herein.

FIG. 5A illustrates a side-perspective view, FIG. 5B illustrates a side view, and FIG. 5C illustrates a top-down view of an example flywheel assembly fixture 502.

Depending on the implementation, the flywheel assembly fixture 502 may include a stacking device 504 and a clamping device 506, which may couple together to partially encase a flywheel 202. For example, the stacking device 504 may hold a bottom axle 208*b*, bottom clamping plate 120*b*, and allow multiple stacking plates 122 to be placed thereon. The stacking device 504 may also vertically and/or horizontally align the components of the flywheel 202. The clamping device 506 may be a lid 128 or top body that may be placed on the stacking device 504 thereby enclosing a flywheel 202 during assembly, as shown in the illustrated example. Pressure may be applied on or by the clamping plate 120 to pre-stress the flywheel 202, such as the clamping plates 120 and/or stacking plates 122 to allow bolts to be inserted and/or torqued (e.g., to a defined torque).

For example, as described in further detail below, in order to apply a defined pressure to the flywheel 202, a defined pressure may be exerted on or by the flywheel assembly fixture 502 and bolts may be inserted and torqued (e.g., to a defined torque) into the clamping plates 120. For instance, the stacking device 504 and/or clamping device 506 may include contours or perforations above and/or below the bolts/bolt holes to allow them to be placed therein.

As illustrated in the examples, a stacking device 504 may include a base portion 512, one or more wall portions 514, and various other structures for holding an axle 208, aligning plates, or performing other operations, as described in further detail below. For instance, the stacking device 504 may include a bottom axle receiver 516*b*, one or more support or alignment pins that vertically support or align the clamping and/or stacking plates 122, and other structures. The stacking device 504, such as integrated or coupled with the wall portion 514, may include a plate alignment mechanism 522 for horizontally and/or rotationally aligning the plates.

As discussed below, a plate alignment mechanism 522 may be placed into an open position for removing a previously assembled flywheel 202. The plate alignment mechanism 522 may be moved into a stacking position in which it locates alignment devices at the sides for keeping the plates (e.g., the stacking plates 122) in line, for example, by interacting with outer edges or contours of the plates during stacking. Once the plates are stacked, the plate alignment mechanism 522 may be moved into an alignment or locking position in which alignment devices push the staking plates into a more precise alignment with each other and/or with the flywheels 202 support structure (axles 208 and/or clamping plates 120) held by the assembly fixture 502. These and other operations and features are also described below.

As illustrated in the example, a clamping device 506 may include an upper axle 208 receiving portion one or more alignment mechanisms for aligning the clamping device 506 with the stacking device 504, and one or more compression structures.

For example, the clamping device 506 may hold an upper axle 208 or otherwise align it when the clamping device 506 is placed onto the stacking device 504. For instance, as described below, the clamping device 506 may include alignment pin(s), fixture alignment member(s) 520, or other structures that align the clamping device 506 with the stacking device 504, which may, in turn, align the axle(s) 208 and/or the other portions of the flywheel 202. The alignment of the clamping and stacking devices 504, axle(s) 208, and plates may be performed automatically due to the alignment of the alignment pins, structures, etc., or it may be performed manually, for example, by screwing or clamping the alignment structures, etc., as noted below.

In some implementations, the clamping device 506 may include pins or other structures that vertically align and/or clamp the flywheel 202, such as the stacking plates 122 and/or the clamping plates 120. In the examples illustrated herein, the clamping device 506 may include pins that contact the stacking plates 122 to hold them or apply pressure thereon to pre-stress them while the flywheel 202's bolts are inserted and/or torqued.

In some implementations, in order to put pressure on the flywheel 202, pressure may be exerted on the clamping device 506 while it is placed onto the stacking device 504 in order to push the clamping device 506 onto the stacking device 504 and, thereby, apply force to the flywheel 202. In some implementations, once the clamping device 506 is placed onto the stacking device 504, pressure may be applied to the flywheel 202, for example, by the clamping pins 524 (e.g., by exerting force on a clamping pin 524 plate 518). The pressure may be applied using springs, pneumatics, hydraulics, screws, linear motors, or other devices.

As can be seen from the top-down view of the example assembly fixture 502 in FIG. 5C, bolt access contours 528 may be included in the clamping device 506 and/or the stacking device 504 to allow access to bolts.

In some implementations, the clamping device 506 may include alignment pins that align the clamping device 506 with the stacking device 504. For example, as illustrated in FIG. 5C, one or more clamping plate alignment mechanisms 526 may be attached to the clamping device 506 and/or passing therethrough. In some instances, the clamping plate alignment mechanism 526 may include a pin that is attached to the clamping device 506 and into the stacking plate 122 (e.g., recesses in the wall portion 514 thereof). In some instances, the clamping plate alignment mechanism 526 may include cams or cam bolts that allow the position of the alignment pins or interaction with recesses to be adjusted.

In some implementations, alignment pins may be coupled with the stacking device 504 (e.g., in or on the wall portion(s) 514) and extend into recesses or perforations in the clamping device 506.

FIGS. 5D-5F illustrate various cross-sectional views of an example flywheel assembly fixture 502. FIGS. 5D and 5E illustrate cross-sectional side views of an example flywheel assembly fixture 502 with a flywheel 202 disposed therein. FIG. 5F illustrates a cross-sectional side view with the cross section positioned at a ninety-degree angle to those shown in FIGS. 5D and 5E of the example flywheel assembly fixture 502 and flywheel 202.

As illustrated in the examples, the stacking device 504 may include a plurality of bottom clamping pins 524b that are coupled with the stacking device 504 and that contact a bottom stacking plate 122 in order to vertically support, position, and/or clamp it. In some implementations, a bottom clamping pin 524b may be adjustable for positioning and/or to apply clamping force.

As illustrated in the example implementations, the top clamping pins 524a of the clamping plate 120 may be coupled to the plate via clamping pin 524 plate 518 and may include a shaft that exits the clamping plate 120 to contact one or more of the stacking plate 122 (e.g., the topmost plate) and the clamping plate 120 (e.g., the top clamping plate 120a). In some implementations, the top clamping pins 524a may include springs that apply force to push the clamping pins 524 outward so that when the clamping device 506 is placed onto the stacking device 504, force is placed on a stacking plate 122, for instance. In some implementations, the spring force may apply a defined amount of clamping force while in other implementations, the springs or pins may bottom out and additional clamping force may be applied.

In some implementations, such as where a flywheel 202 has two separate axles 208 that do not directly contact each other, the axles 208 should be aligned in order to avoid balance problems or excess wear on bearings or seals. The stacking device 504 and the clamping device 506 may each include an axle receiver 516, which may be a recess or other structure that interacts with the bottom and top axles 208a. The axle receiver(s) 516a and 516b may be sized to match the diameter of the axle(s) 208, so that the axle(s) 208 are precisely held. For instance, the axle receiver(s) 516 may be placed at a center of the devices and machined so that they are precisely aligned with each other. The axle receiver(s) 516 may allow the axles 208 to slide into and out of them vertically to accommodate the assembly or variability in flywheel 202 thickness (e.g., due to random thickness variations in stacking plates 122).

In some implementations, the axle receiver(s) 516 may include a perforation or recess in the stacking and clamping devices 506. An axle receiver 516 may include an adapter positioned in the perforation that matches the contours, size, or position of the axle 208 to make assembly easier and, potentially, more precise.

As illustrated in the example implementations, the stacking device 504 may include one or more plate alignment mechanisms 522 that horizontally align the stacking plates 122, so that they are in alignment with the axles 208/axle receivers 516. As illustrated, an example stacking device 504 includes two plate alignment mechanisms 522 located opposite to one another in the horizontally opposed wall portions 514 of the stacking device 504. For instance, a wall portion 514 may be a vertical body extending upward from the base portion 512 of the stacking device 504 and adjacent to a flywheel 202/space for a flywheel 202 therein. The plate alignment mechanism 522 may include a structure coupled with the wall portion 514 to exert a pressure horizontally on the stacking plates 122 or other components of the flywheel 202 to push them into alignment and/or balance.

As illustrated in the cross sections of FIGS. 5D, 5E, and 5F, a plate alignment mechanism 522 may align the flywheel 202 horizontally, for example, so that the stacking plates 122 are both aligned with each other and with the axle(s) 208. Depending on the implementation, the plate alignment mechanism 522 may include one, two, or another quantity of shafts (e.g., alignment shafts 534, push shafts 536, etc.) that pass through a body, such as the wall portion 514 of the stacking plate 122 to push or pull an alignment tool 532 inward (e.g., toward an axle 208/axis of rotation) or outward (e.g., away from an axle 208/axis of rotation). For instance, various mechanisms may be used to move the alignment tool 532, such as a pneumatic or hydraulic pump, a screw, a rack and worm drive, or other devices that may, for example, move a push shaft 536 to push the alignment tool 532. Some of the shaft(s) may be used to keep the alignment tool 532 parallel and some of the shaft(s) may be used to move it inward/outward.

Example configurations and uses of the plate alignment mechanism 522 are described below. Similarly, example implementations of the configuration of the alignment tool 532, which may contact the flywheel plates, are also described below.

FIG. 5G illustrates a horizontal cross-sectional view of an example flywheel assembly fixture 502 with a bottom axle 208b placed within an axle 208 positioning structure. As shown in the figure, an axle 208 (whether a top axle 208a or bottom axle 208b, depending on assembly order) may be inserted into the axle receiver 516 of the stacking device 504. Depending on the implementation, an axle 208 may be placed first, a clamping plate 120 may be placed first or the axle 208 and clamping plate 120 may be preassembled and placed in the stacking device 504 (e.g., where the axle 208 is inserted into the axle receiver 516). As noted above, an axle receiver 516 may include a perforation and/or adapter that holds the bottom axle 208b in a defined position and/or orientation. In some implementations, the axle receiver 516 may include a beveled edge that allows the axle 208 to be more easily centered and inserted into the receiver.

FIG. 5G illustrates cross sections of bottom clamping pins 524b, which may be connected or integrated with the base portion 512 and provide vertical support to one or more of a stacking plate 122 and the clamping plate 120. The bottom clamping pin(s) 524*b* may be vertically adjustable, removable, or have other configurations.

In some implementations, the bottom clamping pins 524*b* may be omitted, so that a clamping plate 120 (e.g., a top or bottom clamping plate 120*b*, depending on the stacking order) may be placed directly against a surface of the stacking device 504, which may reduce the probability that this plate flexes when clamping pressure is applied by the assembly fixture 502.

The cross section of the wall portions 514 of the stacking device 504 illustrates example structures that may hold or be used to assemble the wall portions 514, for example, with the base portion 512.

FIG. 5H illustrates a horizontal cross-sectional view of an example flywheel assembly fixture 502 with an axle 208 in an axle 208 positioning structure and a clamping plate 120 coupled thereto. For instance, a bottom clamping plate 120*b* is coupled with a bottom axle 208*b* and inserted into the axle receiver 516 of the stacking device 504. Four bottom clamping pins 524*b* are shown extending from the base portion 512 of the stacking device 504. In some implementations, the top axle 208*a* and top clamping plate 120*a* may be inserted first (e.g., where the flywheel 202 is assembled upside down). In some cases, such as where a clamping plate 120 is circular (e.g., instead of star shaped), the bottom clamping pins 524*b* may be hidden or omitted. Similarly, the clamping plate alignment article 540 may be shaped differently or omitted to accommodate different clamping and/or stacking plate 122 configurations.

In some implementations, the stacking device 504 may include a clamping plate 120 rotational alignment article that keeps the stacking plate 122 in a given rotational alignment, so that it may remain aligned with the stacking plates 122, which may be rotationally aligned using the alignment tool 532 of the plate alignment mechanism 522. The clamping plate 120 rotational alignment article may be bolted to the base portion 512 of the stacking device 504 and may include one or multiple protrusions or posts that interact with clamping plate 120 to keep it in a given alignment. For instance, the article may include a pair of posts that straddle an arm of the clamping plate 120 to keep it at a defined angle.

In some implementations, the alignment tool 532 may include a body with contours or ridges that correspond to contours or ridges of stacking plates 122, as noted in further detail below.

FIG. 5I illustrates a horizontal cross-sectional view of an example flywheel assembly fixture 502 with a first stacking flywheel 202 plate placed onto the axle 208 and above the clamping plate 120. As illustrated in the figure, a stacking flywheel 202 may be placed onto/into the stacking device 504, for example, so that it sits on top of the clamping plate 120.

As noted elsewhere herein, the bottom stacking plate 122 may contact a bottom axle 208*b* when stacked in the stacking device 504. Alternatively, when the flywheel 202 is assembled upside down, the plates may be stacked on the top axle 208*a* inserted into the stacking device 504.

In some implementations, where the bottom clamping plate 120*b* is not under stress (and therefore not bent toward the stacking plate 122), it (e.g., the bushings of the clamping plate 120) may not contact the bottom stacking plate 122. In some instances, the top surface of the bottom clamping pin(s) 524*b* and the top surface of the bottom axle 208*b* may be positioned at the same height in the stacking device 504, so that the bottom-most stacking plate 122 rests thereon.

In some implementations, the stacking device 504 is not configured to bend or flex the received clamping plate 120, whether or not there is a space between the first clamping plate 120 and the first stacking plate 122 (e.g., due to an axle 208 or washer), so that the first clamping plate 120 remains substantially flat. For instance, a top clamping plate 120*a* may be inserted flat and then stacking plates 122 stacked directly thereon to prevent the top clamping plate 120*a* from flexing, which improves the flatness of the top clamping plate 120*a* (e.g., for interaction with a bearing or magnetic lift component).

Where the stacking plates 122 have contours, clamping regions, or scallops 310 at their outer edges, as noted above, they may be aligned with corresponding bolt locations of the clamping plate 120. For instance, FIG. 5I and FIG. 5J illustrate different implementations of the stacking plates 122 with different outer-edge contours, and each of the implementations shows clamping regions of the stacking plates 122 aligned with the bolts/clamping locations of the clamping plate(s) 120. For example, FIG. 5I illustrates consistently sized scallops 310 at the clamping locations and on each side thereof (e.g., 8 bolts and 16 adjacent scallops 310). FIG. 5J illustrates clamping regions of the stacking plates 122 being varied from the scallops 310, as described in further detail above.

The plate alignment mechanism 522 may extend the alignment tool 532, which contacts one or more edges of the stacking plates 122 to push them horizontally into alignment. The alignment tool 532 may extend partially around the circumferential edge of the stacking plate(s) 122 to push the stacking plate 122 toward the axle 208 and align it from multiple directions.

In some implementations, the alignment tool 532 may include one or more contours that match contours of the flywheel 202. For instance, a center of the alignment tool 532 may be recessed to avoid contact with the clamping plate(s) 120 and the alignment tool 532 may include two vertical ridges that extend upward and are shaped to interact with scallops 310 on the stacking plates 122, as illustrated. Accordingly, by aligning the scallops 310 with the ridges on the alignment tool 532, the stacking plates 122 may be aligned horizontally and/or rotationally.

The alignment tool 532 may be positioned at various points. For instance, it may be opened or retracted entirely to allow a flywheel 202 to be more easily removed. It may be closed partially to allow the flywheel 202 to be stacked, for example, where it is extended far enough to interact with scallops 310 without exerting pressure thereon, which would make it difficult, due to friction, to stack additional stacking plates 122. The alignment tool(s) 532 may be extended completely, to a detent, to a measurement point, or otherwise to align the plates of the flywheel 202. For instance, each of alignment tools 532 may be incrementally, alternately extended to adjust the alignment of the plates, as described below.

FIG. 5J illustrates a horizontal cross-sectional view of an example flywheel assembly fixture 502 with three stacking flywheel plates stacked therein and horizontal alignment components in a stacking position to hold the flywheel plates in line. As illustrated in the example, the alignment tool 532 may be extended by a pushing shaft 536 that is coupled with a screw drive or otherwise to move the alignment tool 532, as noted below. The ridges of the alignment tool 532 may extend upward to interact with multiple stacking plates 122 and align them with each other and/or the axle 208.

FIG. 5K illustrates a horizontal cross-sectional view of an example horizontal alignment component applying alignment pressure to a plurality of stacking flywheel plates. As illustrated, a pushing shaft 536 may extend through a wall portion 514 of the stacking device 504 and push the alignment tool 532 outward to interact with the stacking plates 122. For instance, the alignment tool 532 may include a contact surface, such as on ridge(s) 550, that interacts with an edge of the stacking plates 122, such as the scallops 310. In some implementations, the alignment tool 532 may be retracted completely or partially into an alignment tool recess 546 in the wall portion 514. A bolt 548 is also visible in the example.

FIG. 5L illustrates a top-down horizontal cross-sectional view and FIG. 5M illustrates a perspective cross-sectional view of an example flywheel assembly fixture 502 with a plurality of stacking flywheel plates, a top clamping plate 120a, and a top axle 208a placed therein. As illustrated, example horizontal alignment components have been adjusted horizontally to align the flywheel plates along a vertical axis. Each of FIG. 5L and FIG. 5M illustrate slightly different implementations, such as where the contours of the stacking plates 122 are different; although, it should be noted that many different implementations are possible and contemplated herein including but not limited to those described herein.

FIG. 5L illustrates a cross section in which a top clamping plate 120a and top axle 208a are placed onto the stacking plates 122. A cross-section of a top axle receiver 516 is also visible.

Fixture alignment members 520 are illustrated on the top of the wall portions of the stacking device 504, which may interact with corresponding halves on the clamping device 506 in order to align the two devices. For instance, each wall portion 514 may have two fixture alignment members 520 that align the devices in the X and Y directions, respectively.

In some implementations, as noted above, the stacking device 504 and/or the clamping devices 506 may have alignment or compression pins 524. As noted above, the pins may extend from the stacking device 504 into corresponding holes in the clamping device 506 or vice versa. In some implementations, the pins may be used for alignments and/or used to compress the stacking device 504 and the clamping device 506 together (e.g., via threads on the pins, pneumatics or hydraulics, etc.).

FIG. 5M illustrates a horizontal cross section in which a top clamping plate 120a and axle 208 are inserted into a top axle receiver 516 of a clamping device 506, a cross section of which is shown. For instance, once the stacking plates 122 have been stacked, a top clamping plate 120a (e.g., with a top axle 208a) may be placed thereon. Additionally, before or after the clamping device 506 is placed on the stacking device 504, one or more of the bolts may be inserted around a periphery of the flywheel 202 whether in an axial or an angled configuration. When the clamping device 506 is placed onto the stacking device 504, the top axle 208a may be inserted into a top axle receiver 516 of the clamping device 506, which may align the top axle 208a with the bottom axle 208b based on, for instance, the alignment of the fixture alignment member(s) 520.

In some implementations, before or after the clamping device 506 is placed on the stacking device 504 and/or the clamping force is placed thereon, the plate alignment mechanisms 522 may be inserted (e.g., through the stacking plates 122 and or clamping regions, as illustrated) or adjusted to align the plates.

For example, one or more pushing shafts 536 may extend from the plate alignment mechanism(s) 522 (e.g., through a wall portion 514 of the stacking device 504). A pushing shaft 536 may be threaded, along with the wall portion 514 (e.g., an aperture therein in which the pushing shaft 536 is held) and the pushing shaft 536 may be rotated to push the alignment tool 532 inward or outward. For instance, the pushing shaft 536 may include a hex head that interacts with a wrench, drill, impact driver, or other device that twists it to move the alignment tool 532.

In some implementations, the clamping device 506 may also include a clamping plate alignment article 540, similar to that described in reference to the stacking device 504, that holds a top clamping plate 120a in a given rotational position, for example, to match that of the stacking plates 122 as held by the plate alignment mechanism 522.

In some implementations, where a top clamping plate 120a is stacked in the stacking device 504 first (after a top axle 208a), stacking plates 122 are then stacked thereon, and then a bottom clamping plate 120b (with after a bottom axle 208b) is stacked last, the top plate may not flex and the clamping device 506 may flex only the bottom plate, as described elsewhere herein.

As described above, in some implementations, the clamping device 506 may include one or more top clamping pins 524a (e.g., cross sections of four top clamping pins 524a are illustrated in FIG. 5M) that apply pressure to the stacking plates 122 and/or a clamping plate 120 in order to stress them. For instance, as noted above, the top clamping pins 524a may put pressure on the stacking plates 122 to keep them in place while bolts are inserted and/or tightened. In some instances, the axle receiver(s) 516 may also apply force to the axle(s) 208 and/or clamping plate(s) 120. The some (e.g., those that are accessible) or all (e.g., by rotating the flywheel 202 or via a top/bottom perforation in the clamping and stacking devices 504) of the bolts may be tightened.

In some implementations, the clamping device 506 may additionally or alternatively pre-stress or put force on the clamping plates 120 and then the bolts may be inserted and/or tightened.

The bolts may be tightened until a defined amount of deflection of the clamping plates 120 is measured, until a certain torque is measured, or until a defined pressure is applied by the clamping plates 120 on the stacking plates 122, as noted in further detail above.

FIG. 5N illustrates a bottom-up view of an example clamping device 506, which may serve as a flywheel assembly fixture 502 lid, and which may be placed on a stacking device 504 (e.g., a flywheel assembly fixture 502 bottom). The figure also shows a top axle 208a disposed within an axle receiver 516 or axle 208 positioning structure of the lid. For instance, when the axle 208 clamping device 506 is placed onto the stacking device 504, a top (or bottom) axle 208 may extend into the axle receiver 516. When the fixture alignment members 520 are aligned with corresponding components on the stacking device 504, the top axle 208a is aligned with the bottom axle 208b. The top axle receiver 516 may include a beveled edge to assist in alignment or insertion of the top axle 208a into the receiver.

As illustrated in FIG. 5N, a clamping plate alignment article 540 may be coupled (e.g., integrated with or bolted to) a body of the clamping device 506, such as to a bottom surface thereof. Similarly, one or more top clamping pins 524a may extend downward from the clamping device 506, so that they contact one or more of the stacking plate 122 and the clamping plate 120, as discussed above. Similarly, fixture alignment members 520 and/or alignment pins may be included with the clamping device 506 to interact with corresponding structures on the stacking device 504 in order to align the two devices and, by so doing, align the top and bottom axles 208b.

In some implementations, the top clamping pins 524a and/or the clamping plate alignment article 540 may be modified or omitted to adapt the clamping device 506 and assembly fixture 502 to various configurations of flywheels 202. For instance, where no pre-stressing force is to be applied at the top of the flywheel 202 (e.g., to a top or bottom clamping plate 120b) or by the clamping device 506, the top clamping pins 524a may be omitted, spring loaded, or otherwise modified.

In some implementations, one or both of the axle(s) 208 may include a ball joint or washer that allows some flexibility in assembling the flywheel 202. For instance, the ball joint may allow variability in alignment of the clamping device 506 and the stacking device 504 to case assembly. In such implementations, the clamping plates 120 may be more precisely aligned by contacting a portion or recess of the alignment tool 532, based on manual measurement, based on interaction with clamping plate alignment article(s) 540, or otherwise.

In some implementations, when the clamping device 506 is placed onto the stacking device 504, the axle receiver(s) 516 applies force on the axle 208 and/or on the clamping plate(s) 120 (e.g., on a flat region thereof), which puts force at the center of the stacking plats. Additionally, four (or another quantity), clamping pins 524 may apply force at four points of the stacking plates 122 (e.g., the position of the top clamping pins 524a may match that of the bottom clamping pins 524b). In some implementations, as noted elsewhere herein, the top and/or bottom clamping pins 524b may be spring loaded to apply some clamping force on the plates.

In some implementations, as noted below, a flywheel 202 may be balanced once assembled. In some implementations, the flywheel assembly fixture 502 may include pressure sensors, levels, or other devices that detect an imbalance in the flywheel 202, or the flywheel 202 may be removed and separately balanced (e.g., by shaving pieces of the stacking plates 122 from between scallops 310).

Figure 6:
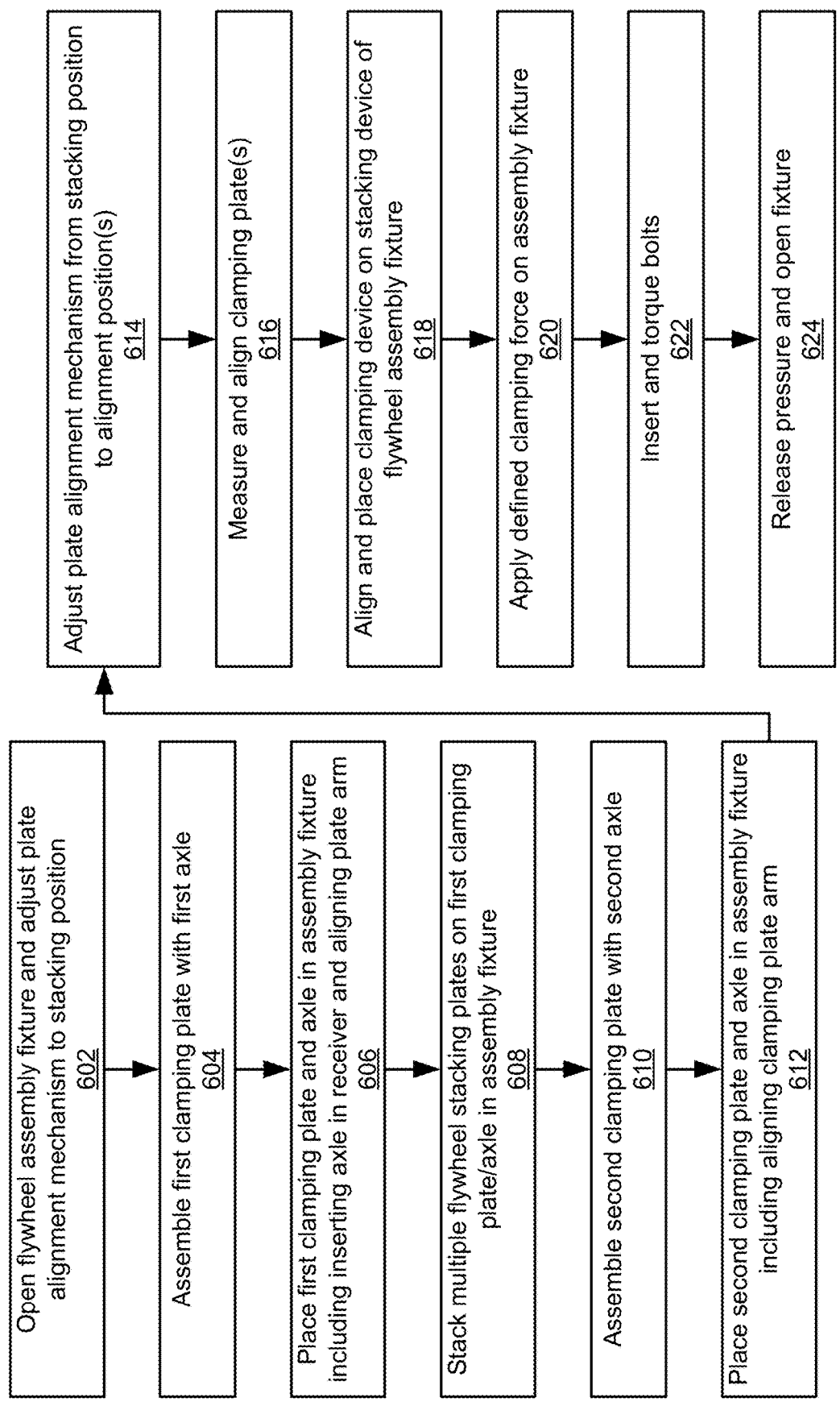
FIG. 6 is a flowchart of an example method for assembling a flywheel using a flywheel assembly fixture.

FIG. 6 is a flowchart of an example method for assembling a flywheel 202, for example, using a flywheel assembly fixture 502. The method includes operations that allow stacking plates 122, such as those stacking plates 122 without perforations described elsewhere herein to be used. For example, the method allows implementations of stacking plates 122 to be aligned that may not have any other means for alignment, such as axles 208 or pins extending through them, to be aligned and held together, or it may allow stacking plates 122, clamping plates 120, and separate axles 208 to be aligned and assembled. It should be noted that the operations may be varied, for example, by using other operations, changing the order of operations, using various mechanisms (e.g., those described herein or others), or otherwise.

In some implementations, at 602, the method may include opening a flywheel assembly fixture 502 (e.g., that was previously closed) and adjusting a plate alignment mechanism 522 to a stacking position, for example, from a completely open position. For instance, the clamping device 506 or lid may be removed, and the plate alignment position may be opened to remove a previously assembled flywheel 202. Before or after the first clamping plate 120 and axle 208 are inserted, the plate alignment mechanism 522 may be moved to a middle or stacking position to keep the plates in alignment during assembly.

In some implementations, although the stacking of plates is described as being performed inside of the flywheel assembly fixture 502, the flywheel assembly fixture 502 may be used to align the plates of an assembled flywheel 202. For example, the stacking may be performed separately and then the assembled flywheel 202 may be placed into the flywheel assembly fixture 502, which may be used to align it.

In some implementations, a first axle 208 (e.g., a top or a bottom axle 208b) and first clamping plate 120 (e.g., a top or a bottom clamping plate 120b) may be assembled, a plurality of stacking plates 122 may be set thereon (e.g., with clamping regions or scallops 310 aligned), and a second axle 208 and second clamping plate 120 may be placed on the stacked/stacking plates 122. At any point, bolts may be inserted into the stack (e.g., at the clamping regions around the periphery of the flywheel 202). Once the flywheel 202 is assembled, it may be lifted (e.g., by crane or other device) and placed into the assembly fixture 502. The first axle 208 may be horizontally aligned with the bottom axle receiver 516. The flywheel 202 may be rotationally aligned with the alignment tool 532/plate alignment mechanism 522 either while placing it into the stacking device 504 or afterwards. Once the flywheel 202 is placed in the assembly fixture 502 (e.g., the stacking device 504), the clamping device 506 may be placed thereon, the plates may be aligned (e.g., using the plate alignment mechanism 522), the bolts may be tightened, and other operations, such as those described below, may be performed to align and/or clamp the flywheel 202.

In some implementations, at 604, the first clamping plate 120 and the first axle 208 may be assembled, for example, by inserting the bottom axle 208b into a perforation at the center of the clamping plate 120 (e.g., in the correct rotational orientation to match shapes, keys, or other structures, as noted above). In some implementations, where a washer, such as a ball washer, is included, it may also be inserted or assembled with the axle 208 and clamping plate 120 and may allow some flexibility during assembly, as noted elsewhere herein, so that the axle 208 can be adjusted to be perpendicular with the clamping plate 120 (e.g., when inserted into the axle receiver 516). Although other implementations are possible and contemplated herein, the axle 208 may be friction fit with the clamping plate 120.

In some implementations, at 606, the first clamping plate 120 and axle 208 may be placed into the assembly fixture 502 (e.g., into the stacking device 504) including inserting an axle 208 in the receiver and aligning the plate arm either one at a time or in an assembled form. For instance, the axle receiver 516 may position the axle 208 at the center of the stacking device 504. In some implementations, the axle receiver 516 may have a beveled edge that aids in moving the axle 208 into the axle receiver 516.

In some implementations, the flat region of the clamping plate 120 may rest on a top surface of the axle receiver 516 or stacking device 504, which causes the axle 208 and clamping plate 120 to move into an aligned perpendicular arrangement (e.g., where a ball washer or other configuration allows flexibility in the alignment).

In some implementations, one or more of the arms of the clamping plate 120 may be rotationally aligned with an alignment tool 532 (e.g., a recess or channel, as noted above) and/or a clamping plate alignment article 540 to keep the clamping plate 120 in a defined rotational position. In some implementations, the clamping plate alignment article(s) 540 may have a height above a base portion 512 of the stacking device 504, so that it contacts the first clamping plate 120 to hold it level and perpendicular to the bottom axle 208b. In other implementations, the first clamping plate 120 may rest directly on the stacking device 504.

In some implementations, at 608, multiple flywheel stacking plates 122 may be stacked on top of the first clamping plate 120 and/or axle 208 in the assembly fixture 502 (e.g., in the stacking device 504). For instance, a bottom-most stacking plate 122 may be stacked, so that it contacts the bottom axle 208b, as noted elsewhere herein.

As each stacking plate 122 is stacked, the clamping locations, scallops 310, or other alignment features may be aligned with each other, the clamping plate(s) 120, and/or structures of the assembly fixture 502. For instance, because the stacking plates 122 may be symmetrical, any of the scallop 310 pairs may be aligned with the ridges of the alignment tool 532 to keep them aligned during assembly (e.g., as illustrated in FIG. 5A), although they may be rotated to alignment at a later point. Accordingly, the clamping locations of the stacking plates 122 may be kept in alignment, so that bolts may be placed through or adjacent to them either during stacking or after clamping device 506 is placed thereon, as noted below.

In some implementations, at 610, the second clamping plate 120 (e.g., the bottom or the top clamping plate 120a depending on stacking order) may be assembled with the second axle 208 similar to the operation at 604. In some implementations, this assembly may be placed onto the top-most stacking plate 122, as noted below, while in other implementations, this assembly may be inserted into a top axle receiver 516 of a lid/clamping device 506 of the fixture, so that it is positioned while mounting the clamping device 506.

In some implementations, at 612, the second clamping plate 120 and axle 208 may be placed into the assembly fixture 502 including aligning the clamping plate 120 arm, so that its clamping location matches those of the stacking plates 122 and other clamping plate 120. This may be done with the second clamping plate 120 and axle 208 assembled or individually.

In some implementations, at 614, a plate alignment mechanism(s) 522 may be adjusted from the stacking position to one or more alignment positions. For instance, the alignment tool 532 may be pushed toward an axis of rotation (e.g., at the center of the axle receivers 516), which may in turn push the stacking plates 122 (and/or clamping plate 120). For instance, the alignment tool(s) 532 may be pressed in horizontally by screwing a pushing shaft 536, which centrally loads the stacking plates 122 in order to align them, for instance, with the top and bottom clamping plates 120b and connected axles 208 as held by the axle receivers 516.

Depending on the implementation, the plate alignment mechanisms 522 may alternatingly be moved to push the plates (e.g., by applying force from the alignment tool 532 on the scallops 310). The alignment or position of the plates may be measured, for example, by checking the position of the alignment tools 532, the stacking plates 122 against measurement points on the flywheel assembly fixture 502, or otherwise. For instance, a measurement tool, such as a ruler, calipers, measuring tape, or laser measuring device may be used to check the position of the stacking plates 122 against a defined center/axis, as noted above.

Additionally, or alternatively, by moving horizontally opposed alignment tools 532 toward the axis (as illustrated in the examples of FIG. 5A-5M), a clamping force may be applied to the stacking plates 122 to push them into alignment with each other, so that the edges match. Similarly, in implementations where the alignment tool 532 pushes into with the scallops 310, the clamping force may cause the plates to rotate into alignment (e.g., by exerting force on the scallops 310, as illustrated in the example of FIG. 5M), which causes the stacking plates 122 to be both horizontally and rotationally aligned.

It should be noted that although the alignment of the plates (e.g., at 614) is described as being performed prior to placing the clamping device 506 onto the stacking device 504 (and/or pressure applied thereto), these operations may be performed in different orders. For instance, the clamping device 506 may be stacked first, the plates may be aligned, and then clamping force may be applied.

In some implementations, at 616, the clamping plate(s) 120 may be measured and aligned, for example, with the stacking plates 122. In some instances, a clamping plate 120 is measured and aligned so that its axle 208 aligns with the axle receiver 516 on the clamping device 506 when it is placed on the stacking device 504. For example, measurements may be performed, as noted above. In some implementations, an axle receiver 516 on a clamping device 506 may have a beveled edge so that if the top axle 208a is nearly aligned, the bevel may push it into a more precise alignment, so that it fits in a relatively tight axle receiver 516.

In some implementations, at 618, the clamping device 506 may be aligned and placed on the stacking device 504 of the flywheel assembly fixture 502. For example, the axle receiver 516 may be aligned with a top axle 208a, alignment or clamping pins 524 may be aligned, and/or fixture alignment members 520 may be aligned. For example, a top axle 208a may be aligned first with the axle receiver 516 of the clamping receiver, which may cause it to shift slightly as fixture alignment members 520 are aligned.

As noted above, a fixture alignment member 520 may include a rectangular protrusion that inserts into a rectangular slot, although square, circular, or other shapes are possible. As illustrated in the example of FIG. 5M, a clamping device 506 may include two rectangular protrusions on each wall portion 514, where the two rectangular protrusions are oriented at right angles to one another. The top of the wall portions 514 of the stacking device 504 may include corresponding rectangular slots. Accordingly, the clamping device 506 may be aligned in both the X and Y directions and precisely with the stacking device 504.

In some implementations, at 620, a defined amount of clamping force may be applied on or by the assembly fixture 502. For example, when the clamping device 506 is placed, the top clamping pins 524a may exert pressure on the stacking plates 122 and/or clamping plates 120. For example, a clamping force may be applied to press the clamping device 506 to the stacking device 504, which may apply force to the top axle 208a and/or top clamping pins 524a. The clamping may be based on a pneumatics, hydraulics, a screw drive, etc. For example, the clamping force may be applied using a hydraulic pump that presses the devices together. The mechanism applying the clamping force may have a sensor and limiter that causes the pressure to raise to a certain PSI. For instance, 5,000, 10,000, 20,000, 60,000 tons, or other pressure amounts may be applied to compress the stacking plates 122.

In some implementations, the top clamping pins 524a may be spring loaded, so that as the springs compress, pressure will be added. The springs may compress until they bottom out and pressure is increased.

In some implementations, clamping force may be applied to bend the clamping plates 120 toward one another by the assembly fixture 502 or by the bolts. For instance, the clamping force may cause one or both clamping plates 120 (e.g., a second clamping plate 120) to bend inward until the clamping plate 120 or bushings (or otherwise) on the ends of the arms contact and apply force on the stacking plates 122, which bending, by the clamping arms, puts pressure on the axle 208 to clamp the two axles 208 together. Accordingly, even in implementations where the stacking plates 122 do not have perforations at a center for the axle 208, a clamping force may be applied.

In addition to the sideways alignment/clamping of the plate alignment mechanism 522, the vertical (e.g., axial) clamping force may square the alignment of the flywheel 202 to ensure that it is aligned and balanced in multiple directions.

In some implementations, at 622, bolts may be inserted and/or torqued. For example, as illustrated in example figures, bolts may be inserted at perforations or other clamping locations of clamping plate 120 arms and stacking plates 122. Where contours of the peripheral edges of the stacking plates 122 extend partially (or completely) around the bolts, the bolts may be inserted through the contours or perforations. Washers, such as Belleville washers, may be used with the bolts and/or their nuts.

While the examples of FIGS. 5A-5N illustrate bolts being inserted parallel with an axis of rotation of the flywheel 202, it should be noted that the bolts may additionally or alternatively be inserted at angles, as illustrated in the example of FIG. 2D.

For example, as illustrated in FIG. 5A, a subset (e.g., six of the eight) bolts may be exposed and inserted. A technician may torque the bolts in an alternating or star pattern to help distribute the force. Where not all of the bolts are accessible, the flywheel 202 may be rotated in the fixture or removed from the fixture to allow the remaining bolts to be inserted.

The bolts may be tightened to a defined specification based on the size and flexibility of the clamping plates 120 and other parameters. For example, each bolt may be tightened to provide a defined torque or based on an applied force before the bolts are torqued (e.g., to apply a force of 2600 pounds per bolt), which may cumulatively provide a relatively even clamping and friction force across the stacking plates 122 (e.g., 16,000-21,000 pounds of clamping force)

It should be noted that while clamping force increases friction between the plates, excessive clamping force may cause the axle 208 to lose clamping pressure instead of increasing it. For instance, where bushings are located radially inward from the bolts (e.g., instead of to the sides of a bolt), excessive tightening of the bolts may cause the axle 208 to lift off the clamping plates 120. Where this occurs, the bolts may be loosened until pressure at the axle 208 is restored.

Once the bolts have been tightened to specifications, they may be locked in place using adhesive, welds, or other means for locking the bolts in place.

At 624, pressure on the flywheel assembly fixture 502 may be released and the fixture may be opened. For instance, a clamping device 506 may be released and removed. The plate alignment mechanism(s) 522 may be moved to an open or fully retracted position. The flywheel 202 may be lifted from stacking device 504 and, in some instances, installed in a flywheel enclosure 104, as described elsewhere herein.

Where some bolts have not been inserted while in the fixture, they may be inserted and torqued while the flywheel 202 is outside of the fixture or the fixture is open.

Beneficially, once a flywheel 202 is assembled with sufficient clamping force but without exceeding the flex or strength of the materials, it may have little to no maintenance and suffer little to no degradation.

In some implementations, the flywheel 202 may be further balanced after removing it from the fixture. For instance, it may be spun to identify vibrations or imbalances due to imperfections in the plates or alignment. Material may be trimmed from the stacking plates 122 between the scallops 310 in order to balance the flywheel 202 better, or plugs may be inserted into holes on the clamping plate(s) 120, for instance.

Figure 7:
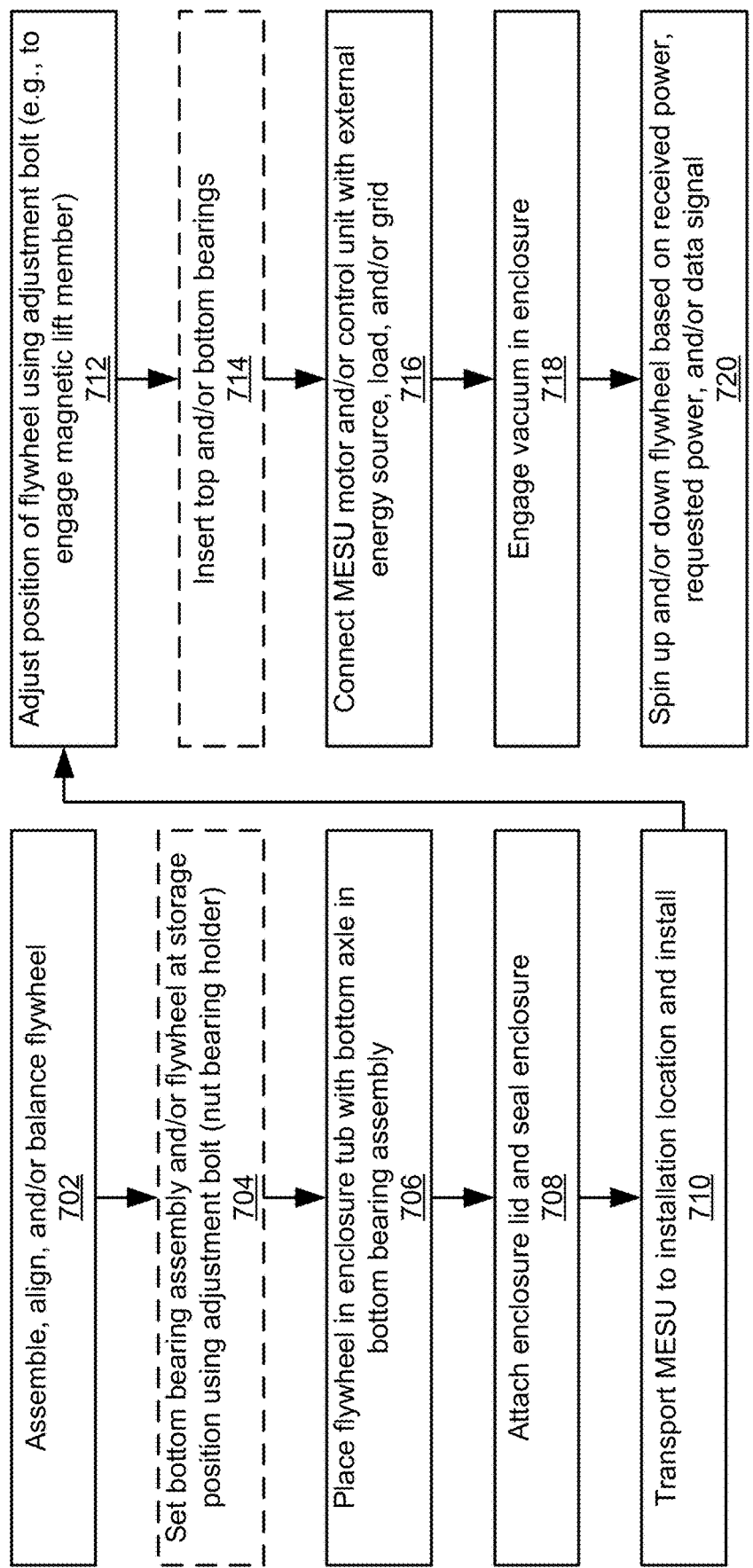
FIG. 7 is a block diagram illustrating a method of building a flywheel assembly.

FIG. 7 is a block diagram illustrating a method of building a flywheel assembly 102, such as placing a flywheel 202 into a flywheel enclosure 104 and moving the flywheel 202 from a storage or shipping position to an active position. It should be noted that the operations provided are illustrative examples and that variations are possible and contemplated herein, such as where the order of operations is changed, various operations are omitted or added, or otherwise.

In some implementations, at 702, a flywheel 202 may be assembled, aligned, and/or balanced, for example, as described in reference to FIG. 6.

In some implementations, at 704, a bottom bearing assembly and/or flywheel 202 may be set at a storage or shipping position, for example, using a vertical adjustment bolt or nut. For example, an axle 208 support may be completely twisted downward, so that it (e.g., via a bearing) does not vertically support the flywheel 202. As described above, where the flywheel 202 is in a shipping position, it may rest on a shipping ring or similar structure to avoid damaging the bearings during shipping. In some implementations, other clamps, packing materials, bolts, or devices may be used to further secure the flywheel 202 from shifting during shipping.

In other implementations, the top and/or bottom bearings may be completely removed or otherwise disengaged to prevent damage to the bearings during transport of the MESU 102 or flywheel assembly 102. In such instances, as noted below at 714, the flywheel 202 may be adjusted and/or the bearings reengaged or re-inserted.

In some implementations, at 706, the flywheel 202 may be placed in the enclosure tub 126 with a bottom axle 208*b* inserted into the bottom bearing assembly. For instance, the bottom bearing assembly may hold the axle 208 horizontally. Where a bottom axle 208*b* holder has been moved to a shipping position, a flat bottom area of the bottom clamping plate 120*b* may rest on a shipping ring or disposable shipping support. In some implementations, the bottom of the clamping ring and the shipping ring (e.g., with ridges, protrusions, channels, etc.) may prevent the flywheel 202 from shifting on the shipping ring or shipping support during transport.

In some implementations, at 708, the enclosure 104 lid may be attached and sealed to the enclosure tub 126. The enclosure 104 lid may include O-rings or other seals (e.g., caulk, welds, etc.) may be used to seal it. The enclosure 104 lid may be bolted to a top ring of the enclosure tub 126. The top axle 208*a* of the flywheel 202 may be inserted into a top bearing assembly when the enclosure 104 lid is lowered onto the enclosure tub 126.

In some implementations, various components may be pre-assembled onto the enclosure 104 lid, such as the motor-bearing, controller, or components described or illustrated herein. In some implementations, after the enclosure 104 lid is assembled onto the enclosure 104, the other components of the flywheel assembly 102 may be assembled.

In some implementations, at 710, the MESU 102/flywheel assembly 102 may be transported to an installation location and installed. For instance, the legs thereof may be bolted to a concrete base or other structure. In some implementations, the flywheel assembly 102 may be placed into an enclosure 104 or case that is decorative or protects it from the elements. The flywheel assembly 102 may be placed fully or partially underground, above ground in a water-resistant enclosure 104 or otherwise. In some instances, where additional cooling is needed, the enclosure 104 may include vents, fans, or a radiator.

The flywheel assembly 102 may be installed at a residence in a utility room or adjacent to a service panel, or the flywheel assembly 102 may be installed with other flywheels 202.

In some implementations, at 712, a position of the flywheel 202 may be adjusted into an active position using a vertical adjustment bolt, clamp, axle 208 holder, external lift, or other device. For instance, an axle 208 holder may be twisted upward to engage a lower bearing with the flywheel 202 and lift it from a shipping ring.

In some implementations, the flywheel 202 may be raised, using an axle 208 holder, lift, or other device (whether from the top or bottom), until the flywheel 202 contacts a top structure, such as the magnetic lift member (e.g., magnets located at the top of the enclosure 104 to pull the flywheel 202 against a top bearing or limit the force on a bottom bearing), an enclosure 104 lid, or another structure, or the flywheel 202 may be raised until another condition is satisfied, such as a measured rotation of the nut bearing holder, a measured height or offset from a structure, etc. For example, the flywheel 202 may be raised until a top clamping plate 120a contacts the magnetic lift member or a top bearing. The flywheel 202 may be lowered slightly to avoid contact with a top structure or magnetic lift member.

Once the vertical position of the flywheel 202 has been set, a retaining cap and/or hex lock may be placed on the nut bearing holder to lock the flywheel 202's vertical position. Similarly, the retaining cap may be sealed using integrated O-rings or other seals.

Other openings in the enclosure 104 may also be closed or sealed, a vacuum valve may be opened, and other preparations may be performed.

In some implementations, at 714, where the top and/or bottom bearings were removed or otherwise disengaged during shipping, a technician may reinsert or reengage the bearings. For instance, a shipping holder may be removed and/or a bottom bearing may be inserted into a channel or cylinder at the bottom of the flywheel enclosure 104 to bridge the gap between the cylinder and the bottom axle 208b. In some implementations, similar actions may be performed to install one or more top axles 208a bearings.

In some implementations, at 716, the MESU 102/flywheel assembly 102 may be connected to an external electrical network. For example, the motor-generator 110, control unit, or other components may be coupled with an external energy source, load, or power grid. An inverter may be coupled with an external circuit breaker, and a controller may be connected to a communications network. Accordingly, for example, energy received from a grid or renewable energy source (e.g., solar panels) may be received, converted into A/C (e.g., based on a motor-generator type), and used to spin up the flywheel 202. Similarly, when electrical power is requested, the motor-generator 110 may receive energy from the flywheel 202 to provide the power.

In some implementations, at 718, a vacuum may be engaged for the enclosure 104 to reduce internal air pressure in the enclosure 104, which may reduce energy losses due to air resistance. The vacuum may be permanent or maintained by an attached vacuum. The vacuum may be set to run at defined intervals or pressures (e.g., based on a pressure sensor). The vacuum may receive its power from the flywheel 202, supercapacitor 106, chemical battery, and/or external grid.

In some implementations, at 720, the flywheel 202 may be spun up or down based on received power, requested power, or a data signal. For instance, when excess power is fed into the motor-generator 110, the motor-generator 110 spins the flywheel 202 more quickly. Similarly, when power is requested, the motor-generator 110 may generate current from on the rotation of the flywheel 202. The flow of energy may be controlled by a controller, which may be controlled based on received signals (e.g., from a server or connected computer).

The flywheel 202 controller may measure various parameters of the flywheel 202, such as its rotational frequency, using sensors in the bearings or otherwise coupled with the flywheel assembly 102. The controller may instruct an inverter to receive or input power that keeps the flywheel 202 within certain RPMs. For instance, the controller may measure the RPM and keep the flywheel 202 from spinning too quickly beyond safe limits, which may be set based on flywheel 202 size, material strengths, desired energy storage capacity, regulations, etc. For example, the limits may keep the flywheel 202 at less than 15,000 or 25,000 RPMs, although other implementations are possible.

In the foregoing description, for purposes of explanation, numerous specific details are set forth in order to provide a thorough understanding of the technology. It will be apparent, however, that the technology described herein can be practiced without these specific details.

Reference in the specification to "one implementation", "an implementation", "some implementations", or "other implementations" means that a particular feature, structure, or characteristic described in connection with the implementation is included in at least one implementation of the disclosure. The appearances of the term "implementation" or "implementations" in various places in the specification are not necessarily all referring to the same implementation.

In addition, it should be understood and appreciated that variations, combinations, and equivalents of the specific implementations, implementations, and examples may exist, are contemplated, and are encompassed hereby. The invention should therefore not be limited by the above-described implementations, implementations, and examples, but by all implementations, implementations, and examples, and other equivalents within the scope and spirit of the invention as claimed.

What is claimed is:

1. A flywheel assembly fixture comprising:
a stacking device having a base portion and one or more walls, the base portion having a first axle receiver that holds a first axle at a first defined position, the one or more walls extending from the base portion, the stacking device receiving one or more flywheel plates onto the first axle;
a clamping device adapted to couple with the stacking device using one or more alignment mechanisms, the clamping device including a second axle receiver that holds a second axle at a second defined position, the first defined position being aligned with the second defined position when the clamping device is coupled with the stacking device; and
a plate alignment mechanism adapted to align the one or more flywheel plates with the first axle and the second axle, wherein the plate alignment mechanism is coupled with the one or more walls and adjustably extends in a first direction away from the one or more walls to exert pressure on the one or more flywheel plates, the first direction being substantially perpendicular to an axial direction of the first axle.

2. The flywheel assembly fixture of claim 1, wherein:
the plate alignment mechanism includes a plate contact surface that is adapted to interact with a contour in a peripheral edge of at least one of the one or more flywheel plates to push the at least one flywheel plate into alignment with the first axle.

3. The flywheel assembly fixture of claim 1, wherein:
the one or more flywheel plates include a first clamping plate, a second clamping plate, and one or more stacking plates positioned between the first clamping plate and the second clamping plate.

4. The flywheel assembly fixture of claim 3, wherein:
the first clamping plate is coupled with the first axle; and the second clamping plate is coupled with the second axle.

5. The flywheel assembly fixture of claim 4, wherein the first clamping plate is placed into the stacking device prior to the first axle.

6. The flywheel assembly fixture of claim 4, wherein at least one of the one or more stacking plates does not directly contact either the first axle or the second axle.

7. The flywheel assembly fixture of claim 3, wherein the first clamping plate is aligned using the first axle, the second clamping plate is aligned using the second axle, and the one or more stacking plates are aligned using the one or more alignment mechanisms.

8. The flywheel assembly fixture of claim 1, wherein the clamping device is adapted to exert a clamping force on the one or more flywheel plates to stress a clamping plate of the one or more flywheel plates in an axial direction of the first axle and the second axle.

9. A method of assembling a multi-part flywheel comprising:
placing a first axle into a first axle receiver of a stacking device, the first axle receiver holding the first axle in a first defined position;
placing one or more flywheel plates onto the first axle while the first axle is held by the first axle receiver;
placing a second axle into a second axle receiver of a clamping device, the second axle receiver holding the second axle at a second defined position, the first defined position being in line with the second defined position when the clamping device is coupled with the stacking device; and
aligning the one or more flywheel plates with the first axle in the stacking device including:
stacking the one or more flywheel plates using the stacking device; and
adjusting a plate alignment mechanism coupled with the stacking device to exert pressure on the one or more flywheel plates in a first direction, an axis of rotation of the first axle being perpendicular to the first direction.

10. The method of assembling a multi-part flywheel of claim 9, further comprising:
adjusting the plate alignment mechanism to move a plurality of the one or more flywheel plates into alignment and balance about the axis of rotation of the first axle.

11. The method of assembling a multi-part flywheel of claim 9, further comprising:
placing the first axle into the stacking device;
placing the one or more flywheel plates into the stacking device;
placing the second axle into the clamping device; and
coupling the clamping device with the stacking device.

12. The method of assembling a multi-part flywheel of claim 9, further comprising:
placing a first clamping plate into the stacking device; and
after placing the first clamping plate into the stacking device, placing the first axle into the first axle receiver of the stacking device through a perforation in a center of the first clamping plate.

13. The method of assembling a multi-part flywheel of claim 9, further comprising:
placing a first clamping plate into the stacking device contacting the first axle, the one or more flywheel plates including the first clamping plate, at least three stacking plates, and a second clamping plate; and
placing the at least three stacking plates on top of one or more of the first clamping plate and the first axle, one or more of the at least three stacking plates not contacting the first axle when the multi-part flywheel is assembled.

14. The method of assembling a multi-part flywheel of claim 13, further comprising:
placing the second clamping plate into the stacking device contacting the second axle; and
placing the clamping device onto the stacking device, the clamping device pushing the second axle into alignment with the first axle.

15. The method of assembling a multi-part flywheel of claim 9, further comprising:
applying, using the clamping device, a clamping force to one or more clamping plates of the one or more flywheel plates in an axial direction of the first axle to place the one or more clamping plates in a stressed position.

16. The method of assembling a multi-part flywheel of claim 15, further comprising:
while the clamping force is applied using the clamping device and while the one or more clamping plates are in the stressed position, inserting a plurality of bolts to couple the one or more clamping plates together in the stressed position.

17. A method of assembling a multi-part flywheel comprising:
placing a first axle into a first axle receiver of a stacking device, the first axle receiver holding the first axle in a first defined position including placing the first axle into the stacking device;
placing one or more flywheel plates onto the first axle while the first axle is held by the first axle receiver including placing the one or more flywheel plates into the stacking device;
placing a second axle into a second axle receiver of a clamping device including placing the second axle into the clamping device, the second axle receiver holding the second axle at a second defined position, the first defined position being in line with the second defined position when the clamping device is coupled with the stacking device; and
coupling the clamping device with the stacking device.

18. A method of assembling a multi-part flywheel comprising:
placing a first clamping plate into a stacking device;
after placing the first clamping plate into the stacking device, placing a first axle into a first axle receiver of the stacking device through a perforation in a center of the first clamping plate, the first axle receiver holding the first axle in a first defined position;

placing one or more flywheel plates onto the first axle while the first axle is held by the first axle receiver; and placing a second axle into a second axle receiver of a clamping device, the second axle receiver holding the second axle at a second defined position, the first defined position being in line with the second defined position when the clamping device is coupled with the stacking device.

19. A method of assembling a multi-part flywheel comprising:

placing a first axle into a first axle receiver of a stacking device, the first axle receiver holding the first axle in a first defined position;

placing one or more flywheel plates onto the first axle while the first axle is held by the first axle receiver including:

placing a first clamping plate into the stacking device contacting the first axle, the one or more flywheel plates including the first clamping plate, at least three stacking plates, and a second clamping plate; and placing the at least three stacking plates on top of one or more of the first clamping plate and the first axle, one or more of the at least three stacking plates not contacting the first axle when the multi-part flywheel is assembled; and placing a second axle into a second axle receiver of a clamping device, the second axle receiver holding the second axle at a second defined position, the first defined position being in line with the second defined position when the clamping device is coupled with the stacking device.

20. A method of assembling a multi-part flywheel comprising:

placing a first axle into a first axle receiver of a stacking device, the first axle receiver holding the first axle in a first defined position;

placing one or more flywheel plates onto the first axle while the first axle is held by the first axle receiver;

placing a second axle into a second axle receiver of a clamping device, the second axle receiver holding the second axle at a second defined position, the first defined position being in line with the second defined position when the clamping device is coupled with the stacking device; and applying, using the clamping device, a clamping force to one or more clamping plates of the one or more flywheel plates in an axial direction of the first axle to place the one or more clamping plates in a stressed position.

\* \* \* \* \*